US010423390B1

(12) United States Patent
Mani et al.

(10) Patent No.: US 10,423,390 B1
(45) Date of Patent: Sep. 24, 2019

(54) SYSTEMS AND METHODS FOR GENERATING CODE FOR MODELS HAVING MESSAGING SEMANTICS

(71) Applicant: The MathWorks, Inc., Natick, MA (US)

(72) Inventors: Ramamurthy Mani, Wayland, MA (US); Devdatt Lad, Needham, MA (US); Meera S. Atreyam, Shewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 280 days.

(21) Appl. No.: 15/173,085

(22) Filed: Jun. 3, 2016

Related U.S. Application Data

(60) Provisional application No. 62/171,035, filed on Jun. 4, 2015.

(51) Int. Cl.
*G06F 8/30* (2018.01)

(52) U.S. Cl.
CPC .................... *G06F 8/30* (2013.01)

(58) Field of Classification Search
CPC .......................................... G06F 8/30
USPC .......................................... 717/106
See application file for complete search history.

(56) References Cited

U.S. PATENT DOCUMENTS

| 5,317,746 | A | 5/1994 | Watanabe |
| 6,519,639 | B1 | 2/2003 | Glasser et al. |
| 6,522,635 | B1 | 2/2003 | Bedwell |
| 7,313,449 | B1 | 12/2007 | Ciolfi et al. |
| 7,324,931 | B1 | 1/2008 | Warlock |
| 7,941,299 | B1 | 5/2011 | Aldrich et al. |
| 7,991,598 | B1 | 8/2011 | Wood |
| 8,190,417 | B2 | 5/2012 | Shachar |
| 8,689,236 | B2 | 4/2014 | Simsek et al. |
| 9,256,485 | B1 | 2/2016 | Moore et al. |
| 9,268,622 | B2 | 2/2016 | Moore et al. |
| 9,304,840 | B2 | 4/2016 | Simsek et al. |
| 2002/0013889 | A1 | 1/2002 | Schuster et al. |

(Continued)

FOREIGN PATENT DOCUMENTS

| GB | 2006/003928 | 5/2007 |
| GB | 0521625.4 | 5/2007 |

OTHER PUBLICATIONS

Bagrodia, Rajive I., et al., "A Message-Based Approach to Discrete-Event Simulation," IEEE, IEEE Transactions on Software Engineering, vol. SE-13, No. 6, Jun. 1987, pp. 654-665.

(Continued)

*Primary Examiner* — Emerson C Puente
*Assistant Examiner* — Sen Thong Chen
(74) *Attorney, Agent, or Firm* — Cesari and McKenna, LLP; Michael R. Reinemann

(57) ABSTRACT

A system and method may automatically generate computer programming code for an executable model having messaging semantics. The executable model may define messages that have fixed payloads, and that persist for only a determined time interval of a total execution or simulation time of the model. The model may establish message queues for storing messages. The standalone code may include code that establishes message services including the creation of message queues. The generated code may be compiled and deployed on a target device for execution.

28 Claims, 27 Drawing Sheets

(56) References Cited

U.S. PATENT DOCUMENTS

| | | | |
|---|---|---|---|
| 2004/0230979 A1 | 11/2004 | Beecroft et al. | |
| 2005/0216248 A1 | 9/2005 | Ciolfi et al. | |
| 2007/0073828 A1* | 3/2007 | Rao | H04L 67/1097 709/217 |
| 2007/0288885 A1 | 12/2007 | Brunel et al. | |
| 2008/0059739 A1 | 3/2008 | Ciolfi | |
| 2008/0098349 A1 | 4/2008 | Lin et al. | |
| 2009/0044171 A1 | 2/2009 | Avadhanula | |
| 2009/0132936 A1 | 5/2009 | Anderson et al. | |
| 2009/0164558 A1 | 6/2009 | Hofmann | |
| 2009/0177779 A1 | 7/2009 | DeVal et al. | |
| 2009/0204949 A1 | 8/2009 | Howland et al. | |
| 2009/0240449 A1 | 9/2009 | Gibala | |
| 2009/0292518 A1 | 11/2009 | Shachar et al. | |
| 2010/0049821 A1 | 2/2010 | Oved | |
| 2010/0070753 A1 | 3/2010 | Kido et al. | |
| 2011/0106890 A1 | 5/2011 | Karpov | |
| 2011/0296436 A1 | 12/2011 | Moore et al. | |
| 2014/0215492 A1* | 7/2014 | Ross | G06F 9/546 719/314 |
| 2015/0020080 A1* | 1/2015 | Simsek | G06F 9/546 719/314 |
| 2015/0370582 A1* | 12/2015 | Kinsella | G06F 9/545 718/1 |
| 2016/0065454 A1* | 3/2016 | Arumugam | H04L 45/38 370/389 |
| 2016/0132371 A1 | 5/2016 | Moore et al. | |
| 2017/0242596 A1* | 8/2017 | Liu | G06F 3/0613 |

OTHER PUBLICATIONS

Behrmann, Gerd, et al., "A Tutorial on UPPAAL 4.0," Nov. 28, 2006, pp. 1-48.
Bobbio, Andrea, "System Modeling with Petri Nets," A. G. Colombo and A. Saiz de Bustamante (eds.), System Reliability Assessment, Kluwer p. c., 1990, pp. 1-44.
Bringmann, Eckard, Automated Model-Based Testing of Control Software with TPT, 2008, pp. 1-19.
Bringmann, Eckard, "Model-Based Testing of Automotive Systems," International Conference on Software Testing, Verification and Validation (ICST), 2008, pp. 1-9.
Campos-Rebelo, Rogerio, et al., "From IOPT Petri Nets to C: An Automatic Code Generator Tool," 2011 9th IEEE International Conference on Industrial Informatics, Caparica, Lisbon, IEEE, Jul. 26-29, 2011, pp. 390-395.
Ciancarini, Paolo, "Exercises on Basic UML Behaviors," Nov. 2013, pp. 1-38.
Cleaveland, Rance, et al., "An Instrumentation-Based Approach to Controller Model Validation," Model-Driven Development of Reliable Automotive Services. Second Automotive Software Workshop, ASWSD 2006, Revised Selected Papers Springer-Verlag Berlin, 2008, pp. 1-14.
"Creating and Managing Timing Diagrams", IBM, retrieved from www.ibm.com on Mar. 29, 2013, 5 pp.
"Creating Communication Diagrams", IBM, retrieved from www.ibm.com on Mar. 29. 2013, 12 pages.
"Creating Sequence Diagrams", IBM, retrieved from www.ibm.com on Mar. 29. 2013, 24 pages.
Dumond, Yves, et al., "A Relationship Between Sequence and Statechart Diagrams," 2000, pp. 1-6.
Gronmo, Roy, et al., "From UML 2 Sequence Diagrams to State Machines by Graph Transformation," Journal of Object Technology, AITO-Association Internationale pour les Technologies Objets, JOT, vol. 10, Jun. 2011, pp. 1-22.
Harel, David, et al., "Synthesis Revisited: Generating Statechart Models from Scenario-Based Requirements," Formal Methods in Software and Systems Modeling, LNCS, vol. 3393, Springer-Verlag Berlin, Heidelberg, Jan. 13, 2005, pp. 1-18.
Heverhagen, Torsten, et al., "A Profile for Integrating Function Blocks into the Unifiled Modeling Language," http://www-verimag. imag.fr/EVENTS/2003/SVERTS/PAPERS-WEB/08-Heverhagen-FunctionBlockAdapters.pdf, Oct. 20, 2003, pp. 1-19.
Hoffmann, Ph.D., Hans-Peter, "SysML-Based Systems Engineering Using a Model-Driven Development Approach," Telelogic, An IBM Company, Version 1, Jul. 2008, pp. 1-16.
Hooman, Jozef, et al., "Coupling Simulink and UML Models," http://www.mbsd.cs.ru.nl/publications/papers/hooman/FORMS04.pdf, 2004, pp. 1-8.
Krahl, David, et al., "A Message-Based Discrete Event Simulation Architecture," IEEE, Proceedings of the 1997 Winter Simulation Conference, Winter 1997, pp. 1361-1367.
Krahl, David, "Extendsim 7," IEEE, Proceedings of the 2008 Winter Simulation Conference, Winter 2008, pp. 215-221.
Latronico, Beth, et al., "Representing Embedded System Sequence Diagrams as a Formal Language," Electrical & Computer Engineering, Carnegie Mellon University, UML, Oct. 2001, pp. 1-23.
Leung, Man-Kit, "An Extensible and Retargetable Code Generation Framework for Actor Models," Electrical Engineering and Computer Sciences University of California at Berkeley, Dec. 19, 2009, pp. 1-82.
McQuillan, John M., et al., "Some Considerations for a High Performance Message-Based Interprocess Communication System," Bolt Beranek and Newman, Inc., Jul. 1975, pp. 77-86.
Murata, Tado, "Petri Nets: Properties, Analysis and applications," Proceedings of the IEEE, vol. 77, No. 4, IEEE, Apr. 1989, pp. 541-580.
"Notification of Transmittal of the International Search Report and the Written Opinion of the International Searching Authority, or the Declaration," International Filing Date: May 27, 2011, International Application No. PCT/US2011/000964, Applicant: The Mathworks, Inc., dated Aug. 25, 2011, pp. 1-12.
Notification of Transmittal of the International Search Report and the Written Opinion of the International Searching Authority, or the Declaration, International Filing Date: May 27, 2011, International Application No. PCT/US2011/000967, Applicant: The Mathworks, Inc., dated Aug. 26, 2011, pp. 1-12.
"Public Health Information Network Messaging System (PHINMS),"Technical Guide Version 2.8.01, U.S. Department of Health & Human Services, Feb. 2, 2009, pp. 1-50.
"Real-Time Workshop: for Use with Simulink-Getting Started," Version 6, The MathWorks, Inc., Jun. 2004, pp. i-iv, 1-1 to 1-20 and 2-1 to 2-30.
"Simulink®: User's Guide: R2014a," The Math Works, Inc., Mar. 2014, pp. 3632.
"Simulink® 7: User's Guide," The Math Works, Inc., Sep. 2009, pp. i -xlvi, 1-1 to 1-46, 2-1 to 2-44, 3-1 to 3-34, 4-1 to 4-138, 5-1 to 5-30, 6-1 to 6-84, 7-1 to 7-60, 8-1 to 8-26, 9-1 to 9-60, 10-1 to 10-88, 11-1 to 11-30, 12-1 to 12-66, 13-1 to 13-58, 14-1 to 14-28, 15-1 to 15-36, 16-1 to 16-28, 17-1 to 17-46, 18-1 to 18-16, 19-1 to 19-68, 20-1 to 20-32, 21-1 to 21-32, 22-1 to 22-16, 23-1 to 23-10, 24-1 to 24-24, 25-1 to 25-12, 26-1 to 26-42, 27-1 to 27-36, 28-1 to 28-26, 29-1 to 29-46, 30-1 to 30-160, 31-1 to 31-32, Glossary-1 to Glossary-2, A-1 to A-4, Index-1 to Index-22.
"Simulink, Model-based and System-based Design", The Math Works, 2004, pp. 1-488.
"Simulink® Verification and Validation 2: User's Guide," The Math Works, Inc., Sep. 2007, pp. i-xii, 1-1 to 1-6, 2-1 to 2-58, 3-1 to 3-32, 4-1 to 4-28, 5-1 to 5-66, 6-1 to 6-30, 7-1 to 7-4, 8-1 to 8-56, 9-1 to 9-4, 10-1 to 10-42, A-1 to A-4, and Index-1 to Index-4.
Traub, Matthias, et al., "Generating Hardware Descriptions from Automotive Function Models for an FPGA-Based Body Controller: A Case Study," http://www.mathworks.com/automotive/macde2008/proceedings/day2/04_daimler_generting_hw_descriptions_with_hdl_coder_papers.pdf, 2008, pp. 1-8.
"UML Sequence Diagrams", uml-diagrams.org, retrieved from http://www.uml-diagrams.org/sequence-diagrams.html on Mar. 29, 2013, 18 pages.
U.S. Appl. No. 14/513,978, filed Oct. 14, 2014 by Alan J. Mooreet al. For Systems and Methods for Generating Message Sequence Diagrams From Graphical Programs, pp. 1-83.
Van Der Aalast, W. M. P., et al., "Analysis of Discrete-time Stochastic Petri Nets," Statistica Neerlandica, vol. 54, Issue 2, Blackwell Publishers, Ltd., Jul. 2000, pp. 1-17.

(56) References Cited

OTHER PUBLICATIONS

Whittle, Jon, et al., "Generating Statechart Designs From Scenarios," Jun. 2000, pp. 1-10.

* cited by examiner

SYSTEMS AND METHODS FOR GENERATING CODE FOR MODELS HAVING MESSAGING SEMANTICS

CROSS-REFERENCE TO RELATED APPLICATIONS

This application claims the benefit of U.S. Provisional Patent Application Ser. No. 62/171,035 filed Jun. 4, 2015 for Code Generation for Models Having Message-Based Semantics, by Ramamurthy Mani, Devdatt Lad, and Meera S. Atreyam, which application is hereby incorporated by reference in its entirety.

COMPUTER PROGRAM LISTING

A portion of the disclosure of this patent document contains material that is subject to copyright protection. The copyright owner has no objection to facsimile reproduction by anyone of the patent document for the patent disclosure, as it appears in the United States Patent and Trademark Office patent file or records, but otherwise reserves all copyright rights whatsoever. Copyright © 2015 The MathWorks, Inc.

Applicant submits herewith Computer Program Listings, which are included as Appendix A attached hereto.

BRIEF DESCRIPTION OF THE DRAWINGS

The disclosure below refers to the accompanying drawings, of which.

DETAILED DESCRIPTION OF ILLUSTRATIVE EMBODIMENTS

Figure 1:
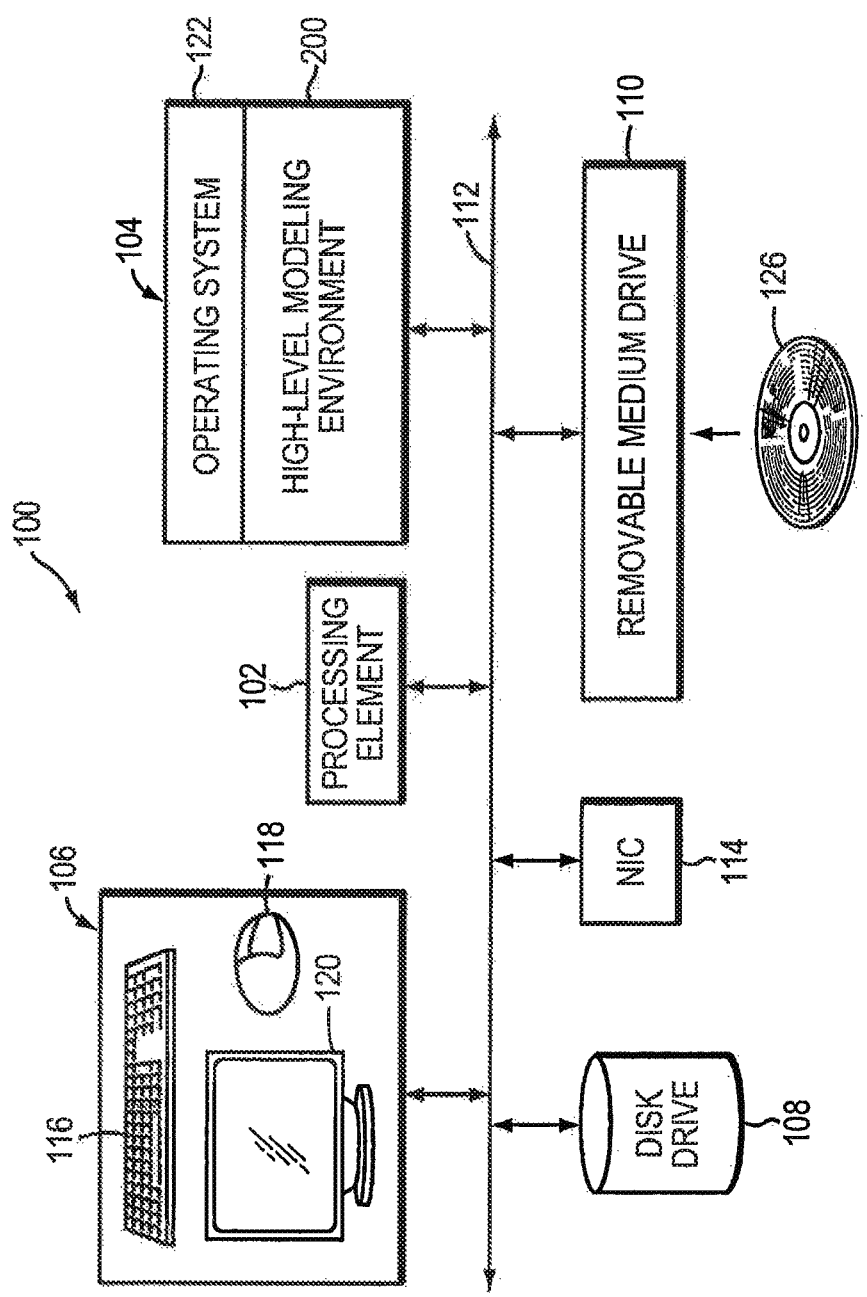
FIG. 1 is a schematic illustration of an example data processing system in accordance with an embodiment of the disclosure.

Exemplary embodiments of the disclosure generate executable models having objects configured to run in accordance with message-based execution semantics. A message may include a payload comprising one or more data elements that may not change during the execution of the model. In addition, a message may be generated at a particular point in the execution or simulation time of the model by a message sender object, and the message may persist for a determined time interval of the total model execution or simulation time. A model's simulation time may differ from actual clock time. For example, while a model may be executed over a simulation time of ten seconds, it may take just a small fraction of that in terms of actual clock time, e.g., milliseconds, for a data processing system to complete the model's execution over the simulation time.

A message-based modeling entity, which may be included within a modeling system, may support message-based functionality in the model. The system may include a library of pre-defined object types, such as graphical block types, configured to generate and send messages, and to receive and process messages. The library of message-based blocks may be organized as a class hierarchy. The modeling environment may include a graphical editor that provides a model canvas in which a user may construct and/or edit a model. Message-based objects may be configured to have one or more message ports for sending and receiving messages. In response to the message ports of selected objects being interconnected, such as through message-based connections extending from source ports to destination ports, the system may establish message-based relationships among the interconnected objects.

The system may establish one or more message queues for storing messages. The message queues may have attributes, such as a length, a processing order, an overflow policy, and a priority. Message generated during execution of the model may be logged and may be routed to other message queues and/or message-based receiver objects.

The system may also include a message-based execution engine that controls the execution of the model's message-based objects. More specifically, during execution, a message sender object may generate a message at a particular point in the execution time of the model. The message-based execution engine may maintain the message for a determined portion or time interval of the total execution time of the model. In addition, the execution engine may send the message to one or more message-based receiver objects, which may or may not trigger their execution, and the execution engine may control the processing of the message by the one or more message-based receiver blocks.

In some embodiments, the modeling system may include entities or modules that support other execution domains, such as a time-based and state-based execution domains. In addition, the message-based modeling entity may cooperate with such a time-based and/or state-based execution entities or modules to implement hybrid execution models.

The time-based entity or module may include a library of time-based objects or blocks, and selected time-based objects or blocks may be added to the model. A time-based block describes a dynamic system of equations that defines time-based relationships between signals and state variables. Signals represent quantities that change over time, and may have values at all points in time. The relationships between signals and state variables may be defined by the set of equations represented by the time-based blocks. Time-based blocks may include signal ports that may be interconnected with signal-based connections. The source of a signal corresponds to the block that writes to the signal during the evaluation of the block's equations, and the destination of the signal is the block that reads the signal during the evaluation of the destination block's equations.

The state-based entity or module may include a library of state-based objects, such as states, sub-states, transitions, junctions, etc. The state-based objects may be configured to generate and/or receive messages. For example, programming syntaxes, such as a textual programming syntax, may be defined for generating and/or evaluating messages by state-based objects. In addition, state transitions may be guarded by messages. For example, the programming syntaxes may support the specification of particular messages to guard transitions or other state-based objects.

The time-based execution engine executes the time-based blocks in the diagram by evaluating the relationships between signals and state variables over time beginning at a start time and continuing to a stop time. Each evaluation of the relationships may be referred to as a time step.

As mentioned, the message-based system and the time-based and/or state-based execution engines may cooperate to implement a hybrid environment. In particular, the time-based execution engine may organize time-based and/or state-based blocks or objects into a scheduled or sorted order, which refers to the order in which the blocks' operations or methods (e.g., execution methods), are invoked. The time-based and/or state-based blocks or objects may then be executed according to the scheduled order.

The message-based system may also include a verification engine. The verification engine may support a library containing one or more verification blocks. Instances of the verification blocks may be added to the model to evaluate the operation of message-based blocks. The types of verification blocks may include an observer type, a message sink type, a generator type, and a scenario type. The observer block may be used to visualize a set of messages, referred to as a trace, generated by one or more selected message-based objects of the model. The set of messages of the trace may be ordered in time between a start time and an end time by the observer block. The observer block may be a floating block within the model, and it may be associated with a message-based connection. The message sink block may be directly connected to a message-based block, and may be used to visualize a trace generated by that message-based block. The generator block may be used to represent an external source of messages to the model. The generator block may be connected to one or more message-based blocks as a source, and configured to generate one or more messages or traces that may then be received and processed by the one or more message-based blocks to which the generator block is connected. The scenario block may be used to define valid and invalid traces. It may also or alternatively be used to define one or more constraints on one or more messages or traces. For example, temporal constraints may be defined on one or more messages, or between two or more messages. The scenario block may be associated with one or more message-based connections in the model whose messages may form a runtime trace to be evaluated. The scenario block may compare the defined valid and invalid traces, and the one or more constraints, to the runtime trace produced during execution of the model. The scenario block may be further configured to take one or more actions if one or more of the runtime traces is not equivalent to the defined valid traces, or the runtime traces are equivalent to the defined invalid traces. The scenario block may also take a specified action if the one or more constraints are not satisfied.

A method comprises accessing, from a first memory, an executable model having messaging semantics, where the model executes over a model simulation time, and generates messages having fixed payloads that persist for determined portions of the model simulation time, generating, by a processor coupled to the first memory, standalone computer programming code for the model, where the standalone computer programming code includes instructions for creating the messages, destroying the messages following the determined portions of the model simulation time; and store the standalone computer programming code in the first memory or a second memory.

The above method wherein the standalone computer programming code further includes instructions for generating at least one message queue, where the at least one message queue has a length, a processing order, and an overflow policy.

One or more of the above methods wherein the standalone computer programming code further includes instructions for storing one or more of the messages in the at least one queue.

One or more of the above methods wherein the standalone computer programming code further includes instructions for popping the one or more messages from the at least one queue.

One or more of the above methods wherein the standalone computer programming code includes a first layer having a message construction and destruction service, a message queuing service, and a message sending, receiving, and forwarding service.

One or more of the above methods wherein the executable model specifies a procedure, and standalone computer programming code includes a second layer that implements the procedure of the executable model.

One or more of the above methods wherein the second layer includes function calls to the first layer.

A method comprising: accessing, from a first memory, an executable model having messaging semantics, where the model generates messages having fixed payloads that persist for limited times during execution of the model; generating, by a processor coupled to the first memory, standalone computer programming code for the model, where the standalone computer programming code includes instructions for creating the messages, destroying the messages at the ends of the limited times; and store the standalone computer programming code in the first memory or a second memory.

A method comprising: accessing, from a first memory, an executable model having messaging semantics, where the model generates messages having fixed payloads that persist for limited times during execution of the model, the limited times having start points and end points; generating, by a processor coupled to the first memory, standalone computer programming code for the model, where the standalone computer programming code includes instructions for implementing one or more messaging services that allocate the messages at the start points of the limited times, deallocate the messages at the end points of the limited times, establish message queues, enqueue the messages to the message queues, and dequeue the messages from the message queues; and deploy the standalone computer programming code or a translated version of the standalone computer programming code to a target data processing system.

FIG. 1 is a schematic illustration of a computer or data processing system 100 for implementing and utilizing an embodiment of the disclosure. The computer system 100 includes one or more processing elements, such as a processing element 102, a main memory 104, user input/output (I/O) device 106, a data storage unit, such as a disk drive 108, and a removable medium drive 110 that may all be interconnected by a system bus 112. The computer system 100 may also include a communication unit, such as a network interface card (NIC) 114. The user I/O device 106 may include a keyboard 116, a pointing device, such as a mouse 118, and a display 120. The main memory 104 may store a plurality of libraries or modules, such as an operating system 122, and one or more applications running on top of the operating system 122, including a high-level modeling environment 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers and other portable computing devices, etc. Furthermore, exemplary processing elements include single or multi-core Central Processing Units (CPUs), Graphics Processing Units (GPUs), Field Programmable Gate Arrays (FPGAs), Application Specific Integrated Circuits (ASICs), etc. Nonetheless, those skilled in the art will understand that the system 100 of FIG. 1 is intended for illustrative purposes only, and that the present disclosure may be used with other computer systems, data processing systems or computational devices. The present disclosure may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

A user or developer, such as an engineer, scientist, programmer, etc., may utilize the keyboard 116, the mouse 118, and the display 120 to operate the high-level modeling environment 200, and construct or open one or more models of a system that is being designed. The model, which may have executable semantics, may represent a real-world dynamic system that is being modeled, simulated, and/or analyzed by the user.

Figure 2:
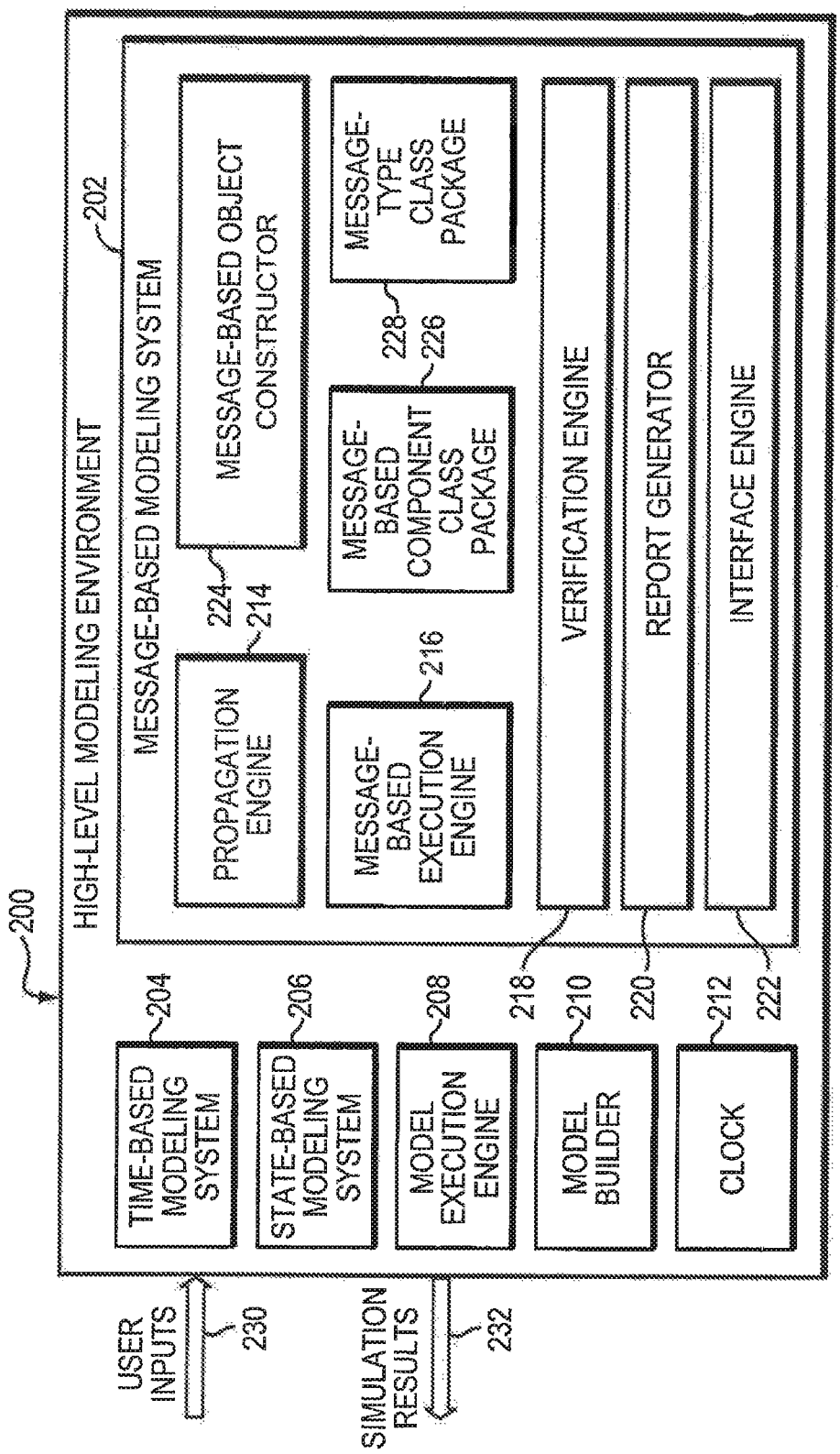
FIG. 2 is a partial, functional diagram of an example high-level modeling environment in accordance with an embodiment of the disclosure.

FIG. 2 is partial block diagram of an embodiment of the high-level modeling environment 200. The environment 200 may include a message-based modeling system 202, and one or more additional modeling systems, such as a time-based modeling system 204, and a state-based modeling system 206. The environment 200 also may include a model execution engine 208, a model builder 210, and a clock source, such as clock 212. The message-based modeling system 202 may include a plurality of components or modules. In particular, it may include a propagation engine 214, a message-based execution engine 216, a verification engine 218, a report generator 220, and an interface engine 222. The system 202 may also include an object constructor 224 that may access one or more class packages, such as message-based component class package 226, and a message-type class package 228.

In an implementation, high-level modeling environment 200 may receive inputs by a user as the user creates, edits, revises, and/or opens one or more models, as indicated by arrow 230. The model execution engine 208 in cooperation with the modeling systems 202, 204 and 206 may execute the model generating one or more results that may be presented to the user, as indicated by arrow 232. A model may include a plurality of portions each operating according to a different execution domains. For example, a first portion may operate according to message-based semantics, a second portion may operate according to time-based semantics, and a third portion may operate according to state-based semantics.

In some embodiments, a graphical model may be executable such that the model receives one or more inputs, processes those inputs, and produces one or more outputs.

In some embodiments, a suitable high-level modeling environment includes the MATLAB® technical computing environment from The MathWorks, Inc. of Natick, Mass. The high-level modeling environment may thus operate at a level that is even higher than other well-known programming languages, such as the C, C++, and C# programming languages. A suitable time-based graphical modeling system includes the SIMULINK® environment from The MathWorks, Inc. A suitable state-based modeling system includes the Stateflow charting tool from The MathWorks, Inc.

It should be understood that other modeling tools in addition to or in place of the time-based modeling system 204 and/or the state-based modeling system 206 may be used in the environment 200. Other such modeling tools include dataflow systems, such as the LabVIEW programming system from National Instruments Corp. of Austin, Tex., and the Visual Engineering Environment (VEE) from Agilent Technologies, Inc. of Santa Clara, Calif., physical modeling systems, such as The Simscape product from The MathWorks, Inc., Unified Modeling Language (UML) systems, and Systems Modeling Language (SysML) systems, among others. In addition, a lower level programming language, such as the C, C++, and C# programming languages, among others, may also be used to create one or more models or model portions.

The propagation engine 214, message-based execution engine 216, verification engine 218, report generator 220, interface engine 222, message-based object constructor 224, and class packages 226, 228 may each comprise registers and combinational logic configured and arranged to produce sequential logic circuits. In some embodiments, the propagation engine 214, message-based execution engine 216, verification engine 218, report generator 220, interface engine 222, message-based object constructor 224, and class packages 226, 228 may be implemented through one or more software modules or libraries containing program instructions pertaining to the techniques described herein. The software modules may be stored on main memory 104 and/or computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present disclosure.

In some embodiments, the message-based components of a graphical model as well as the messages generated during execution of the model may be objects, and these objects may be defined by creating "classes" which are not objects themselves, but which act as templates that instruct the constructor 224 how to construct an actual component and message object. A class may, for example, specify the number and type of data variables and the steps involved in the functions which manipulate the data. The object constructor 224 may use the corresponding class definition and additional information, such as arguments provided during object creation, to construct the object. Likewise, objects may be destroyed by a special function called a "destructor". Objects may be used by manipulating their data and invoking their functions.

Figure 3:
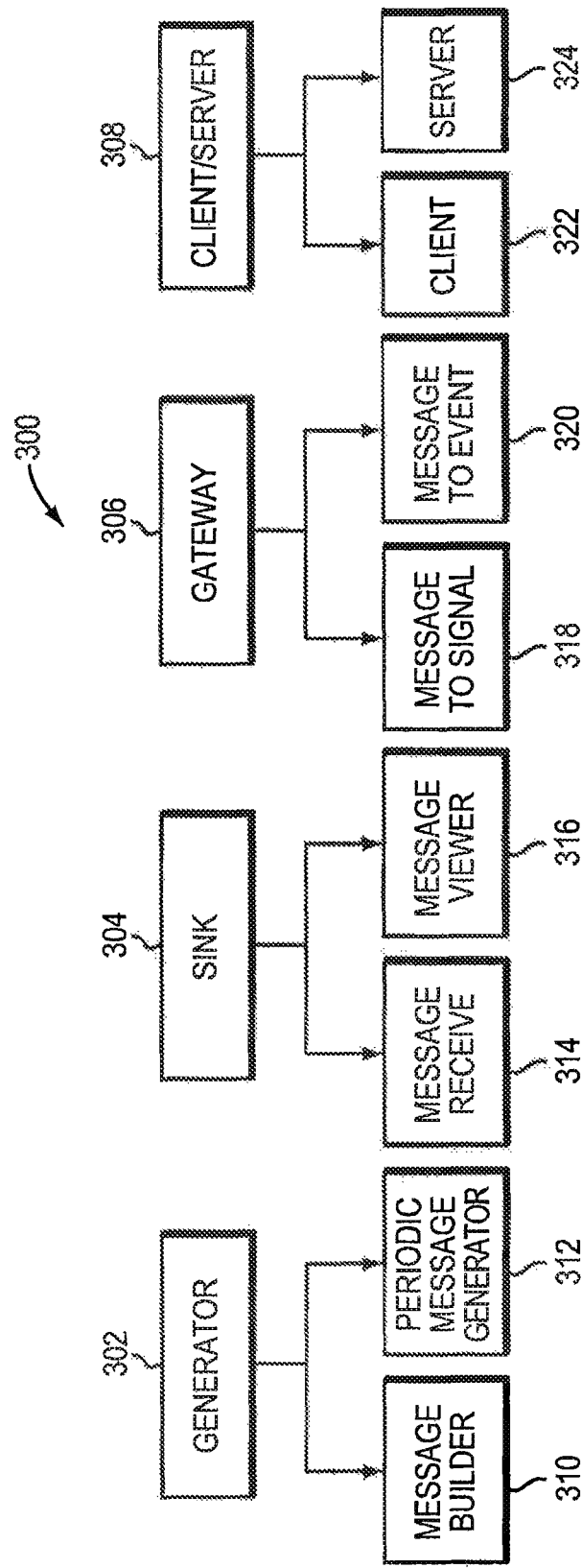
FIG. 3 is a schematic illustration of an example class hierarchy of message-based components in accordance with an embodiment of the disclosure.

FIG. 3 is a schematic illustration of an exemplary class hierarchy 300 of message-based components. Instances of objects defined in the class hierarchy 300 may be constructed for use in a graphical model. The class hierarchy 300 may include one or more base classes, such as a Generator class 302, a Sink class 304, a Gateway class 306, and a Client/Server class 308. In addition, one or more of the base classes may include one or more derived classes, which may also be referred to as sub-classes. For example, the Generator base class 302 may include a Message Builder subclass 310 and a Period Message Generator subclass 312. The Sink base class may include a Message Receive subclass 314 and a Message Viewer subclass 316. The Gateway base class 306 may include a Message to Signal subclass 318 and a Message to Event subclass 320. The Client/Server base class 308 may include a Client subclass 322 and a Server subclass 324.

It should be understood that other, possibly more complex, class hierarchies may be provided. For example, additional base classes may be provided, and one or more of the subclasses may include subclasses of its own, and so on.

Figure 4:
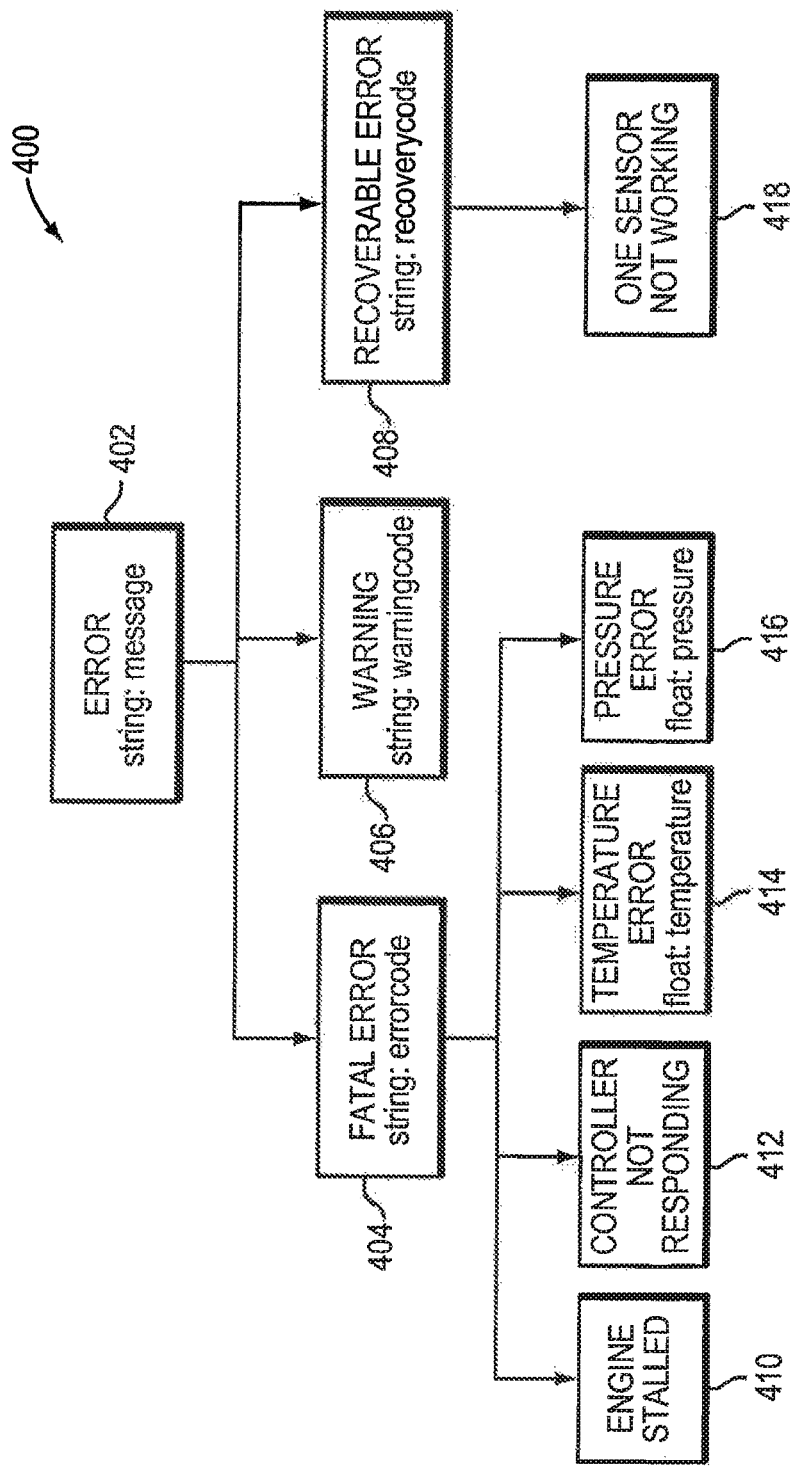
FIG. 4 is a schematic illustration of an example class hierarchy of message types in accordance with an embodiment of the disclosure.

FIG. 4 is a schematic illustration of an exemplary class hierarchy 400 of message types, such as error messages. The hierarchy 400 may include an Error base class 402. The Error base class 402 may have one string property named "message". The Error base class 402 may include a plurality of derived classes, such as a Fatal Error subclass 404, a Warning subclass 406, and a Recoverable Error subclass 408, which may define other class specific properties. The Fatal Error subclass 404 may have one string property named "errorcode". The Warning subclass 406 may have one string property named "warningcode". The Recoverable Error subclass 408 may have one string called "recoverycode". Furthermore, the Fatal Error subclass 404 may have a plurality of derived classes, such as an Engine Stalled subclass 410, a Controller Not Responding subclass 412, a Temperature Error subclass 414, and a Pressure Error subclass 416. The Temperature Error subclass 414 may have one floating point property called "temperature", and the Pressure Error subclass 416 may have one floating point property called "pressure". The Recoverable Error subclass 408 may have one derived class, such as a One Sensor Not Working subclass 418.

While the message types are referred to as classes, in some embodiments, they do not have any methods. Instead, the specialization of the message classes may add new properties, i.e., data members, only.

Figure 5:
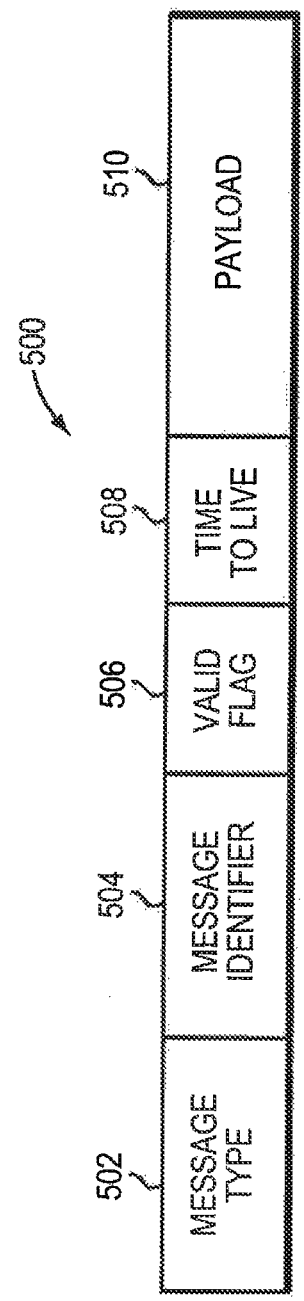
FIG. 5 is a schematic illustration of an example data structure for storing data elements of a message in accordance with an embodiment of the disclosure.

In some embodiments, an instance of a message object may include one or more data elements. FIG. 5 is a schematic illustration of a data structure 500 representing the data elements of an instance of a message object. The data structure 500 may be organized into a plurality of fields and sub-fields each storing particular information. For example, the data structure 500 may include a message type field 502, a message identifier (ID) field 504, a valid flag 506, a time to live (TTL) field 508, and a payload field 510. The message type field 502 may store information that indicates the particular type of message, the message ID field 504 may store an identifier that uniquely identifies the message, the valid flag 506 may indicate whether the message is valid or invalid, the TTL field 508 may store information indicating how long the message should be maintained, and the payload field may store information associated with the message that was generated by the message source and that may be used by one or more message destinations.

It should be understood that the data structure may include additional or fewer fields. In addition, the payload field 510 may be organized into a plurality of sub-fields.

In other embodiments, message-based components and/or messages may be instances generated from types, instead of being objects generated from classes. Those skilled in the art will understand that other implementations of message-based components and/or messages may be utilized.

Figure 6A:
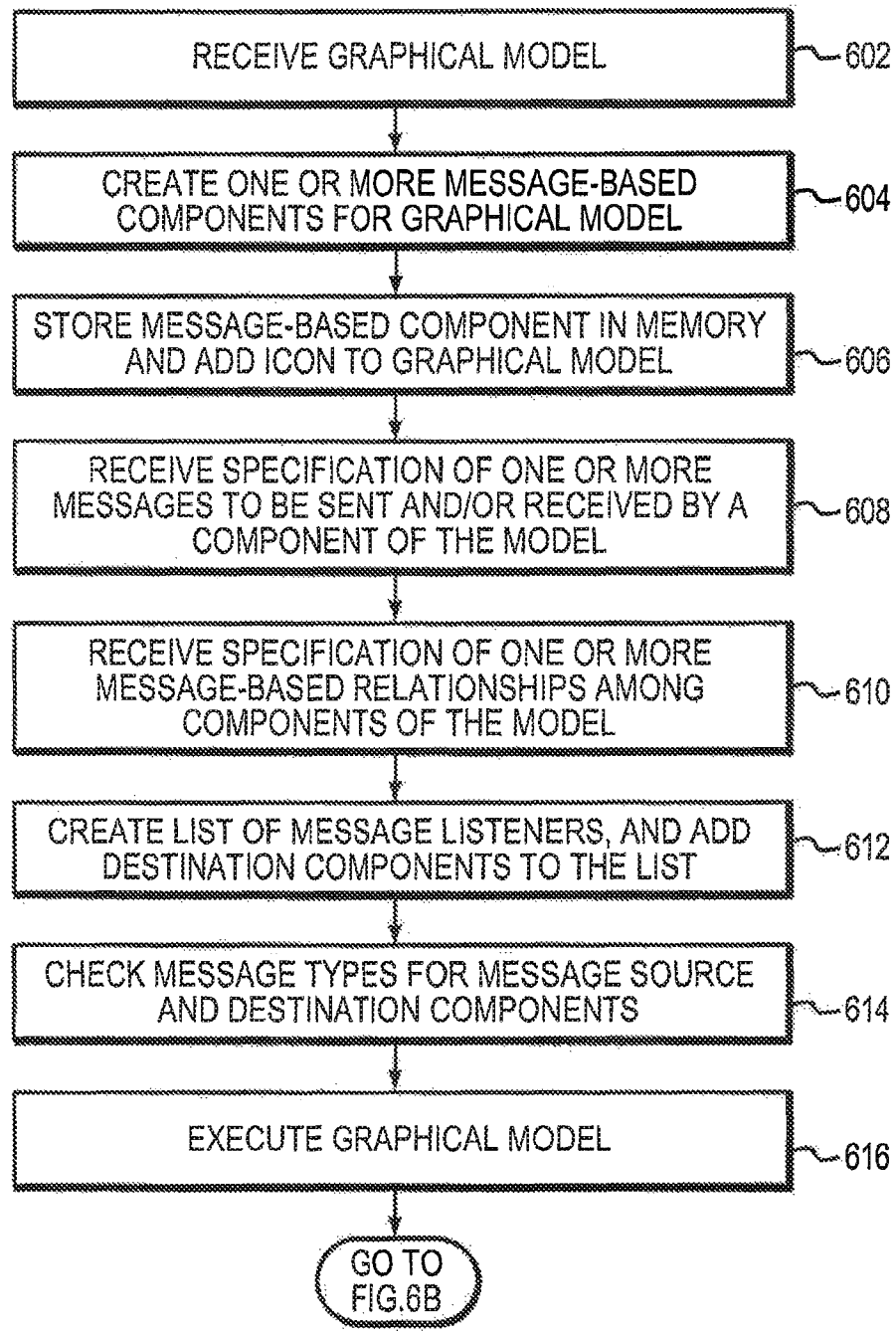
FIGS. 6A-6C are partial views of a flow diagram of an example method in accordance with an embodiment of the disclosure.
Figure 6B:
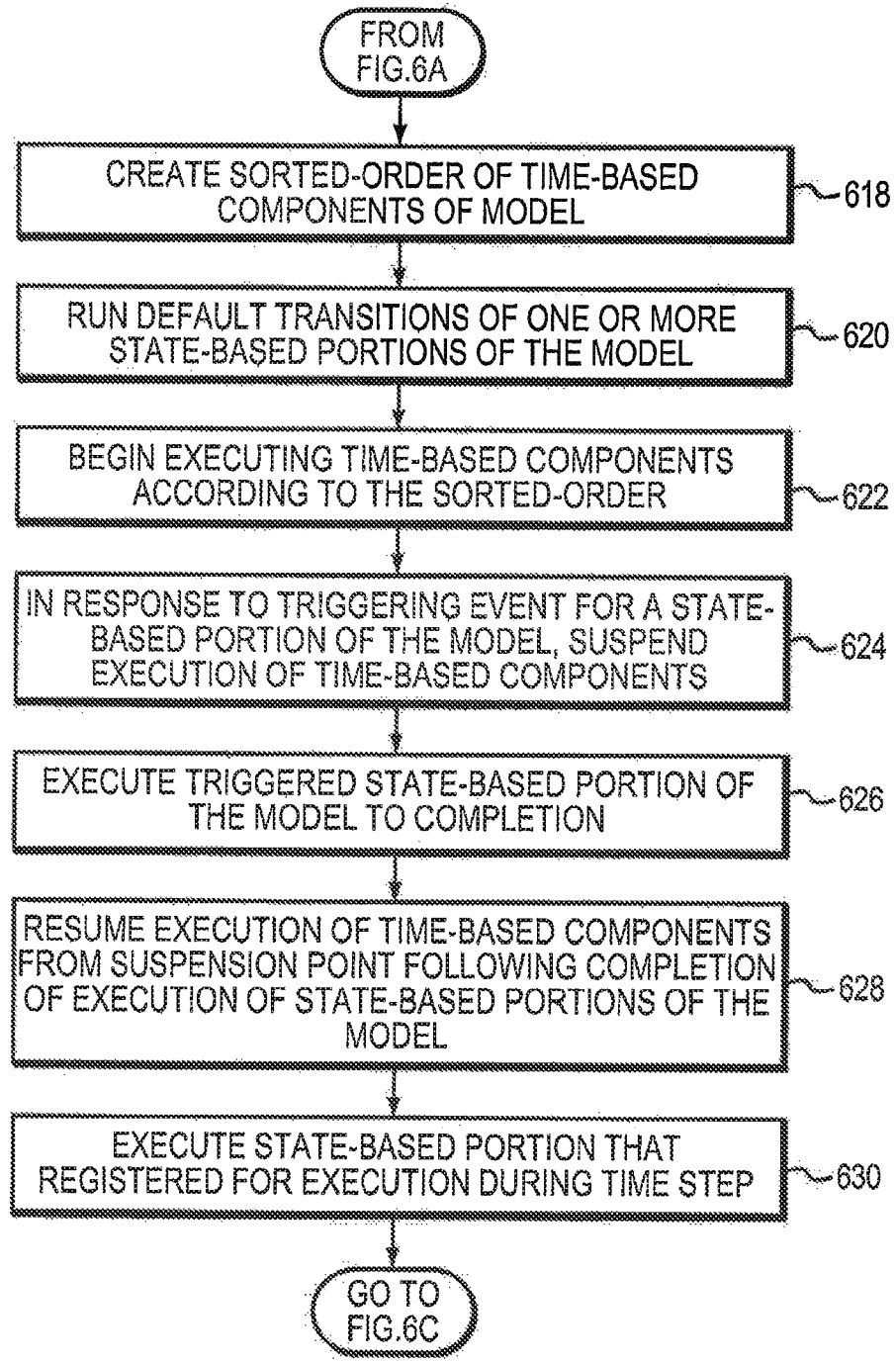
Figure 6C:
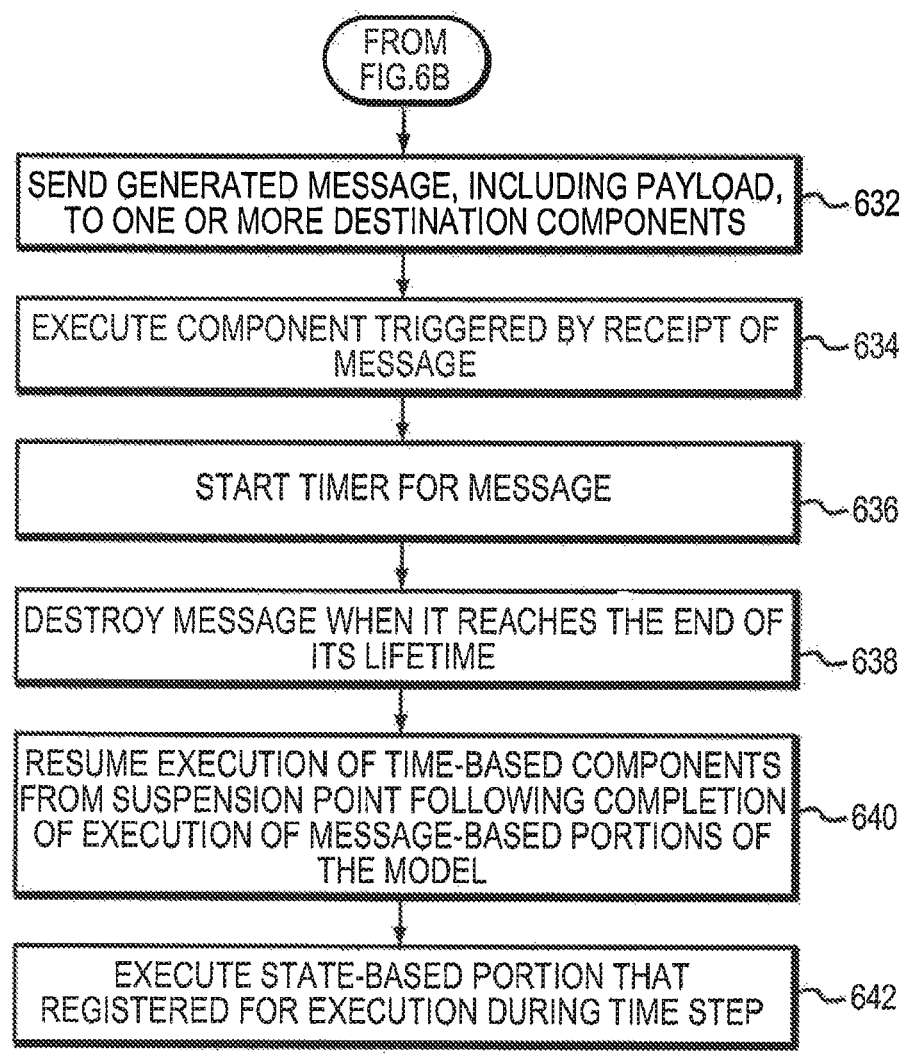

FIGS. 6A-C is a flow diagram illustrating exemplary processing for practicing an embodiment of the disclosure. The high-level modeling environment 200 may receive inputs from a user constructing or opening a model, as indicated at block 602. Environment 200 may support the creation of models through graphical, textual, or a combination of graphical and textual inputs. The user may operate and interact with environment 200 through the user I/O 106, such as the keyboard 116, mouse 118, and display 120. For example, the environment 200 and/or one or more of the message-based modeling system 202, the time-based modeling system 204, and the state-based modeling system 206 may present one or more model editor windows on the display 120. The model editor may include a plurality of graphical elements, such as a menu bar, a tool bar, and a canvas. In addition, the message-based modeling system 202, the time-based modeling system 204, and the state-based modeling system 206 may each provide a library browser window or palette that presents a plurality of component types. The user may select one or more component types from the library browsers or palettes, and place respective ones of those components on the canvas. The user may then connect the components, e.g., with connections, that may appear as lines or arrows on the canvas, thereby establishing message-based, mathematical time-based, state-based, dataflow, or other relationships among the components placed onto the canvas.

The environment 200 may also support the creation of a model programmatically.

In some embodiments, a user may select one or more types of message-based components from the library browser. In response, the constructor 224 may access the component class package 226, and create an object instance of the selected type, as indicated at block 604. The object instance may be stored in memory, such as main memory 104, and an icon, such as a block, may be added to the canvas, as indicated at block 606.

The user may configure one or more of the components of the model to generate and/or receive a message, as indicated at block 608. For example, a user may open a properties or other page associated with a selected message-based component that has been added to the canvas. The property page may include fields or other data entry elements for receiving information, for example, from the user, specifying a message type that the component is to receive. In response, the object constructor 224, or another module, such as the model builder 210, may add an input port to the block as presented on the canvas. Similarly, the property page, or another property page, may include fields and data entry elements for receiving information that specifies a message type that a selected component is to send. In response, an output port may be added to the block as presented on the canvas. In this way, a user may add a plurality of blocks representing message-based components to the canvas, and provide these blocks with input and output ports for receiving and sending messages.

The user may define message-based relationships among the message-based components of the model as well as the other components, as indicated at block 610. For example, the user may define a message-based relationship graphically by drawing a message-based connection between the input and output ports of message-based blocks. More specifically, the user may configure a given message-based component to receive a particular message by drawing a connection from the source of the message, such as the output port of another message-based component, to the respective input port of the given message-based component. Likewise, the user may configure a selected message-based component to send a message by drawing a connection from the respective output port of the selected message-based component to the destination of the message. In response to the definition of message-based relationships, e.g., by the user, the message-based execution engine 216 may add the destination component to a list of listeners for the respective message, as indicated at block 612. Specifically, the execution engine 216 may create a list of listeners for each message for which a message-based relationship has been defined in the model. If a message-based relationship is removed, for example, by the user deleting a message-based connection between two message-based blocks, the execution engine 216 may remove the destination component from the list of listeners for that message.

In some embodiments, model components operating in domains other than the message-based execution domain, may be configured to send or receive messages. For example, a user may draw a message-based connection between a message-based block and a block operating in another domain, such as the time-based domain, the state-based domain, the dataflow domain, etc Likewise, a user may draw a message-based connection from a block operating in another domain to a message-based block.

Figure 7A:
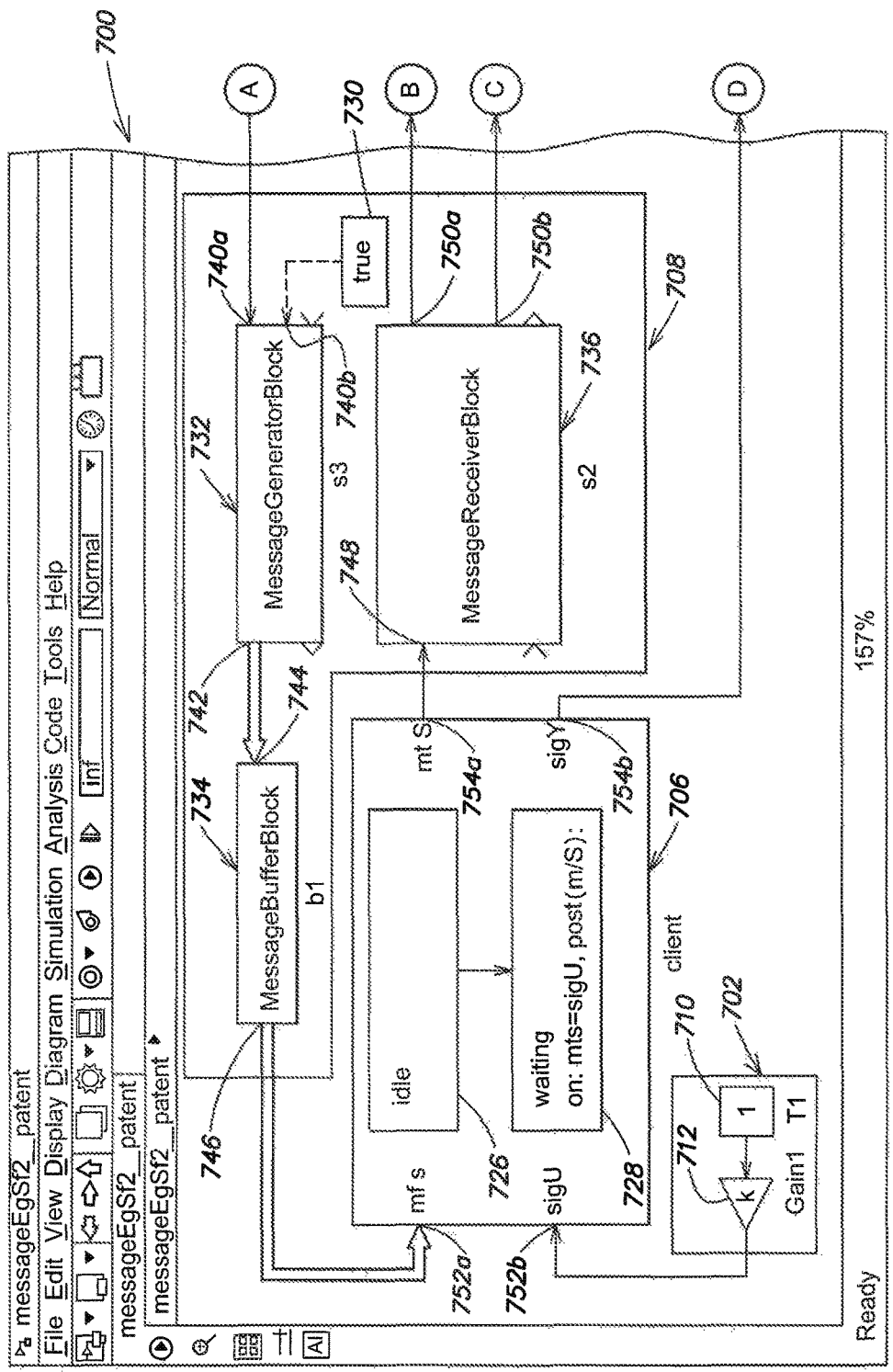
FIGS. 7A and 7B are partial views of an illustration of an example graphical model having executable semantics in accordance with an embodiment of the disclosure.
Figure 7B:
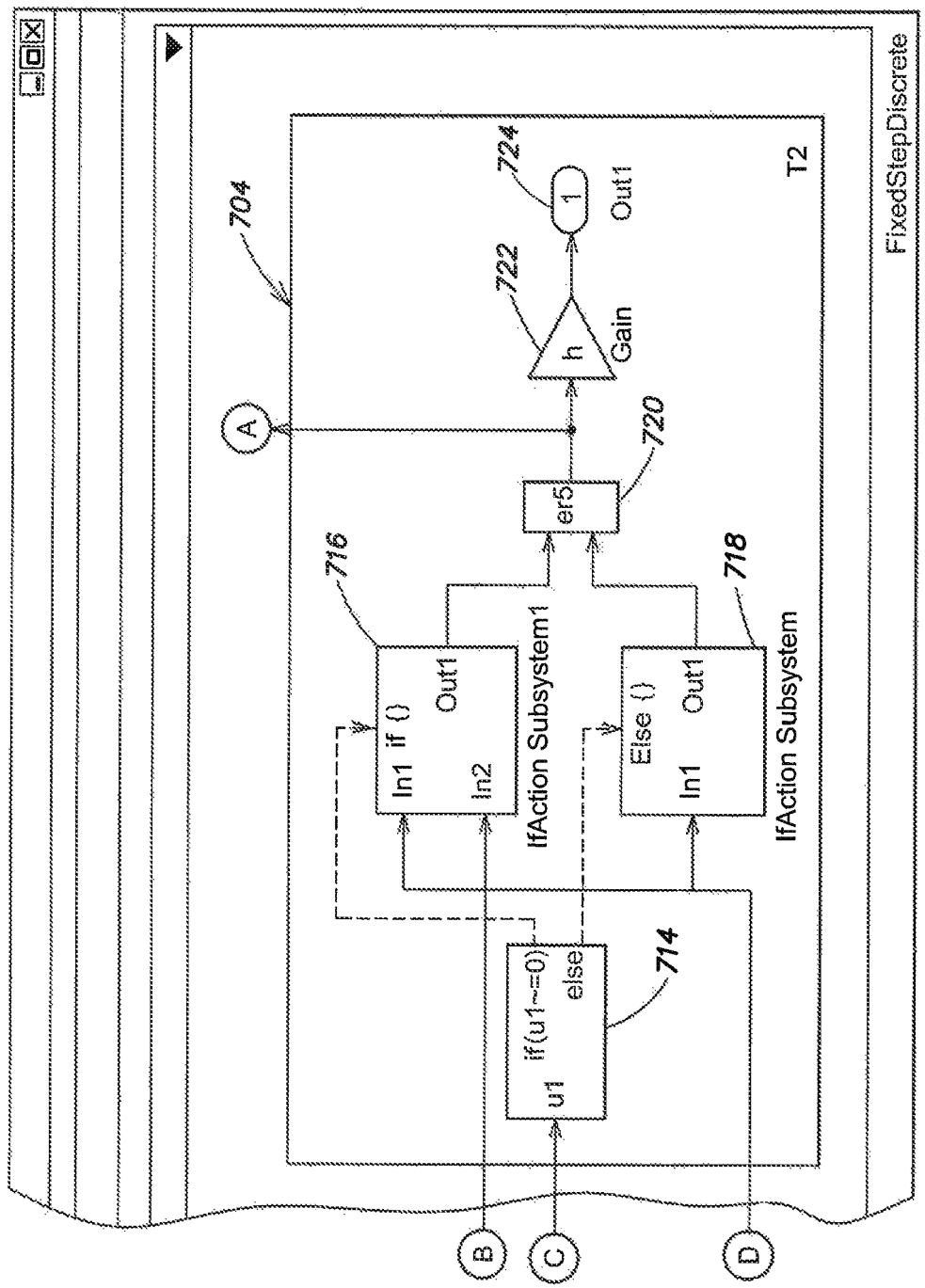

FIGS. 7A and 7B are partial views of a schematic illustration of an exemplary graphical model 700. The model 700 may be constructed and/or opened by a user. The model 700 may include a first time-based portion 702, a second time-based portion 704, a state-based portion 706, and a message-based portion 708. Each portion may include a plurality of components, such as blocks or subsystems. Specifically, the first time-based portion 702 may include a Constant block 710 and a Gain block 712. The second time-based portion 704 may include an If block 714, a first Subsystem 716, a second Subsystem 718, a Mux block 720, a Gain block 722, and an Outport block 724. The state-based portion 706 may include an Idle state 726 and a Waiting state 728. The message-based portion 708 may include a True block 730, Message Generator block 732, a Message Buffer block 734, and a Message Receive block 736.

The Message Generator block 732 may be configured to have two input ports 740*a*, 740*b*, each associated with a respective type of message that the Message Generator block 732 is interested in receiving. The Message Generator block 732 also may be configured to have one output port 742 that is associated with a message type that the Message Generator block may send. The Message Buffer block 734 may be configured with an input port 744 and an output port 746, each associated with a respective message type. The Message Receive block 736 may be configured with an input port 748 and two output ports 750*a*, 750*b*, each associated with a respective message type. In addition, the state-based portion 706 may be configured with a first input port 752*a* that is associated with a type of message, and a second input port 752*b* that is associated with a signal. The state-based portion 706 may be further configured with a first output port 754*a* that is associated with a type of message, and a second output port 754*b* that is associated with a signal.

In some embodiments, the data type of a message payload may specify the type of message.

Message-based relationships may be established among the time-based portions 702, 704, the state-based portion 706, and the message-based portion 708. For example, a user may connect various input and output blocks of the model 700 with message-based connections. In response, constructor 224 may create message object instances, and the execution engine 216 may establish message-based relationships among the respective portions or components of the model 700.

In some embodiments, before execution of the model 700, the propagation engine 214 may analyze the construction and configuration of the model 700 to determine whether, during execution of the model 700, those blocks that are configured to receive messages will receive the intended messages, as indicated at block 614. In particular, the message-based execution engine 216 and the model execution engine 208 may build an in-memory representation of the model 700, such as an intermediate representation (IR). The IR may include a plurality of nodes, that may represent the blocks of the model 700, and edges that represent connections within the model. The IR may also be annotated with additional information, such as the types of messages that destination blocks are configured to receive, the types of messages that source blocks are configured to send, etc. The IR may be created as part of a compilation stage that marks the start of model execution. This compilation stage may include preparing data structures and evaluating parameters, configuring and propagating block characteristics, determining block connectivity, and performing block reduction and insertion. In addition, one or more optimization techniques may be applied to the IR. After the application of an optimization technique, an additional IR may be generated. The propagation engine 214 may analyze one or more of these IRs.

The propagation engine 214 may evaluate this IR examining, for example, those elements of the IR that represent the input ports of message-based and other blocks. The propagation engine 214 may determine the type of message that the given message-block expects to receive on a subject input port. The propagation engine 214 also may identify the upstream block that is connected to the subject input port of the given message-based block. The propagation engine 214 may determine the type of message issued by this upstream block. In addition, the engine 214 may determine whether the type of message defined for the output port of the source component complies with the type of message defined for the input port of the destination component. If a mismatch is identified by engine 214, it may be reported. For example, an error message or error report may be generated and presented, for example on the display 120 for review by the user.

The model 700 may be simulated, e.g., executed or run. For example, the model editor window may include a Run command button that may be selected by the user, e.g., with the mouse 118. Alternatively, the user may enter a text-based run command, for example, in a Command Line Interface (CLI), or the model may be run programmatically.

In some embodiments, the model execution engine 208 interfaces with the time-based system 204, the state-based system 206, and the message-based system 202 to execute the entire model 700, as indicated at block 616.

In some embodiments, the time-based modeling system 204 may create a sorted order of the time-based components of the model 700, as indicated at block 618. The sorted order may refer to the order in which to invoke block methods, during execution of the model 700. Exemplary block methods for time-based components may include an output method that computes the output signals of the block based on its input signals and its state, an update method that computes the block's states, and a derivatives method that computes the derivatives of the block's continuous states. Time-based components that are configured to execute together may be identified as a group in the sorted order. For example, a time-based subsystem may include a plurality of time-based blocks, and the subsystem may be configured to run as an atomic subsystem. In this case, all of the time-based blocks of the atomic subsystem execute atomically as a group. The time-based modeling system 204 may also define a simulation start time, a simulation end time, and a plurality of time steps between the start and end times. The size of the time steps may depend on the particular solver being used to execute the model. The solver may start evaluating equations, for example Ordinary Differential Equations (ODEs), for the model at the start time, evaluate the equations at each time step, and stop evaluating the equations at the end time.

Input and output signals may be represented graphically in the model or block diagram by arrow elements extending between time-based blocks. Input and output signals represent quantities, for example, input and output data that change over time during the execution of the model, and the quantities represented by the signals may be defined, and thus have values, for all points in time between a model's start time and its stop time. Execution of a model may also be referred to as simulation of the model.

In some embodiments, one or more initialization steps may be performed before execution of the model begins. For example, one or more state-based portions of the model may execute one or more default transitions, as indicated at block 620. Initialization steps for message-based portions of the model may involve typical operations, such as dequeuing a waiting message.

For each time step of the simulation, which may begin with the simulation start time, execution of model may proceed as follows. The time-based modeling system 204 in cooperation with the model execution engine 208 may begin executing the time-based components of the model according to the sorted order, as indicated at block 622. If an event that is a triggering event for a state-based portion of the model occurs, the execution of the time-based components may be suspended, as indicated at block 624. The triggered state-based portion may be executed as an atomic unit, for example, by the state-based modeling system 206 in cooperation with the model execution engine 208, as indicated at block 626. Upon completing the execution of the state-based portion, the execution of the time-based components may resume from the point in the sorted-order at which execution had been suspended, as indicated at block 628. For example, the model execution engine 208 may record where in the sorted order the execution was suspended to execute the state-based portion.

In some embodiments, an input triggering event may occur outside of a state-based portion, for example, by a time-based or other component, but may be visible within the state-based portion. Exemplary input trigger events may include an edge-triggered input event and a function call, for example, from a time-based component. An edge-triggered input event may be configured to operate on a rising edge, a falling edge, or either a rising or falling edge. To operate as an input edge-triggered input event, a signal from a time-based component may need to cross zero, such as a changing from −1 to 1. In contrast, a function-call input event may consist of an instantaneous flow of control from a caller subsystem to a callee subsystem. A triggering event for a state-based portion, whether it is an edge, function call or other trigger, may not provide any input data to the state-based portion, which the state-based portion might otherwise use for processing, for example to generate output data. Instead, the triggering event may operate as a control signal that triggers execution of the state-portion, and the state-based portion may operate upon input data that is internal to the state-based portion, or that is received in other ways besides a triggering event.

If the triggering event for the state-based portion occurs during the execution of a group of time-based components that are configured to execute atomically, then the execution of the entire group of time-based components may be completed. Further execution of time-based components may then be suspended, and the execution of the triggered state-based system performed.

If a message is generated and sent, for example, during the execution of time-based components according to the sorted order, then the execution of time-based components may be suspended, as indicated at block 630. The message-based execution engine 216 may examine the list of listeners for the respective message. The execution engine 216 may send the message to the components on the list of listeners, as indicated at block 632. If the destination component is triggered by the receipt of the message, the execution engine 216 may execute the destination component, as indicated at block 634. The message-based execution engine 216 may also start a timer associated with the generation of a message, and may track the age of the message, as indicated at block 636. For example, the engine 216 may use the clock 212 to operate one or more timers. When the age of the message reaches its maximum age, which may be indicated in message's TTL field 508, the message may be destroyed by the message-based execution engine 216, as indicated at block 638. Each message may thus persist for only a defined time period during the execution of a model.

Upon completing the execution of the components triggered by the message, the execution of the time-based components may resume from the point in the sorted-order at which execution had been suspended, as indicated at block 640.

It should be understood that the model execution flow described in connection with one or more of steps 622 to 640 may be nested. For example, the execution of a state-based portion may generate a message triggering the execution of a message-based portion, which may trigger the execution of a state-based portion, and so on.

It should be understood that a message may be sent to a message-based component, a state-based component, a time-based component, or some other component. In addition, the message-based component, the state-based component, and the time-based component may execute in response to the received message.

The life-time of a message may depend on the semantics of the message processing environment. A message implemented using function-call semantics may get created and consumed in the same time-step, thus resulting in a lifetime of a single time-step. In the presence of queuing semantics, messages can be produced in one time-step but wait in a message queue for a number of time-steps before they are consumed. In addition, the consumer can choose to process a message without consuming the message, thus resulting in messages with potentially infinite lifetime.

In some embodiments, instead of sending a message to a destination component, the message-based execution engine 216 may notify a destination component that a message has been created. In response, the destination component may retrieve the message. If the destination component fails to retrieve the message before its maximum age is reached, the message may be destroyed before ever being retrieved.

In some embodiments, a message-based component may be configured, upon sending a message, to expect a reply to its message. Such a component may be configured to execute in a synchronous or asynchronous manner. For example, the component may be configured to execute synchronously in which case the component, after sending its message, waits to receive the reply before continuing with its execution. Alternatively, the component may be configured to execute asynchronously in which case the component, after sending its message, proceeds with its execution without waiting for the reply.

In some embodiments, a state-based portion of the model may be configured to execute during a time step even though no triggering event for that state-based portion occurred during the time step. More specifically, a state-based portion may register for time-based triggering. If the model includes a state-based portion that is registered for time-based triggering, and the state-based portion has not already executed during the current time step, then the model execution engine 208 may execute the state-based portion, as indicated at block 642.

At this point, execution during the current time step may be complete. If the current time step does not equal the simulation end time, the current time step may be incremented and the execution process may be repeated. This process, for example steps 622 to 640, may be repeated for each time step between the simulation start time and the simulation end time.

Referring to model 700 (FIGS. 7A and 7B), execution at each time step may proceed as follows. Time-based Constant and Gain blocks 710 and 712 may execute first as they may be the first blocks in the sorted order. The signal output of Gain block 712 may be a trigger event for the state-based portion 706. Accordingly, after Gain block 712 executes, execution of other time-based components may be suspended, and the state-based portion 706 may be executed. The Message Receiver block 736 is configured to listen for a message from the state-based portion 706 on input port 748. If the execution of the state-based portion 706 results in the generation and sending of this message, the message is received by Message Receiver block 736 causing it to be executed. Next, the blocks of the second time-based portion 704 execute following the completion of execution of the Message Receiver block 736, assuming it executes. Execution of the second time-based portion 704 results in the generating and sending of a message that is received by the Message Generator block 732. If the second time-based portion 704 is configured as an atomic subsystem, then all of its blocks, including Gain block 722 and Outport block 724 will execute before the Message Generator block 732 executes. On the other hand, if the second time-based portion 704 is not configured as an atomic subsystem, then the Message Generator block 732 may execute before execution of the Gain block 722 and Outport block 724.

If the execution of the Message Generator block 732 results in the generation and sending of a message, then the Message Buffer block 734 may execute, as it is triggered by such a message. If the execution of the Message Buffer block 734 results in the generation and sending of a message, then the state-based portion 706 may execute again.

At this point, execution of the current time step may be complete. The model execution engine 208 may increment the time step and execute the model 700 again, unless the simulation end time has been reached.

Figure 10:
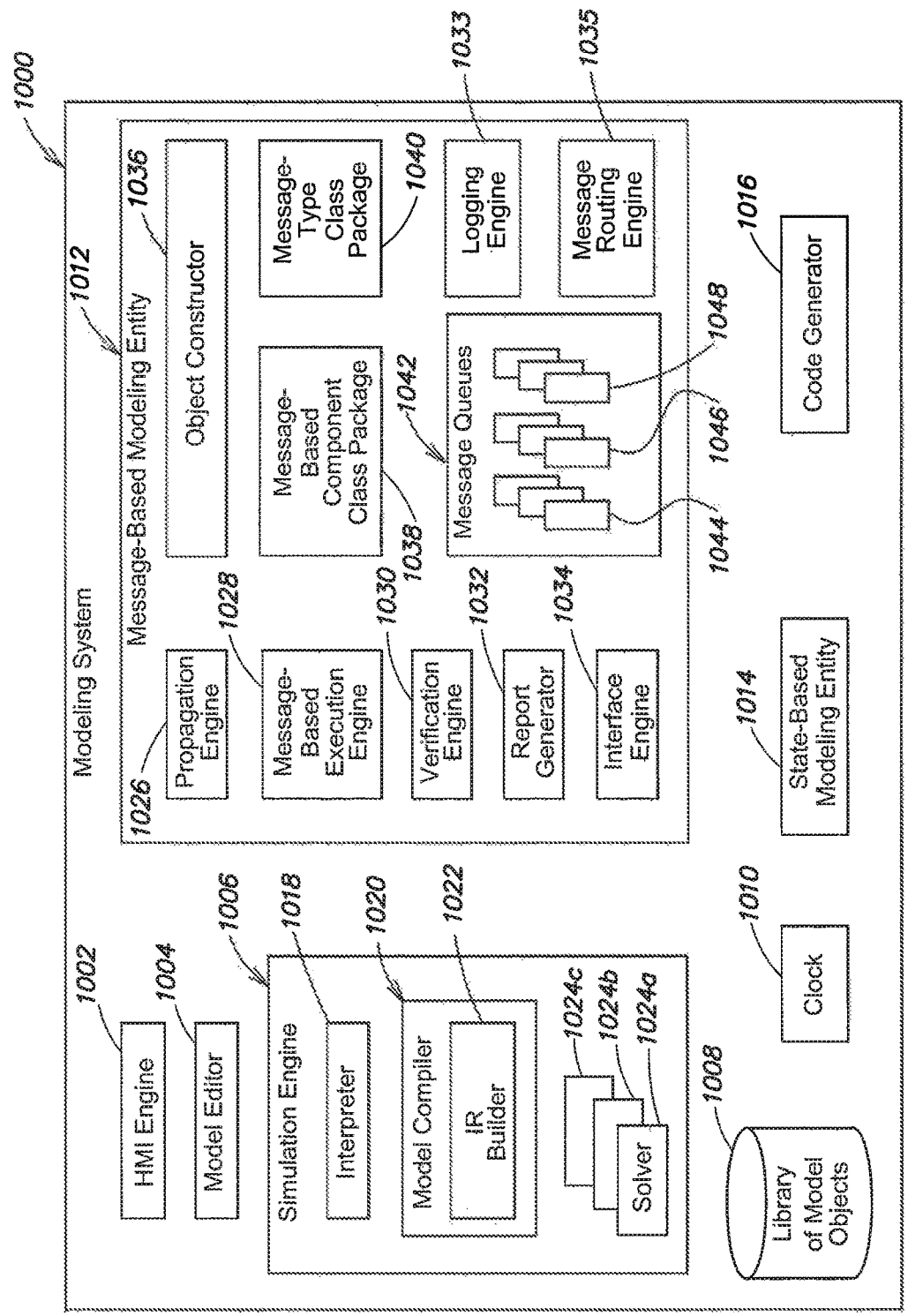
FIG. 10 is a schematic, functional diagram of an example modeling system in accordance with an embodiment of the disclosure.

FIG. 10 is a schematic, functional diagram of a modeling system 1000 in accordance with an embodiment of the disclosure. The modeling system 1000 may include a plurality of components or modules. Specifically, the modeling system 1000 may include a human-machine interface (HMI) engine 1002, a model editor 1004, a simulation engine 1006, a library 1008 of model objects, a clock 1010, a message-based modeling entity 1012, a state-based modeling entity 1014, and a code generator 1016. The simulation engine 1006 may include an interpreter 1018, a model compiler 1020 that, in turn, may include one or more Intermediate Representation (IR) builders, such as IR builder 1022, and one or more, and preferably a plurality, of solvers, such as solvers 1024*a-c*. The HMI engine 1002 may be configured to create and present one or more User Interfaces (UIs), such as Graphical User Interfaces (GUIs), on a display screen of a workstation or other data processing device. The GUIs may be operated by users to initiate various model-related tasks, such as opening, creating, editing and saving models. The model editor 1004 may be configured to perform the selected operations, such as open, create, edit, and save, in response to the user inputs. The simulation engine 1006 may be configured to execute, e.g., compile and run or interpret, models or at least portions thereof, such as computer-generated simulation models, created or opened by the user, using one or more of the solvers 1024*a-c*. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink 7 User's Guide* from The MathWorks, Inc. (March 2014 ed.).

The library 1008 of model objects may include a plurality of predefined object types or classes, including time-based object types, state-based objects, and message-based object types, among others. Exemplary state-based objects or components include state charts, bubble charts, junctions, transitions, conditions, and flow graphs, among others. To create a model, a user may, among other operations, select a plurality of object types from the library 1008. In response, the modeling system 1000 may add instantiations of the selected objects to the model being constructed or edited.

The clock 1010 may be configured to generate one or more clock or time signals that may be used during execution of a model.

The message-based modeling entity 1012 may include a propagation engine 1026, a message-based execution engine 1028, a verification engine 1030, a report generator 1032, an interface engine 1034, a logging engine 1033, a message routing engine 1035, an object constructor 1036 that may access one or more class packages, such as message-based component class package 1038 and a message-type class package 1040. The message-based modeling entity 1012 also may include or have access to message queues as indicated at 1042.

The HMI engine 1002, model editor 1004, simulation engine 1006, message-based modeling entity 1012, state-based modeling entity 1014, and code generator 1016 may each comprise registers and combinational logic configured and arranged to produce sequential logic circuits. In some embodiments, the HMI engine 1002, model editor 1004, simulation engine 1006, message-based modeling entity 1012, state-based modeling entity 1014, and code generator 1016 are or include software modules or libraries containing program instructions pertaining to the methods described herein, that may be stored on computer readable media, and executable by one or more processors and/or processing elements. Other computer readable media may also be used to store and execute these program instructions. In alternative embodiments, various combinations of software and hardware, including firmware, may be utilized to implement embodiments of the disclosure.

The modeling system 1000 may receive inputs by a user as the user creates, edits, revises, and/or opens one or more models, such as computer models that, when executed, simulate the operation of systems, such as physical systems. A model may be specified graphically, textually, or a combination of graphically and textually, and may include a plurality of portions each operating according to a different execution domains. For example, a first portion may operate according to message-based semantics, a second portion may operate according to time-based semantics, and a third portion may operate according to state-based semantics. Other domains may include dataflow, control flow, and combined data and control flow domains. The time-based and/or the state-based portions may further operate in accordance with message-based semantics. The simulation engine 1006 in cooperation with the message-based execution engine 1028 may execute the model generating one or more results that may be presented to the user.

In some embodiments, the modeling system 1000, including the message-based modeling entity 1012, may be configured to implement a message-based modeling architecture in which producer/sender objects of a model generate messages that are received consumer/receiver objects during execution of the model. The model objects may be specified graphically, textually or a combination of graphically and textually. In some embodiments, messages may be instances of message types, and may include payloads comprising one or more data elements that may be fixed during execution of the model, for example a message's data does not change over the model's execution time. In some embodiments, a message payload value may be modified, e.g., during the message's time interval. Messages also may include one or more commands, such as operation codes (opcodes).

In some embodiments, a model or at least a portion thereof may represent a dynamic system that defines relationships between signals and state variables that change over time. Determining the behavior of a dynamic system may involve evaluating these relationships at a plurality of intervals, which may be called time steps, beginning at a start time and ending at a stop time. The process of solving a model at successive time steps may be referred to as simulating the system that the model represents.

In addition, sample times and sample rates may be determined, e.g., at model compilation stage, for at least some components of a model, such as one or more objects or blocks of the model. A block's sample time may be set explicitly by a user or programmatically, e.g., by setting a SampleTime parameter of the block, or it may be determined in an implicit manner based on the block's type and/or its context within the model. A block's SampleTime parameter may be a vector $[T_s, T_o]$ where $T_s$ is the sampling period and $T_o$ is the initial time offset. One or more of the solvers 1024 used to 'solve' the model may determine the size of the simulation time steps in order to execute the model, and these simulation time steps may be selected to correspond with the sample times of the blocks of the model. When a simulation time step matches the sample time for a block, a sample time hit occurs, and the block may be scheduled for execution during that simulation step.

In some implementations, if all of the model elements included in a model execute at the same sample time, the model is said to be a single-rate model. A single-rate model may be executed using a single task timed to run at a single rate. In some implementations, if a model includes model elements configured to run at two or more sample times, the model is said to be a multi-rate model. A multi-rate model may be executed using multiple tasks timed to run at different rates. The tasks may be assigned priorities and the priorities may be different. A multi-rate model may be analyzed, and a base rate may be determined, for example, that is the greatest common denominator of the sample times in the model. The base rate may be the fastest rate in the model, and may also be referred to as the fundamental sample time of the model. In addition to the base rate, one or more harmonic rates that correspond to the other sample times of the model and are integer multiples of the base rate, may be determined. Execution of the tasks of the multi-rate model may be timed based on the base rate and the one or more harmonic rates.

In some embodiments, an execution clock may be defined for a single-rate model or a multi-rate model. For a multi-rate model, the execution clock may operate on an integer schedule of the base rate of the model that corresponds to the harmonic rates. An execution clock may be implemented using an integer counter that may be associated with the execution of a task, a piece of code, functionality, etc. When the integer counter reaches a certain integer value, the task, piece of code, functionality, etc. is executed. Harmonic rates may refer to a hyperperiod, e.g., a largest integer value, after which the execution clock, such as an integer counter, may be reset. Harmonic rates may refer to the execution of the tasks, pieces of code, functionality, etc. at integer multiples of a base rate of a model. The base rate may correspond to the fastest sample time in the model or it may be an execution rate. For example, a model with sample rates two and three may execute with an integer clock on a base rate of 1, even though that is not a sample rate in the model.

The multiple tasks utilized to execute the multi-rate model may be triggered for execution in response to the advance of the execution clock. The execution clock may be software-based or hardware-based. In some embodiments, the execution clock may be implemented as one or more model elements, such as a Clock block, of a model. By providing an execution clock, execution of a single-rate model or multi-rate model may be clock-based, rather than being based on a timed schedule. When code is generated for the model, the generated code may include one or more functions or other code portions implementing the execution clock.

As described, messages may not be associated with or have a sample rate. Accordingly, in some embodiments, an integer clock may not be used in determining when to execute, e.g., generate and/or send, messages. Nonetheless, in some implementations, message execution may be reconciled with an integer clock. For example, message execution times may be aligned with a very small base rate. In other embodiments, a floating point time scale, sometimes referred to as real or continuous, may establish execution times for messages in an event calendar. Additionally, a base rate defining an event with a corresponding time may be associated with the event calendar. When the base rate event executes, an integer clock may be evaluated, and corresponding tasks, pieces of code, functionality, etc., which may execute messages, are executed.

The solver 1024 may generate an execution schedule for components, including objects or blocks, of the model over the course of the model's simulation time. In addition, one or more message-based components may be configured to execute at particular sample times. That is, the message-based components may be scheduled for execution at one or more time steps that correspond to sample time hits for the message-based components.

As noted, messages may persist for determined time intervals of an execution time of a model where the time interval is less than the full or entire execution time of the model. For example, a model may be or may include a time-based portion, and may execute over a simulation time that begins at a simulation start time and ends at a simulation end time. If a model is being used to simulate a system intended to run indefinitely, the simulation end or stop time may be set to infinite. One or more of the solvers 1024 chosen to "solve" the model may determine the execution time steps for the model. The time-based portion of the model may produce signals that have a value throughout the execution time of the model, and the value may change dynamically during the model's execution. Messages, on the other hand, may persist for a discrete, limited portion of a model's simulation time. Messages may be configured to be triggering in which case, when a message is generated, a consumer/receiver object is activated, e.g., woken up, and run in order to process the message. The consumer/receiver object may process the message according to the object's normal execution schedule, e.g., as determined by the solver 1024. Alternatively, messages may be configured to be non-triggering in which case, while a consumer/receiver object may be woken up upon generation of a message, the consumer/receiver object is not required to process the message immediately. Instead, the consumer/receiver object, when activated, may examine a message queue to determine whether there is a message present in the queue, and if so may process, e.g., consume, the message. Activation of the consumer/receiver object may occur at some time after the message was generated and placed in the message queue. Messages also may be blocking or non-blocking. With a non-blocking message, a producer/sender may post a message, and then run to completion before a consumer/receiver of the message is activated, e.g., woken up. With a blocking message, the producer/sender object may be configured to enter a wait state upon posting a message, and execution may switch to the consumer/receiver object. Once execution of the consumer/receiver object completes, execution of the producer/sender may resume. In some embodiments, the message-based modeling entity 1012 may be configured such that messages are non-triggering and non-blocking. In these embodiments, if a producer/sender object wishes to receive an acknowledgement to a message, the producer/sender object may enter a wait state explicitly.

Message Queuing

As noted, the message-based modeling entity 1012 may establish one or more message queues 1042 configured to store messages generated by producer/sender objects of a model during execution of the model. The message queues 1042 may be accessed by consumer/receiver objects to retrieve messages stored therein. In particular, as part of a model initialization or set-up phase, the message-based modeling entity 1012 may request allocation of one or more data structures, e.g., in main memory 104 (FIG. 1), to establish the message queues 1042. Exemplary data structures include linked lists, circular queues, etc. Messages, or alternatively message payloads, generated by producer/sender objects of a model may be placed and stored in the message queues 1042.

In some embodiments, a producer/sender object may be configured to specify a particular one of the queues 1042 to store messages generated by the producer/sender object. One or more message queues, such as message queues 1044 may be global queues for storing messages generated by any message producer/sender object and intended for any consumer/receiver object. One or more other message queues, such as message queues 1046, may be local to one or more message-based objects, such as a producer/sender or consumer/receiver object. In addition, one or more message queues, such as message queues 1048, may be shared by a group of objects. For example, a group of consumer/receiver objects that are configured to receive certain messages during execution of the model, such as messages from the same producer/sender object, may share one of the shared message queues 1048.

Message queues 1042 may have a plurality of attributes or properties, such a length, a processing order, and an overflow policy, which may be specified through corresponding properties. The attributes or properties may be fixed or they may be settable, e.g., by a user, on a queue by queue basis. Exemplary lengths include 1, 2, 3, etc., such that the message queue may store one, two, three, etc. messages. Exemplary processing orders include First In First Out (FIFO), Last In Last Out (LIFO), and priority-based queuing, among others. An exemplary overflow policy is delete/replace oldest message if message queue is full when a new message is received/posted, which may be referred to as a drop tail policy. With an overflow policy a producer/sender object may continue to send messages to the message queue. That is, the producer/sender object may not be blocked from sending further messages when a message queue is full.

In further embodiments, at least some of the message queues 1042 may be configured with a priority attribute or property, and may thus be assigned priorities, such as a high priority message queue, a moderate priority queue, and a low priority message queue. A producer/sender object may designate one of the message queues 1042 to hold a given message. For example, for a message having high importance, the producer/sender object may designate the high priority message queue. For a message having moderate or low importance, the producer/sender object may designate the moderate or low priority message queues. A message receiver/consumer may be configured to process messages from a higher priority queue before processing messages from a lower priority queue irrespective of the chronological order, e.g., in terms of model execution time, of the messages in the two queues.

In some embodiments, the interface engine 1034 of the message-based modeling entity 1012 may be configured to provide, within an executable graphical model, one or more graphical objects, such as icons, blocks, etc., that represent a message queue. The message-based modeling entity 1012 may be configured to add one or more message queue objects to a graphical model automatically or in response to user action, such as selection and drag and drop operations.

Figure 19:
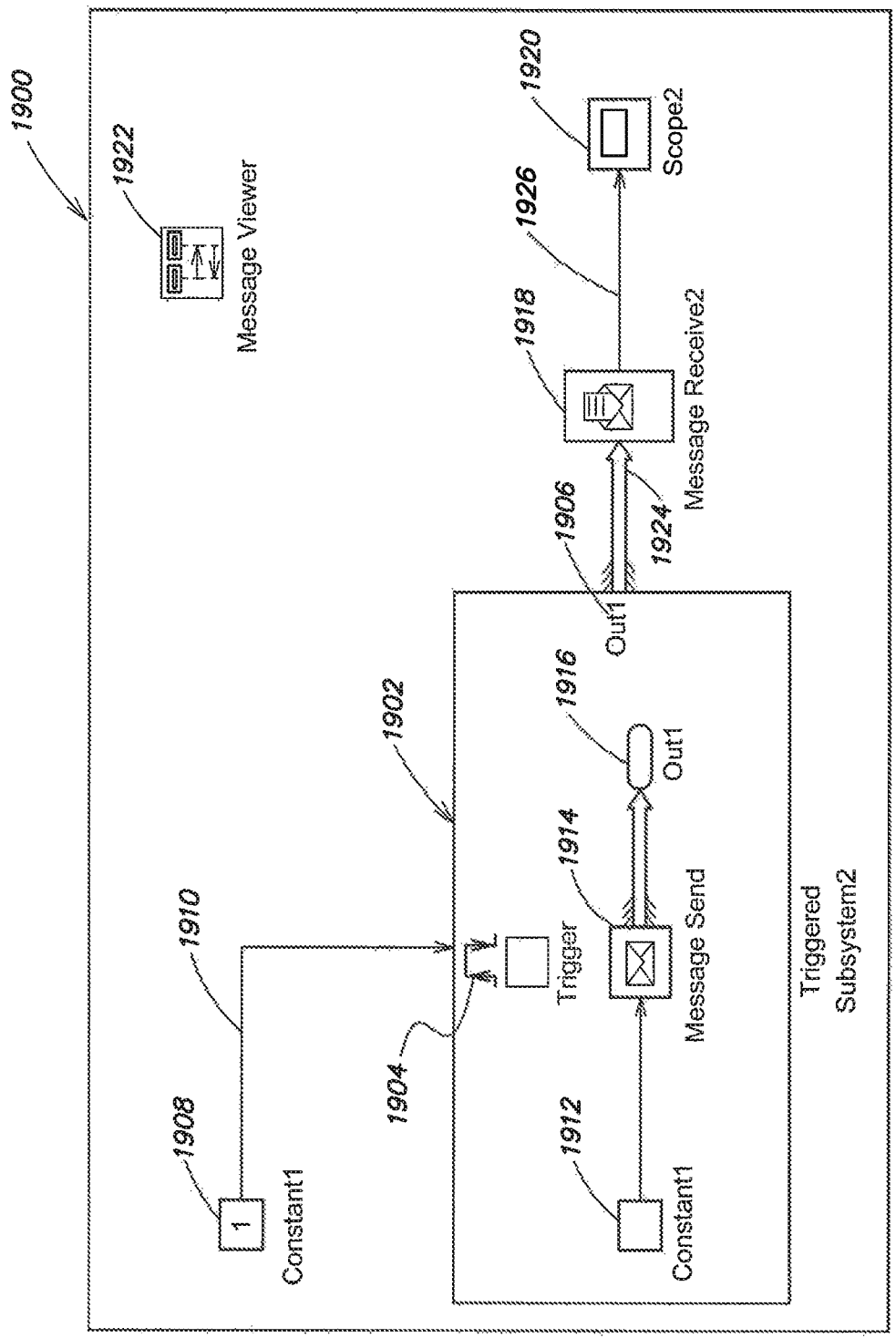
FIG. 19 is a schematic illustration of an example graphical model having executable semantics in accordance with an embodiment of the disclosure.

FIG. 19 is a schematic illustration of a graphical model 1900 having executable semantics, which may be presented on a model editor window of a data processing device, such as a workstation, a laptop computer, a tablet computer, etc. The model 1900 may include a plurality of graphical objects, such as blocks, icons, etc. Specifically, the model 1900 may include a subsystem (Triggered Subsystem2) block 1902 having a trigger input 1904 and an output port (Out1) 1906. The model 1900 also may include a first constant block 1908 that is connected to the trigger input 1904 by a first single line arrow 1910. The subsystem block 1902 may represent a plurality of blocks, such as a second constant block 1912, a Message Send block 1914, and an outport (Out1) block 1916, which may correspond to the subsystem's output port 1906. The Message Send block 1914 may be configured to generate and send messages during execution of the graphical model 1900, and these messages may be provided to the subsystem's output port 1906 for receipt by other model objects or blocks. The model 1900 also may include a Message Receive block 1918, a Scope block 1920 and a Message Viewer block 1922. The Message Viewer block 1922 may be configured to present a message viewer window that may provide a trace of at least some of the messages generated during execution of the graphical model 1900.

The model 1900 may include a first double line arrow 1924 that connects the subsystem's output port 1906 to the Message Receive block 1918 to indicate that the Message Receive block 1918 is to receive the messages generated by the Message Send block 1914 of the subsystem 1902. A second single line arrow 1926 may connect the Message Receive block 1918 to the Scope block 1920. As noted, a first graphical affordance, e.g., a double line arrow, may be used to represent message connections among message send and receive blocks, while a second graphical affordance, e.g., a single line arrow, may be used to represent signals of the model 1900. In some embodiments, the message-based modeling entity 1012 may be configured to establish at least one message queue automatically in response to the Message Receive 1918 being added to the model 1900 and configured to receive messages from the subsystem 1902. During execution of the model 1900, messages generated and sent by the subsystem 1902 may be stored in this message queue for receipt and possibly consumption by the Message Receive block 1918.

Figure 20:
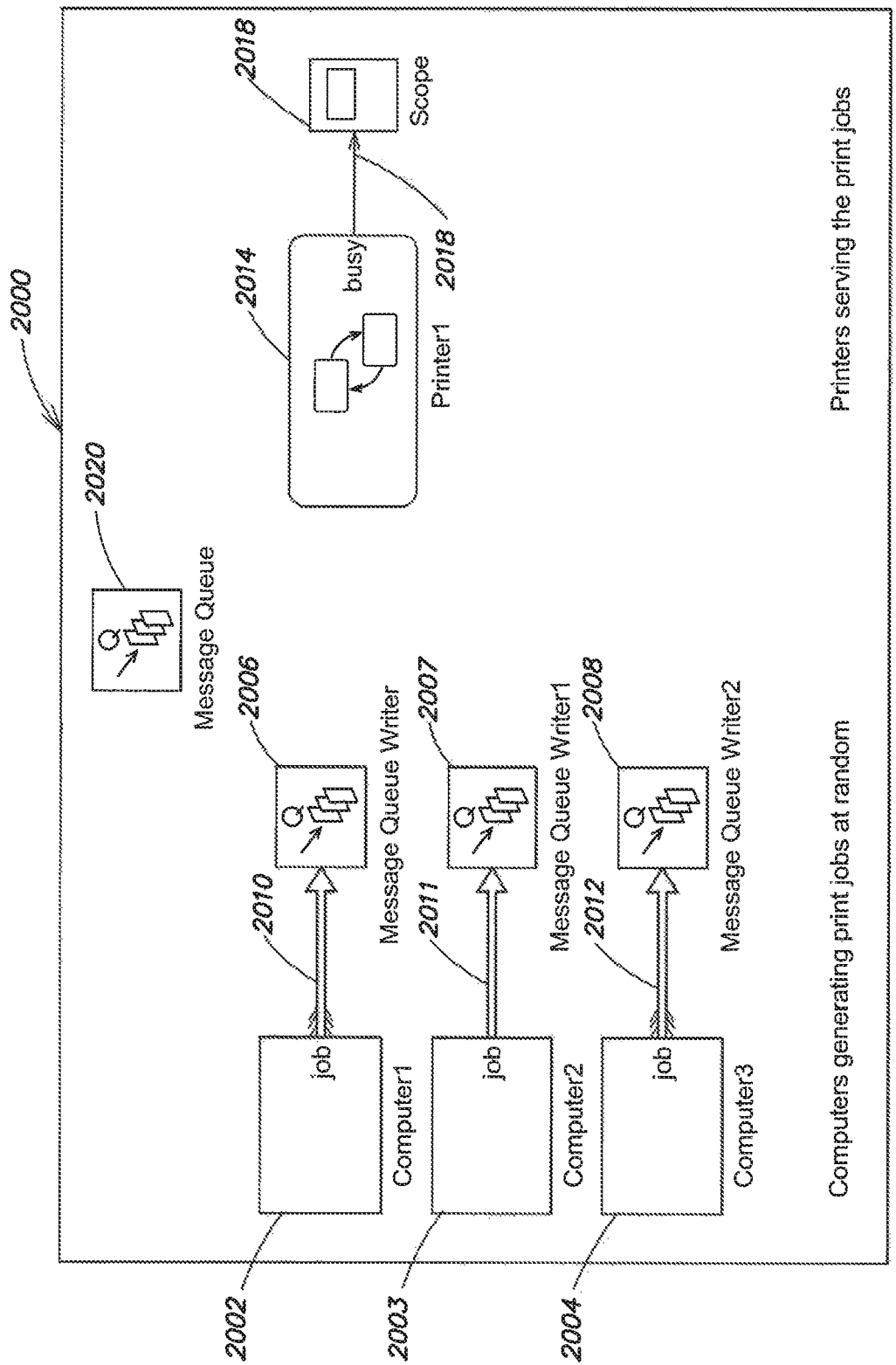
FIG. 20 is a schematic illustration of an example graphical model having executable semantics in accordance with an embodiment of the disclosure.

FIG. 20 is a schematic illustration of another graphical model 2000 having executable semantics, which may be presented on a model editor window of a data processing device. The model 2000 may include a plurality of graphical objects, such as blocks, icons, etc. Specifically, the model 2000 may include first, second, and third subsystems 2002-2004, which are labeled 'Computer1', 'Computer2', and 'Computer3'. The first, second, and third subsystems 2002-2004 are configured to model computers that generate print jobs. The model 2000 also includes first, second, and third Message Queue Writer blocks 2006-2008, labeled 'Message Queue Writer', 'Message Queue Writer 1', and 'Message Queue Writer 2', that are configured to receive messages generated by the first, second, and third subsystems 2002-2004, respectively, as indicated by the first, second, and third double-lined arrows 2010-2012. The model 2000 also may include a state chart 2014 labeled 'Printer1' that is coupled to a scope block 2016 by a single line arrow 2018 that represents a signal. Print jobs may be represented by messages generated by the first, second, and third subsystems 2002-2004 during execution of the model 2000. In addition, the state chart 2014 may be configured to receive these messages, and simulate the printing of these print jobs. In addition, one or more message queue blocks, such as message queue block 2020 may be included in the model 2000. The message queue block 2020 may represent a message queue configured to store the messages generated by the first, second, and third subsystems 2002-2004 pending receipt by the state chart 2014. As shown, the message queue block 2020 need not be connected to the first, second, and third subsystems 2002-2004 or the first, second, and third Message Queue Writer blocks 2006-2008, e.g., by an arrow, wire, or other graphical affordance. Nonetheless, the message queue represented by the message queue block 2020 may store messages generated by these blocks during execution of the model 2000. The message queue block 2020 thus represents a form of wireless queuing.

In some embodiments, a properties page may be associated with the message queue block 2020. The properties page may include a plurality of settable entries through which a user may specify attributes or properties of the message queue represented by the message queue block 2020, such as length, processing order, overflow policy, and priority, among others. The properties page may be opened in response to selection of the message queue block 2020.

Furthermore, instead of, or in addition to, having priority queues, one or more messages may be assigned a priority, e.g., by the producer/sender object of the message. The message-based execution engine 216 may be configured to sort messages within a message queue 1042 based on the priority of the messages. For example, messages assigned a high priority may be moved to the head of the queue, and may be removed and consumed before other messages in the queue that have a low or a lower priority.

Figure 11:
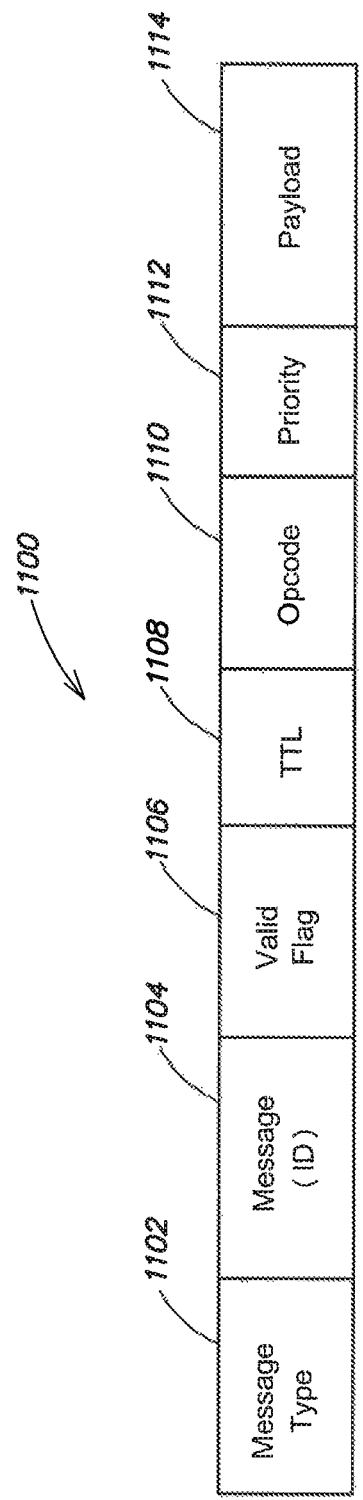
FIG. 11 is a schematic illustration of an example data structure of a message in accordance with an embodiment of the disclosure.

FIG. 11 is a schematic illustration of a data structure 1100 for a message according to an embodiment. The data structure 1100, which may be created and/or allocated for an instance of a message object, may be organized into a plurality of fields and sub-fields each configured to store information. For example, the data structure 1100 may include a message type field 1102, a message identifier (ID) field 1104, a valid flag 1106, a time to live (TTL) field 1108, an operation code (opcode) field 1110, a priority field 1112, and a payload field 1114. The message type field 1102 may store information that indicates the particular type of message, the message ID field 1104 may store an identifier that uniquely identifies the message, the valid flag 1106 may indicate whether the message is valid or invalid, the TTL field 1108 may store information indicating how long the message should be maintained, the opcode field 1110 may store a value identifying a particular operation or command associated with the message, the priority field 1112 may store a value specifying the priority assigned to the message, and the payload field 1114 may store one or more data values or other information associated with the message as generated by the producer/sender object, which data values or other information may be processed, e.g., consumed, by one or more consumer/receiver objects.

Exemplary message opcodes may include WARNING, ERROR, DIAGNOSTIC, ALARM, and ALERT. Nonetheless, additional or other opcodes may be provided.

Synchronous/Asynchronous Execution

During execution of a model, a producer/sender object may generate and send a message to a consumer/receiver object of the model. The generation and/or sending of a message may occur at a sample time hit for the producer/sender object, or the generation and/or sending of a message may occur independently of the model's execution time steps. The message may be stored at a message queue 1042. As noted, a consumer/receiver object may be being triggered to execute upon the receipt of a message. That is, upon notification of a message being added to the queue, the consumer/receiver object may be activated and may retrieve and consume the message. The consumer/receiver object may thus operate synchronously relative to the receipt of a message. Alternatively, a consumer/receiver object may be configured to execute during one or more sample times, instead of being triggered by the receipt of a message. For example, at a sample time hit, the consumer/receiver object may examine its message queue to see whether there is a message in the queue. If there is a message in the queue, the consumer/receiver object may retrieve and consume the message as part of its execution during the sample time hit. At the next sample time hit, the consumer/receiver object may again access the message queue and, if one or more messages are found, may retrieve and consume the messages. The consumer/receiver object may thus execute asynchronously with respect to the reception of a message. During initialization of a model, the message-based execution engine 1028 may be configured to schedule message-based components or objects for synchronous or asynchronous execution. A message-based component or object may be configured to include a property or parameter whose setting specifies whether the component or object executes synchronously or asynchronously.

Using Messages within State-Based Modeling Components

In some embodiments, the library 1008 of model objects may include time-based and state-based objects or components that may be further configured to send and/or receive messages during execution of a model having instances of those objects or components. In particular, the simulation engine 1006 in cooperation with the message-based execution engine 1028 may be configured to execute state-based components or objects that send and/or receive messages during execution of a model or a portion thereof including those state-based components or objects.

A user may interact with a Graphical User Interface (GUI) to open, create, and/or revise a model, including a state-based model. Specifically, the HMI engine 1002 may be configured to provide a model editor window in the form of a GUI having a plurality of window gadgets (widgets) or graphical elements, which may be arranged as a desktop environment. The GUI's graphical elements may include a model canvas and one or more floating palettes that present graphical object types, such as component types, from the library 1008 that may be selected, e.g., by a user, and used to construct a desired model on the model canvas.

Figure 12:
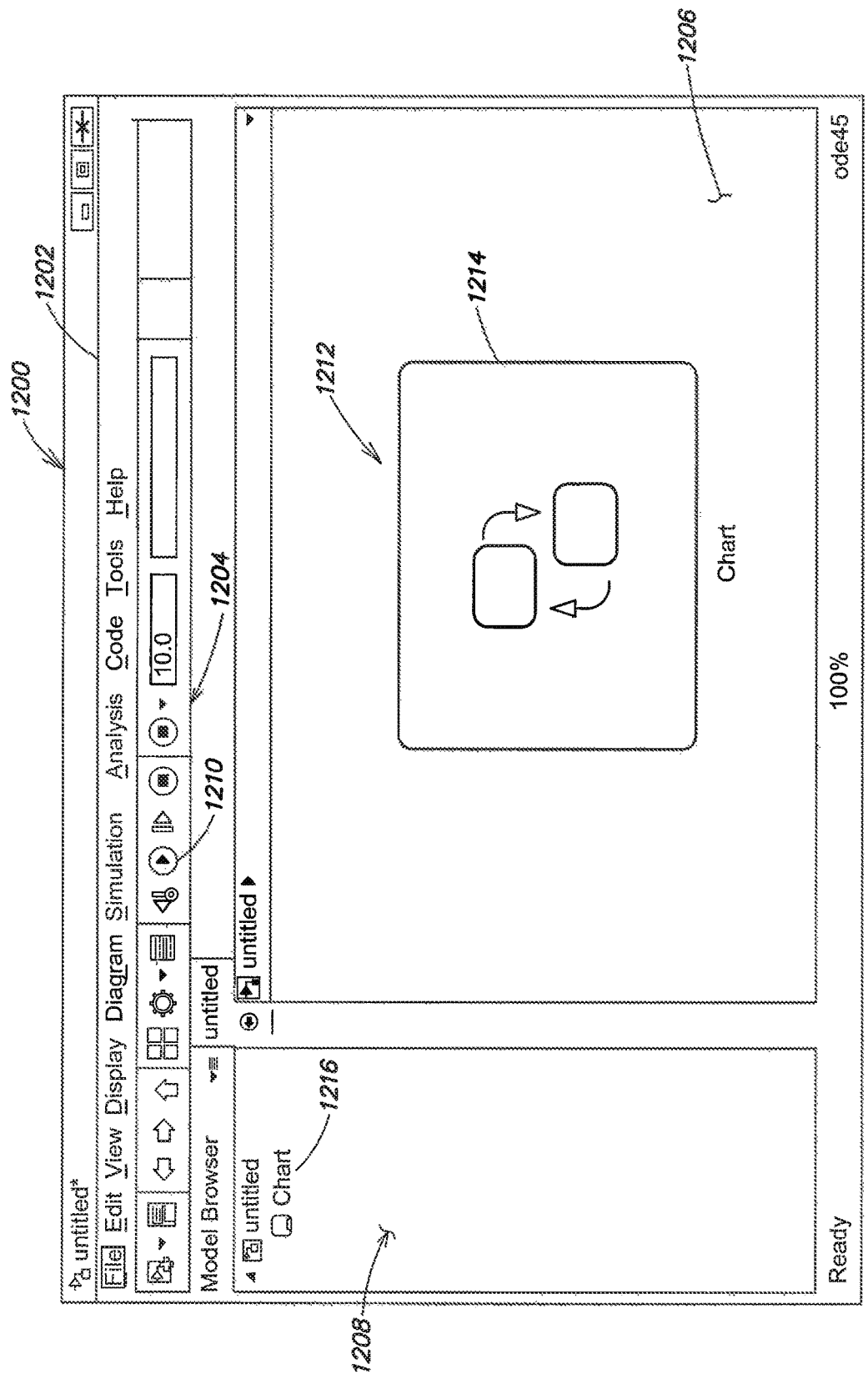
FIG. 12 is a schematic illustration of an example model editor in accordance with an embodiment of the disclosure.

FIG. 12 is a schematic illustration of a model editor window 1200. It may have a menu bar 1202, a toolbar 1204, a canvas 1206, and a model browser 1208, among other graphical elements. The menu bar 1202 may include a plurality of text-based command types, such as File, Edit, View, Display, etc., that may have a plurality of text-based commands. A user may open, create, edit, and save a model presented in the canvas 1206, for example using commands and sub-commands available through the menu bar 1202. The toolbar 1204 may include a plurality of graphical command buttons, such as a Run button 1210, among others. In response to a user selecting the Run button 1210, the modeling system 1000 may run, e.g., execute, a model opened in the model editor window 1200. A user may select object types from a palette (not shown) and add instances of the selected objects to the canvas 1206 to construct or revise a model 1212. At least some of the selected objects may be graphical objects. The model 1212 may have portions operating according to different execution domains, such as a time-based portion, a state-based portion, a dataflow based portion, a control flow portion, etc. The model 1212 may include a graphical state-based component, such as a chart 1214. The model browser 1208 may provide a project tree view 1216 of the model 1212 opened and presented on the canvas 1206.

In some embodiments, the modeling system 1000 may be configured to execute state-based components or objects in response to events or messages occurring during model execution. Furthermore, the modeling system 1000 may be configured to utilize a plurality of execution stages for state-based components or objects. For example, a state-based component may have an inactive execution stage in which the component has no active states, an active execution stage in which the component has one or more active states, and a sleeping execution stage in which the component has one or more active states but no events or messages to process.

Input/Output Messages

Figure 13:
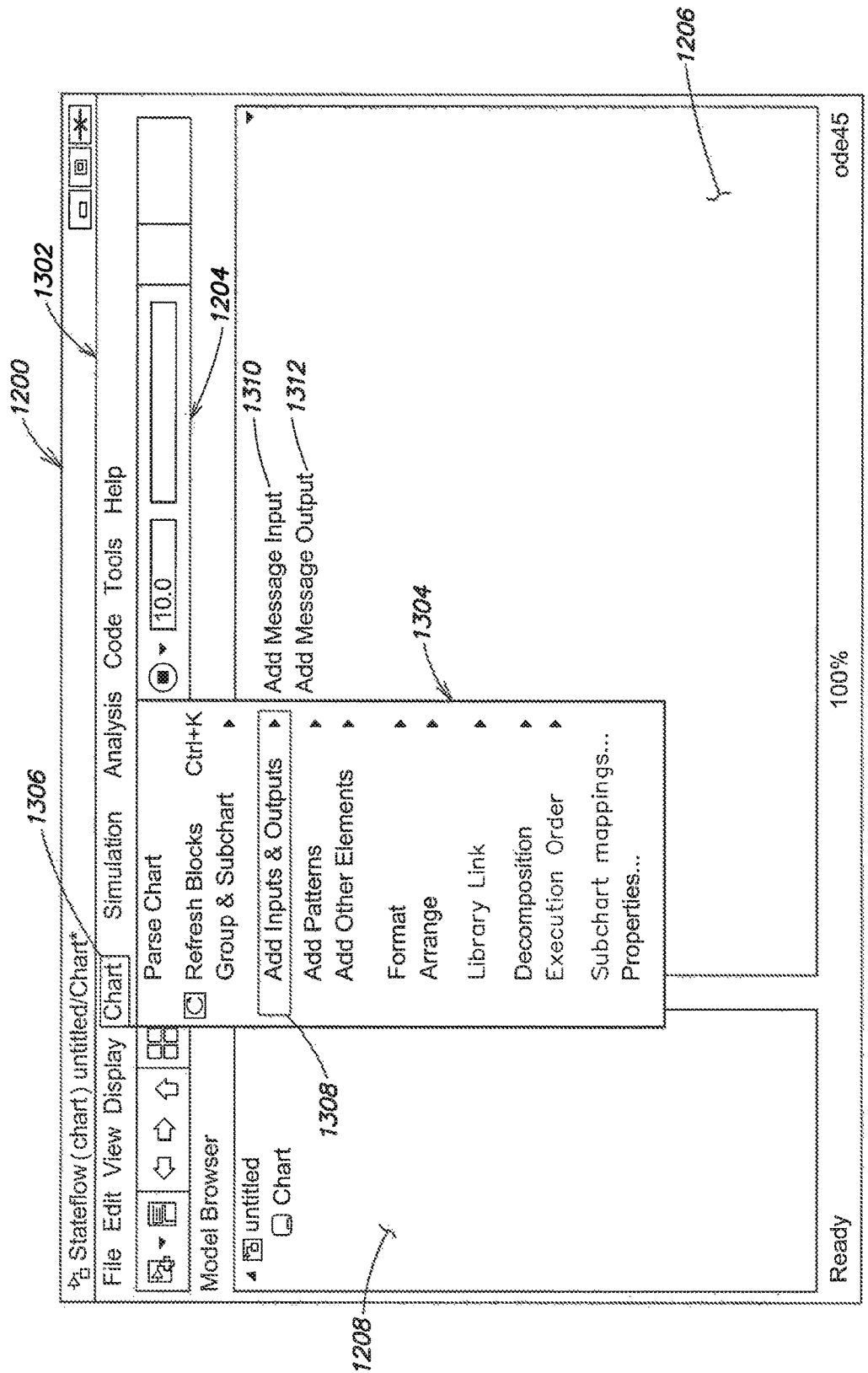
FIG. 13 is a schematic illustration of an example model editor in accordance with an embodiment of the disclosure.

In some embodiments, the message-based modeling entity 1012 may be configured to add one or more message ports to a state-based component of a model, such as the chart 1214 of the model 1212. The message ports may be represented graphically, and may be added in response to user inputs or programmatically. The modeling system 1000 may be configured to open the chart 1214, e.g., for editing, in response to a selection of the chart 1214, e.g., by a user. FIG. 13 is a schematic illustration of the model editor window 1200 in which the chart 1214 is opened. With the chart component 1214 opened, a user may construct or revise the chart component 1214, for example, by adding program elements or components to the canvas 1206. A menu bar 1302 for the chart 1214 may be presented on the model editor window 1200 in place of the menu bar 1202 (FIG. 12). A popup dialog 1304 may be presented in response to a selection of a Chart command 1306 of the menu bar 1302. The popup dialog 1304 may include an Add Inputs & Outputs command 1308 that, in turn, may present a plurality of commands, such as an Add Message Input command 1310 and an Add Message Output command 1312. The message-based modeling entity 1012 may be configured to add message ports to state-based objects, such as the chart component 1214, for example, in response to the selection of the Add Message Input command 1310 and/or the Add Message Output command 1312, e.g., by a user. In some embodiments, a properties page (not shown) may be presented in response to the selection of the Add Message Input command 1310 and/or the Add Message Output command 1312 through which a user may specify property values for the respective message ports. A message input port may have the following properties:

1. data type of message payload;
2. Queue size; and
3. Consume message on peek (yes/no).

A message output port may have the following properties:

1. data type of message payload; and
2. block on send (yes/no).

Nonetheless, additional or other properties may be provided.

The message-based modeling entity 1012 may be configured to assign default values to one or more of the properties of the message ports. The message-based modeling entity 1012 may be configured to implement message ports as objects instantiated from a message port class or type.

Figure 14:
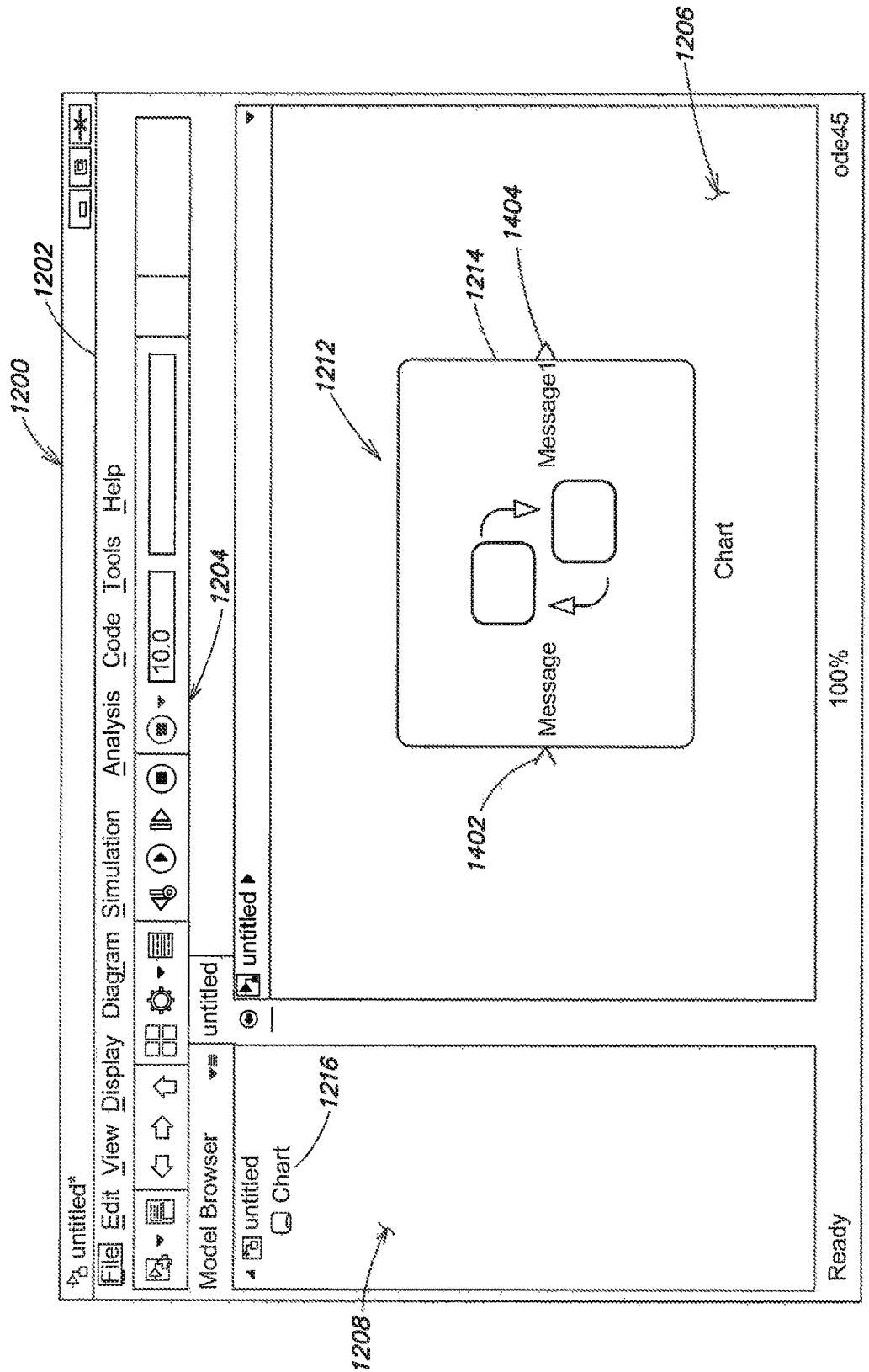
FIG. 14 is a schematic illustration of an example model editor in accordance with an embodiment of the disclosure.

Once desired values have been selected for the properties of the message ports, the user may return to the model view. FIG. 14 is a schematic illustration of the model editor window 1200. The chart component 1214 now includes a message input port, named 'Message', 1402, and a message output port, named 'Message1', 1404. In some embodiments, particular messages may be assigned to the message input and output ports 1402 and 1404 graphically, e.g., by drawing a line or other graphical object from another component or object of the model to the message input and output ports 1402 and 1404. Alternatively, messages may be assigned to the message input and output ports 1402 and 1404 through textually specified commands or through a combination of textual and graphical inputs.

In some embodiments, the message-based modeling entity 1012 may be configured to assign respective message queues 1042 to the message ports, such as the message input and output ports 1402 and 1404. The message queues 1042 assigned to the input and output ports 1402 and 1404 may have a length, a processing order, an overflow policy, and a priority.

It should be understood that the message-based modeling entity 1012 may be configured to utilize other objects to implement message ports and/or message queues. For example, a separate graphical object, such as a Message Queue block, may be defined, and instances of the Message Queue block may be added to a model. A Message Queue block may be associated with a message port of a state-based component. For example, a Message Queue block may be graphically or visually connected to the message port.

Logging and Message Tracing

In some embodiments, the logging engine 1033 may be configured to log messages generated during execution of a model. For example, the logging engine 1033 may be configured to utilize one or more blocks or objects for logging message. The blocks or objects may be included in the model, and may be configured to detect messages as they are added to a message, and to store copies of the messages for subsequent analysis. In addition to storing copies of the message, the blocks or objects may be configured to store additional data, such as metadata, associated with the messages. The metadata may include such things as the execution time at which messages are created and added to the queue, the execution time at which messages are de-queued, the producer/sender of a message, the receiver/consumer of a message, etc. Exemplary blocks or objects that may be used by the logging engine 1033 include the 'To Workspace' block of the Simulink model-based design system from The MathWorks, Inc. The 'To Workspace' block may, for example, be connected to a message port and/or a Message Queue block. During execution, the 'To Workspace' block may store information concerning messages in a workspace associated with the model. Following the execution of the model, a user may access the workspace, and examine the messages and their metadata.

Message Routing and Forwarding

In some embodiments, the message routing engine 1035 may be configured to route messages within a model. For example, the message routing engine 1035 may be configured to forward messages received at a first message queue to a second message queue. The message routing engine 1035 may call a forward method or operation on the queue. The forward method or operation may specify the second message queue to which messages are to be forwarded. In some embodiments, the forward method or operation may not cause messages to be consumed, e.g., deleted from the first queue. To the extent the first message queue is associated with a state-based component or object of a model, the message routing engine 1035 may be configured to forward messages from the first message queue when the component or object goes to sleep. In alternative embodiments, the forwarding of messages from the first queue may result in the messages being consumed.

In some embodiments, one or more graphical object types may be specified, and instances of these graphical object types may be included in a graphical model to specify message routing functions or operations. The graphical objects may be represented in a graphical model by preselected graphical affordances, such as particular blocks, icons, etc.

Figure 21:
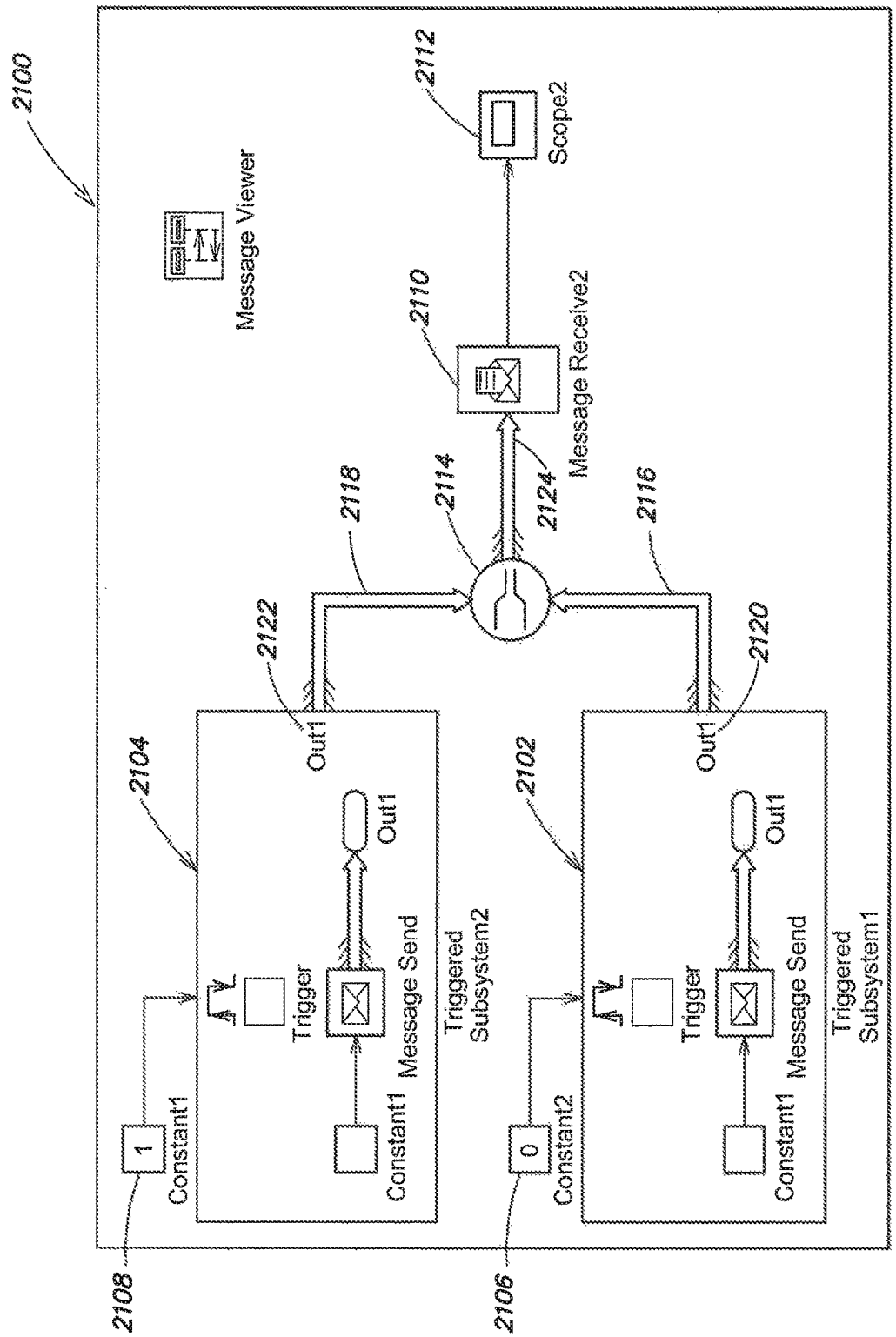
FIG. 21 is a schematic illustration of an example graphical model having executable semantics in accordance with an embodiment of the disclosure.

FIG. 21 is a schematic illustration of a graphical model 2100 having executable semantics. The graphical model 2100 may include a plurality of model elements. Specifically, the model 2100 may include first and second triggered subsystems 2102 and 2104 labeled 'Triggered Subsystem1' and 'Triggered Subsystem2'. The model 2100 also may include first and second constant blocks 2106 and 2108, labeled 'Constant 2' and 'Constant 1', configured to trigger the execution of the first and second triggered subsystems 2102 and 2104. The first and second triggered subsystems 2102 and 2104 may be configured to generate and send messages during execution of the graphical model 2100. The model 2100 also may include a Message Receive block 2110, labeled 'Message Receive 2', and a scope block 2112, labeled 'Scope 2'. The model 2100 may be configured such that the Message Receive block 2110 receives messages from both the first and second triggered subsystems 2102 and 2104. For example, a special routing block, such as a message path combiner block 2114 may be included in the model, and the message path combiner block 2114 may be arranged within the model 2100 to indicate that the Message Receive block 2110 receives messages from both the first and second triggered subsystems 2102 and 2104. More specifically, first and second message arrows 2116 and 2118 may connect the message path combiner block 2114 to message output ports 2120 and 2122 of the first and second triggered subsystems 2102 and 2104. Additionally, a third message arrow 2124 may connect the message path combiner block 2114 to the Message Receive block 2110.

It should be understood that other or different message routing blocks may be provided, such as a message splitter block configured to distribute messages from one message source block to multiple message receiver blocks.

Message Queue Primitives

Message queues may be configured by the message-based modeling entity 1012 to implement a plurality of methods or operations, such as primitive operations or primitives, during execution of a model. For example, message queues may support a 'peek' method or operation. In response to calling the 'peek' method, a message queue may reply by informing the caller or sender of the 'peek' method whether or not a message is currently in the queue. The reply may simply indicate whether one or more messages are in the message queue, e.g., Yes or No. Alternatively, the reply may include the number of messages in the queue. In addition, the caller of the 'peek' method may obtain the message's payload. In some embodiments, the 'peek' method or operation may not result in the message being removed from the message queue. Accordingly, the number of messages currently stored in a message queue is not changed by the 'peek' method. A message queue may also support a 'pop' method or operation. A message queue may respond to a 'pop' method or operation by removing a message from the message queue, and providing the message to the caller of the 'pop' method or operation. The particular message that is removed may depend on the queue's processing order, e.g., FIFO, LIFO, etc. A message queue also may support a 'consume' method or operation. In response to a 'consume' method or operation, the message queue may destroy the respective message. In some embodiments, multiple methods or operations may be tied together. For example, the 'consume' method may be tied to the 'pop' method so that, when a message is removed from a message queue it is also destroyed.

Posting Messages from State-Based Components

The modeling system 1000, including the state-based modeling entity 1014, may be configured to execute actions defined or specified for state-based components or objects during model execution. More specifically, a user may define or specify, one or more action statements for state objects of a model. For example, an entry type of action, which may be identified by using a label, such as 'entry' or 'en', may be executed when a state becomes active, e.g., is entered. A during type of action, which may be identified by using a label, such as 'during' or 'du', may be executed while a state is active. In some embodiments, the modeling system 1000 may be configured to support the specification of during actions to be performed or executed when a specified event occurs, or when a specified message and/or message payload is received. An exit type of action, which may be identified by using a label, such as 'exit' or 'ex', may be executed when a state becomes inactive, e.g., is exited. An on event type of action, which may be identified by using a label, such as 'on', followed by an event name, may be executed when the state is active and the event occurs. In some embodiments, the modeling system 1000 may be configured to support the specification of actions to be performed when a state is active and a particular message is received by the state. That is, the modeling system 1000 may also support an on message type of action, which may also be identified by the 'on' label.

The modeling system 1000, including the message-based modeling entity 1012, may be configured to implement a programming syntax that may be used when defining or creating a model in order to configure a state-based component or object of the model to post a message during execution of the model. An exemplary textual syntax is:

post(Message_Name, payload)

where

'post' is the name of the operation or command for posting a message,

'Message_Name' is the name of the message to be posted, and

'payload' is the value of the payload of the message to be posed.

Using the defined syntax, a user may configure a state-based component or object of a model to post one or more messages during execution of the model including that state-based component or object. The posting of the message may be specified as an entry type of action, a during type of action, a on type of action, or an exit type of action. The one or more messages may be posted by the component or object to a particular message queue.

Figure 15:
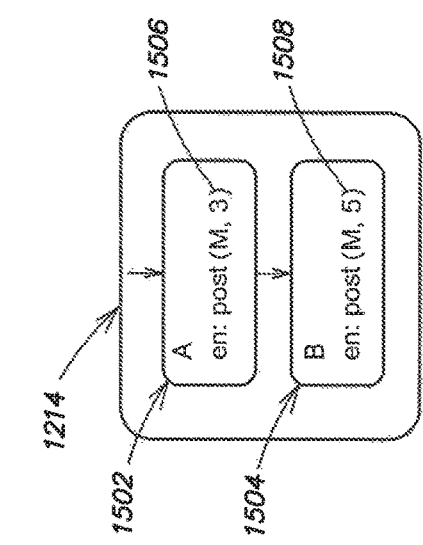
FIG. 15 is a schematic illustration of an example state-based component of an executable model in accordance with an embodiment of the disclosure.

FIG. 15 is a schematic illustration of the state-based component 1214, which has been configured to include a first state, named 'A', 1502, and a second state, named 'B', 1504. State A 1502 includes a text command, 'en: post(M, 3)', 1506, while state B 1504 includes a text command, 'en: post(M, 5)', 1508. During execution of a model that includes the state-based component 1214, when state A 1502 is entered, the message-based execution engine 1028 posts a message M with a payload of '3' on the message queue associated with the message output port 1204. When state B 1504 is entered, the message-based execution engine 1028 posts a message M with a payload of '5' on the message queue associated with the message output port 1404.

It should be understood that other programming syntaxes may be defined and used to post messages. For example, other exemplary programming syntaxes include:

M.data=3; post(M), and

M=3; post(M).

Using Messages to Control Transitions Among States

In some embodiments, the modeling system 1000 may be configured to support transitions among state components or objects of a model based on messages generated during execution of the model. That is, the transitions may occur (or may not occur) as a function of one or more messages. In other words, a state transition may be "guarded" by a message. In particular, the message-based modeling entity 1012 may be configured to implement transitions between states:

1. when any message is received;
2. when a particular message is received;
3. when any message that satisfies some condition is received; and
4. when a particular message that satisfies some condition is received.

The message-based modeling entity 1012 may be configured to recognize a programming syntax, and this programming syntax may be used to associate a message or a message and condition to a transition. An exemplary textual syntax is:

'Message_Name'('payload_name')
['payload_name'=='value']

where

'Message_Name' identifies the message,

'payload_name', if present, identifies an element of the message's payload, and

'value' specifies a value for the identified payload element.

Figure 16:
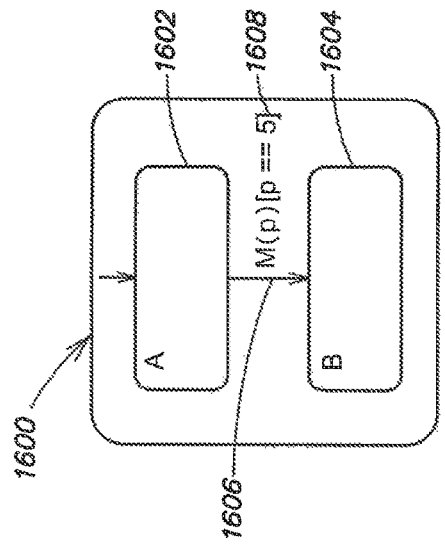
FIG. 16 is a schematic illustration of an example state-based component of an executable model in accordance with an embodiment of the disclosure.

FIG. 16 is a schematic illustration of a graphical state-based component 1600 having a first state, named A, 1602, a second state, named B, 1604, and a state transition 1606 from state A 1602 to state B 1604. The state transition 1606 is guarded by, e.g., conditioned on, the existence of a message. More specifically, the state transition 1606 is associated with a textual string, 'M(p)[p==5]', 1608. During execution of a model containing the state-based component 1600, the message-based modeling entity 1012 may evaluate the textual string 1608. Evaluation of the textual string 1608 may cause the message-based modeling entity 1012 to determine whether an input message queue of the state-based component 1600 has a message M whose payload has a value of '5'. If so, the message-based modeling entity 1012 removes the message M from the message queue, transitions the component 1600 from state A 1602 to state B 1604, and consumes the message M.

A state-based component or object may be configured to transition between states on receipt of a message, regardless of the message's payload. For example, to configure the state-based component 1600 to transition from state A 1602 to state B 1604 on receipt of a message, regardless of the message's payload, a user may associate the transition 1606 with the textual string 'M'. The message-based modeling entity 1012 may be configured to evaluate this textual string to mean: determine whether any message 'M' is received, without considering the message's payload.

In some embodiments, a textual command string may be associated with a transition by selecting the transition, and entering the textual command string in a dialog that opens for the transition.

It should be understood that other programming syntaxes may be used to determine if a desired message exists to cause a transition among states. Alternative syntaxes that may be used include:

'Message_name'['Message_name'='payload_value']
rcv('Message_name')
['Message_name'='payload_value']

State-based components or objects may also be configured to receive messages, and process the payloads of messages as during and exit types of actions.

Figure 17:
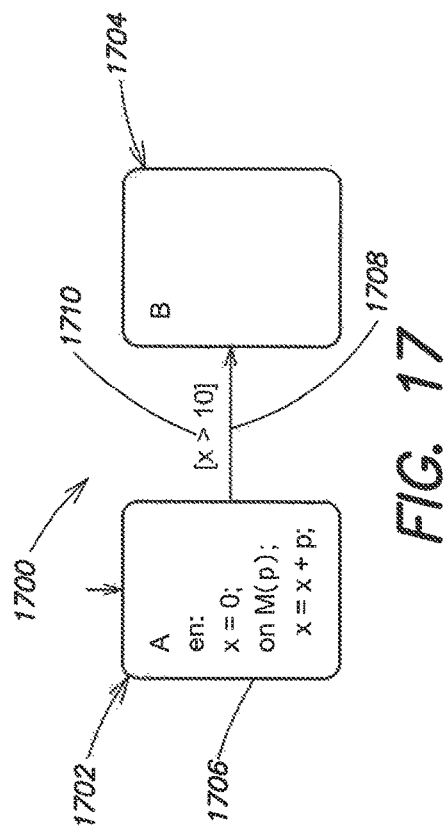
FIG. 17 is a schematic illustration of an example state-based portion of an executable model in accordance with an embodiment of the disclosure.

FIG. 17 is a schematic illustration of a graphical state-based model portion 1700 having a first state 1702 named 'A', and a second state 1704 named 'B'. The first state 1702 has been configured with a first code element 1706 that is executed when the state is entered (en). A transition 1708 has been specified between the first and second states 1702 and 1704, and the transition 1708 is guarded with a second code element 1710. After setting a variable 'x' to '0', execution of the first code element 1706 determines whether a message 'M' having a payload 'p' has been received by the first state 1702. If so, the value of the payload 'p' is added to the variable 'x'. The new value of the variable 'x' is then used to determine whether to transition from the first state 1702 to the second state 1704.

State transitions may also be guarded by attributes of message queues, such as the length of a given message queue.

Determining When Messages Are Posted

The simulation engine 1006 may be configured to execute a model over a simulation time that has a plurality of time steps, including a model having components or objects that send and receive messages. The modeling system 1000 may be configured to support a programming syntax for determining whether a message is received at a given point in time during the simulation time, such as a particular time step and/or a particular simulation time. For example, the modeling system 1000 may support the following programming syntax, which may be used in a model:

Message_name [t==model_execution_time_point]
where
'Message_name' is the name of the message,
't' refers to the model's simulation time, and
'model_execution_time_point' is the time value to be evaluated with respect to the specified message.

This programming syntax may be used to guard transitions among states or to determine whether other operations should be performed, e.g., by a state-based or other component or object of a model.

Message Consumption

In some embodiments, the message-based modeling entity 1012 may be configured to designate messages as consumed upon the messages being read. Once a message is designated as consumed, it may be marked stale and/or destroyed. Suppose, for example, that a transition between two states is defined to occur on the existence of a message having an attribute that satisfies some condition, such as a payload equaling some value, a payload being greater or less than some value, the message is received at a particular point in the model execution time, etc. If the message-based modeling entity 1012 examines the message queue and finds a message in the queue, then the message-based modeling entity 1012 may read the message and mark it as consumed whether or not the message's attribute satisfies the condition. Thus, even though a message does not result in a transition between the two states because the message's attribute does not meet the condition, the message may be consumed, and thus destroyed.

With regard to state-based components or objects, the message-based modeling entity 1012 may be configured to mark a message as read after the state-based component reaches a stable state. Suppose, for example, that a state-based component is defined so that the component transitions from a first state to a second state upon receipt of a message, regardless of the message's payload, and transitions from the second to a third state if an attribute of a received message satisfies some condition. In this case, upon receipt of a first message, the component transitions from the first state to the second state. The first message is also tested to see whether its attribute satisfies the condition. If so, the component transitions from the second to the third state. If the third state is a stable state of the component, then the message-based component marks the message as consumed, and the message is destroyed. Nonetheless, the same message may be used to effect two transitions within the state-based component.

A state diagram or state chart may be considered to be in a stable state after all possible transitions among states or sub-states are completed. Alternatively, the message-based modeling entity 1012 may be configured to treat a message as consumed after the first access to the message, e.g., after accessing the message in response to a first transition of a state-based component or object.

In some embodiments, before a message-based component goes to sleep, messages that were peeked at may be popped and thus consumed.

In some embodiments, the state-based modeling entity 1012, e.g., as default semantics, may be configured to execute the state-based components of a model once for every active input event or input message to the state-based components. If there are no input events or input messages for a given state-based component, it may be executed once each time step, if the model is a time-based model that executes over a plurality of time steps between a start time and an end time. In addition, a given state-based component or object of a model may be configured to execute multiple times for every active input event or input message, or for every time step when the state-based component has no input events or input messages. In this case, which may be referred to as 'super step' semantics, the given state-based component may take valid transitions until no more valid transitions exist for the given state-based component, or the number of transitions that have been taken exceeds a threshold, which may be user specified. For a state-based component configured with 'super step' semantics, the message-based modeling entity 1012 may be configured to mark a message as read (and thus consumed) at the end of each single step, or alternatively at the end of a 'super step'.

In some embodiments, the state-based modeling entity 1014 may support the creation of state-based components that include parallel (AND) states or sub-states in which all the states or sub-states of the state-based component are active. The ordering of parallel states or sub-states may be explicit, e.g., user-specified priority numbers, or implicit, e.g., based on internal rules of the state-based modeling entity 1014.

Suppose, for example, a state-based component has a single message input port and two parallel states that are both interested in messages posted to the component's message input port. In some embodiments, when a message is received at the message input port, the message-based modeling entity 1014 may be configured to wait until each parallel state or sub-state has had an opportunity to read the message before marking the message as consumed. If a first parallel state is ready for a message, the message is read and acted upon by the first parallel state. If a second parallel state is not ready for a message, then it does not read the message, and the message may be considered consumed.

In alternative embodiments, the message-based modeling entity 1012 may be configured to establish a message queue for each parallel state or sub-state, and to place a copy of the message in each of these message queues. In these embodiments, if a first parallel state is ready for a message, it reads the message from its message queue and the message from that message queue is consumed. If a second parallel state is not ready for a message, the message waits in the second parallel state's message queue until the second parallel state is ready to read a message.

In yet other embodiments, the message-based modeling entity 1012 may be configured to keep executing the parallel states until a fixed point is reach at which a message may be consumed by both of the parallel states, e.g., in the same time step.

Verification of a Message-Based Portion of a Model

In a further aspect of the disclosure, verification or other testing may be performed on one or more message-based portions of a model. In some embodiments, one or more verification components may be provided to verify a message-based portion of a model.

Message Observer

In some embodiments, the verification engine 218 may create a first verification component, which may be referred to as an observer, for verifying one or more messages in a model. The observer may be associated with a particular message-based connection in a model, and may present information concerning one or more of the messages that travel across that connection during execution of the model. In some embodiments, the observer component operates, at least in part, as a viewer to present information concerning all of the messages that travel across the selected connection during execution of the model. The observer component may provide a message-based view that includes the set of message participants, such as the sources and destinations, the types of messages generated and sent, and the payloads of those message. This collection of information may be referred to as an interaction.

Figure 8:
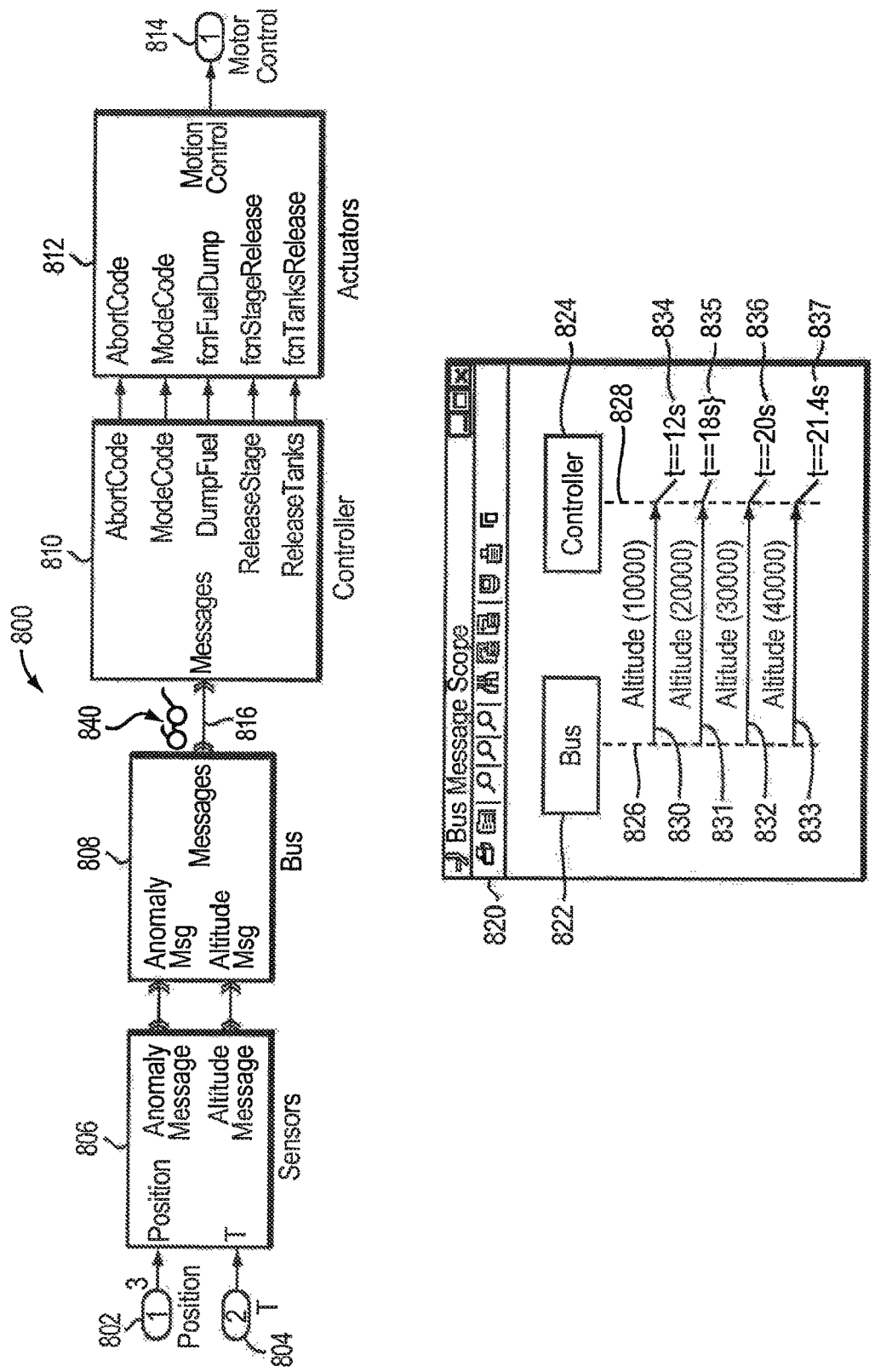
FIG. 8 is an illustration of an example graphical model having executable semantics in accordance with an embodiment of the disclosure.

FIG. 8 is a schematic illustration of a graphical model 800 having executable semantics. The model 800 includes a plurality of interconnected components. Specifically, the model 800 has two Inports 802, 804, a Sensors component 806, a Bus component 808, a Controller component 810, an Actuators component 812, and an Outport 814. The Inports 802, 804 and the Outport 814 may be time-based components, while the Sensors, Bus, Controller, and Actuators components 806, 808, 810, 812 may be message-based components. In addition, the Bus component 808 and the Controller component 810 may be connected by a message-based connection 816. Exemplary embodiments may allow one or more messages to be sent by the Bus component 808 and received by the Controller component 810 during execution of the model 800 when the Bus component 808 is connected to the Controller component 810 using a message-based connection. In addition, the Controller component 810 may generate and send one or more reply messages to the Bus component 808.

Suppose a user is interested in examining and verifying the actual messages exchanged between the Bus component 808 and the Controller component 810 across the message-based connection 816 during execution of the model 800. In this case, the user may access an Observer component, such as Observer component or block 820.

Figure 9A:
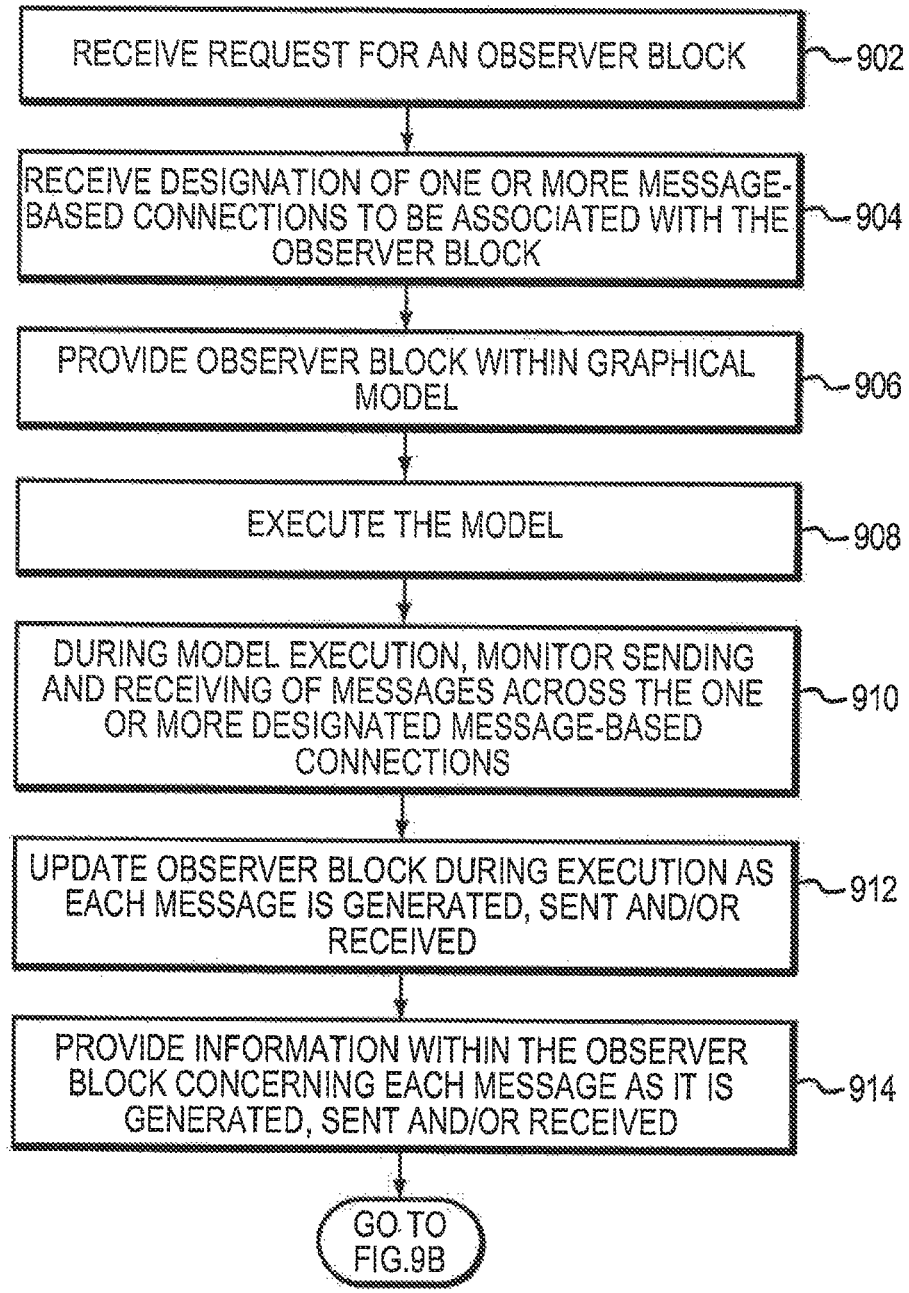
FIGS. 9A and B are partial views of a flow diagram of an example method in accordance with an embodiment of the disclosure.

FIGS. 9A and B are a flow diagram illustrating exemplary processing in accordance with an embodiment of the disclosure.

The verification engine 218 may receive a request for an Observer block, as indicated at block 902. The verification engine 218 may also receive a designation of one or more message-based connections to which the requested Observer block is to be associated, as indicated at block 904. In response to the request, the verification engine 218 may cooperate with the constructor 224 to create an Observer component, such as an object instance. In addition, the model builder 210 may present a corresponding Observer block, such as block 820, in the graphical model 800, as indicated at block 906. A user may issue a request for an Observer block either textually, e.g., by entering a command in a Command Line Interface (CLI), or graphically, e.g., by selecting an Observer block from a library browser. In some embodiments, a user may select a message-based connection of interest, for example, connection 816, such as with the mouse 118. In response, the verification engine 218 may present one or more selectable commands in a drop-down list, including an 'Insert Observer Block' command. The user may select the 'Insert Observer Block' command, thereby causing an Observer component to be created that is associated with the selected message-based connection.

In some embodiments, the Observer block 820 may include a plurality of Graphical User Interface (GUI) elements. Specifically, the Observer block 820 may include corresponding icons for the two or more message-based participants, e.g., the components connected by the message-based connection to which the Observer block is associated. Here, the Observer block 820 may include a first box element 822 representing the Bus component 808, and a second box element 824 representing the Controller component 810. The Observer block 820 may also include a line element, such as line elements 826, 828 extending from each box element 822, 824. Information concerning messages exchanged between the Bus component 808 and the Controller component 810 across message-based connector 816 may be presented between the line elements 826, 828 of the Observer block 820.

After issuing a request for an Observer block and associating it with a message-based connection of interest, the model may be executed, as indicated at block 908. As part of the execution of the model 800, the Bus component 808 may generate and send one or more messages to the Controller component 810, and the Controller component 810 may respond with one or more reply messages. Information concerning this exchange of messages may be presented by the Observer block 820.

Specifically, the verification engine 218 may monitor the sending and receiving of messages across the selected message-based connector 816, as indicated at block 910. For example, the verification engine 218 may interface with the message-based execution engine 216. In addition, as each such message is generated and sent, the verification engine 218 may add an entry to the Observer block for that message, as indicated at block 912. The verification engine 218 may also include within each entry one or more information elements concerning the respective message, as indicated at block 914. For example, the verification engine 218 may add an arrow element to the Observer block 820 for each actual message. An arrow pointing from line element 828, which extends from box element 822, to line element 830, which extends from box element 824, may represent a message sent from the Bus component 808 to the Controller component 810. An arrow pointing from line element 830 to line element 828 may represent a reply message sent from the Controller component 810 to the Bus component 808. The verification engine 218 may also include a data element at each entry that indicates the type of message sent, and that includes information from the message's payload. The entire payload or a portion thereof may be included in the entry's data element.

In addition, the verification engine 218 may include one or more time elements in the entry for a given message. The one or more time elements may contain information relating to the timing characteristics of the message. In particular, a message may be sent by a source component at a particular time, which may be denoted as the TimeSent, $T_S$, and may be received by a destination component at a particular time, which may be denoted as TimeReceived, $T_R$. One or more of these timing characteristics, such as $T_S$ and/or $T_R$, may be included in the entry of the Observer block 820 by the verification engine 218.

The timing characteristics of a message may be determined by the verification engine 218 in cooperation with the message-based execution engine 216. For example, system 202 may receive a clock signal from system clock 212, and the message-based execution engine 216 may use this clock signal to identify one or more timing characteristics of messages.

As illustrated in the Observer block 820, four messages were generated and sent across the message-based connection 816 during execution of the model 800, as indicated by arrow elements 830-833. All four messages were sent by the Bus component 808 to the Controller component 810 as indicated by the arrow elements 830-833. Furthermore, each of the four messages may be 'Altitude' type messages, and may carry the following payloads: '10,000', '20,000', '30,000', and '40,000'. In addition, the four messages were received by the Controller component 810 at the following times: 12 s, 18 s, 20 s, and 21.4 s, as indicated by timing elements 834-837 of the Observer block 820.

Figure 9B:
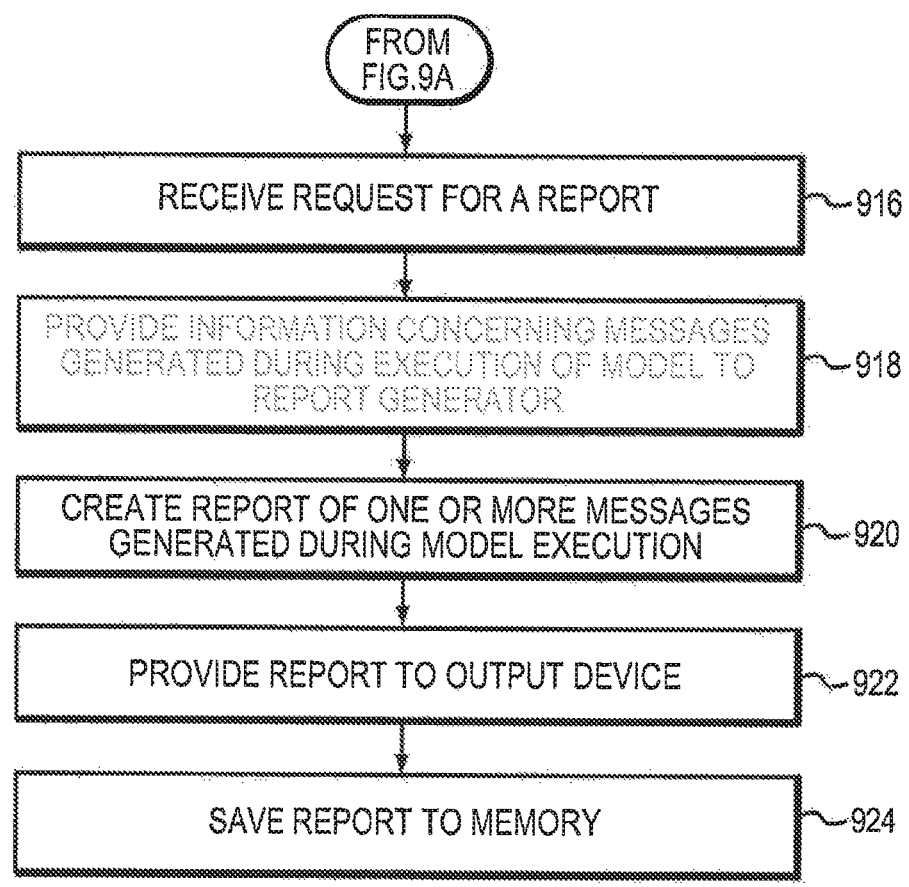

The verification engine 218 may also receive a request for a report of the messaging information presented by the Observer block 820, as indicated at block 916 (FIG. 9B). For example, a user may request such a report. The verification engine 218 may provide the information to the report generator 220, as indicated at block 918, and the report generator 220 may create a report, as indicated at block 920. The report generator 220 may provide the report to an output device, such as the display 120, a printer, etc., as indicated at block 922. The report generator 220 may also or alternatively save the report in memory, as indicated at block 924.

The Observer block 820 may be docked, that is fixed, to the model 800. The Observer block 820 also may be visually associated with the message-based connection 816 through a line element (not shown) connecting the Observer block 820 to the connection 816. Alternatively, the Observer block 820 may be a floating block. A floating block is not locked to any particular location in the model 800, but may be moved around the canvas, for example, by the user. In this case, an icon, such as a glasses element 840, may be placed near the connection 816 to indicate that an Observer block is associated with this message-based connection.

In some embodiments, the high-level modeling environment 200 may include one or more code generation modules for generating code from a model, such as C code, C++ code, Hardware Description Language (HDL) code, etc. The code generation module may generate code for one or more verification blocks, such as the Scenario blocks. If the code for the Scenario block detects an invalid trace, for example, it may generate an error message that could be read by another code module, which in turn may take some predetermined action, such as resetting the deployed systems, or sending a signal to a processing unit.

The generated code, moreover, may be used in a deployed system, that may be a real-world system that is physically separate from the data processing system 100 on which the high-level modeling environment 200 operates. Exemplary deployed systems include controllers, such as Engine Control Units (ECUs) used in cars and trucks, Anti-lock Braking Systems (ABS), aircraft flight control systems, etc.

Suitable code generation models include the Real Time Workshop code generator and the Simulink HDL Coder products from The MathWorks, Inc.

Referring to FIG. 10, the modeling system 1000 may further include a code generator 1016. The code generator 1016 may be configured to generate code, such as computer programming code, for a model or portion thereof. The generated code may be standalone code that is independently executable, e.g., executable outside of the modeling system 1000, and may be compatible with a specified target platform. Exemplary target platforms include a server or other data processing machine running a Microsoft Windows operating system, a server or data processing machine running a UNIX or Linux operating system, and an embedded system having a microprocessor, a Digital Signal Processor (DSP), a Field Programmable Gate Array (FPGA), and/or an Application Specific Integrated Circuit (ASIC), among others. The generated code may be deployed to and run by the target platform, which may not include a modeling system 1000. During the code generation process, a user may specify the target platform, and may specify other options for the code generation process, such as the use of one or more optimizations. The generated code may be source code, object code, an executable, a binary, a hardware description language (HDL) description, etc., and may conform to a programming language, such as C, C++, VHDL, Verilog, etc. In some embodiments, the code generator 1016 may be configured to generate code that, when compiled or interpreted on the target platform, creates a message-passing architecture or service. This message-passing architecture or service may be used by other modules of the generated code representing message-based components or objects of a model.

In other embodiments, the code generator 1016 may generate code that takes advantage of an existing message-passing architecture or service of a target platform. For example, in addition to specifying a particular target platform, a user may indicate a message-passing service already present and available on the target platform. For example, the VxWorks real time operating system (RTOS) from Wind River Systems, Inc. of Alameda, Calif. creates message channels to support fast communication between applications, tasks, and processes. These message channels provide a connection-oriented, bidirectional messaging mechanism based on the Transparent Interprocess Communication (TIPC) open source protocol. The Run-time Environment (RTE) of the Automotive Open System Architecture (AUTOSAR), an open and standardized automotive software architecture jointly developed by various automobile manufacturers, suppliers, and tool developers, also defines an information exchange service. The Portable Operating System Interface for UNIX (POSIX) is a set of IEEE and ISO standards defining an interface between application programs and UNIX type operating systems. PROFINET is an industrial networking standard designed for automation. The code generator 1016 may be configured to generate code that interfaces to the message channels of the VxWorks RTOS, the RTE from AUTOSAR, the POSIX standard, or the PROFINET standard, instead of creating a separate message passing service. For example, an interface specification, such as an Application Programming Interface (API), may provide details for interfacing to a particular message-passing service, such as VxWorks' message channels. The code generator 1016 may be configured to generate code that includes calls to the message-passing service, based on the interface specification.

The code generator 1016 may include or have access to code replacement tables containing message-passing service implementations for one or more existing message-passing services. When the code generate 1016 reaches a point in the generated code regarding the passing of a message, the code generator 1016 may access the one or more code replacement tables for the selected message-passing service, and utilize within the generated code the message-passing service implementations contained in the one or more tables. It should be understood that other techniques may be used to specify an implementation of an existing message-passing service.

Figure 18:
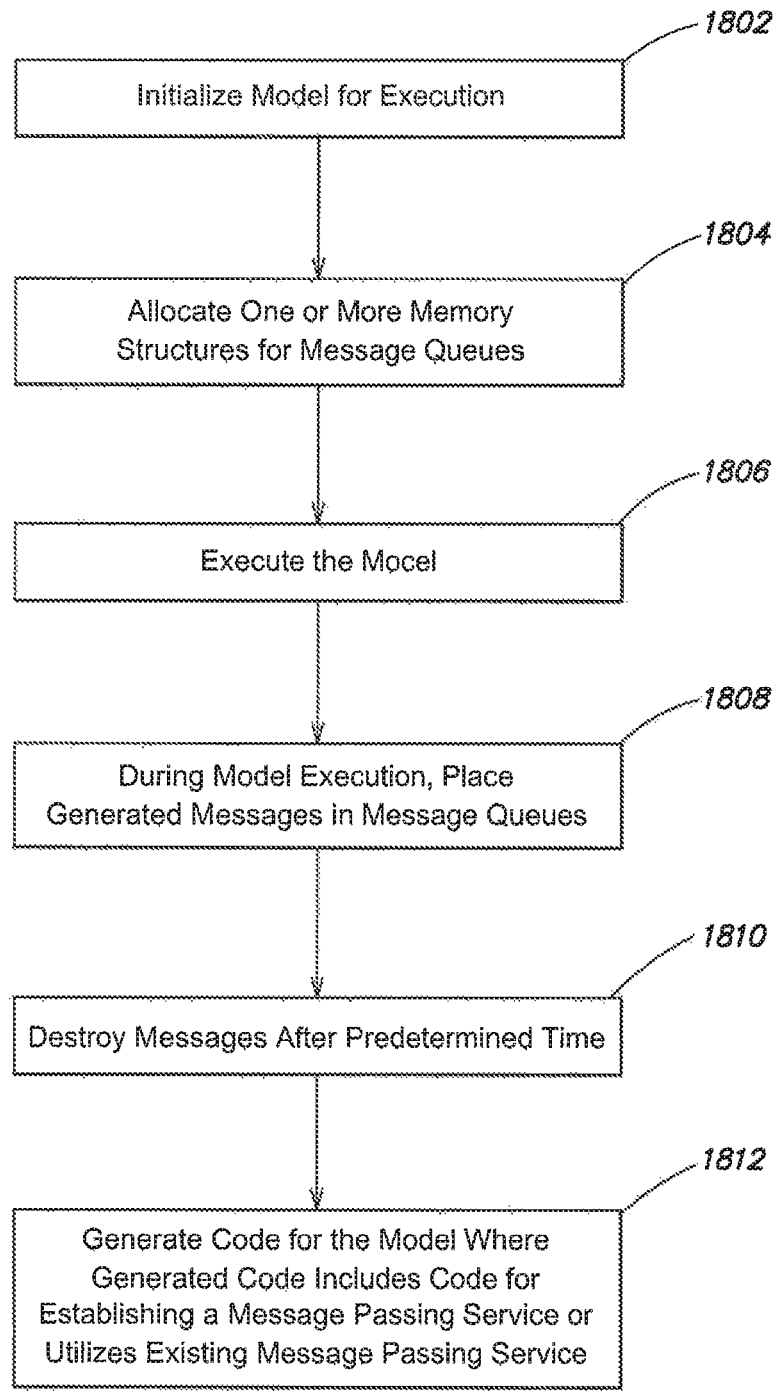
FIG. 18 is a flow diagram of an example method in accordance with an embodiment of the disclosure.

FIG. 18 is a flow diagram of a method in accordance with an embodiment of the disclosure. The simulation engine 1006 may initialize a model or a portion thereof for execution, as indicated at block 1802. As part of the model initialization process, the simulation engine 1006 may be allocated one or more data structures, e.g., in memory, for establishing the model's message queues, as indicated at block 1804. The simulation engine 1006 in cooperation with the message-based modeling entity 1012 may execute the model or the portion thereof, as indicated at block 1806. During execution, the message-based modeling entity 1012 may place messages generated by producer/sender objects in the message queues 1042, as indicated at block 1808. In addition, the message-based modeling entity 1012 may destroy the generated messages at a predetermined time that may be less than the model's simulation and/or execution time, as indicated at block 1810. In addition, in some embodiments, the code generator 1016 may generate code, such as computer programming code or hardware description language code, for the model or the portion thereof, as indicated at block 1812. The generated code may include code for establishing a message passing service or it may utilize a message passing service of the target platform, as also indicated at block 1812.

An executable graphical model may include portions, such as sub-models, subsystems, blocks, etc., that are configured to execute at different rates relative to each other. The different model rates may be a function of a fundamental rate or a fundamental model sample time.

When Automatic Code generation is performed for a model having messaging semantics, e.g., a model including one or more message blocks and other message related semantics discussed within this disclosure, generally, one or more of the following three components may be accounted for in the code generation process and the code that is generated:

1. Message construction/destruction service: This service provides support for allocating a new Message and deallocating a Message at the end of its life time. The generated code may contain an embodiment of these services as well as calls to these services in locations where Messages are either produced or consumed. The allocation and deallocation services may support the following capabilities:
   a. Support for custom Message types including, for example, numeric, string, enumerated, structured, and object-oriented types.
   b. Support for various approaches for memory apportionment including, for example, allocating/deallocating on stack, heap, and memory pools.
2. Queuing service: Messaging queues store messages while the messages are waiting to be processed. The generated code may contain an embodiment of this service with support for services such as setup queue, enqueue messages, interrogate queue occupancy, order messages, dequeue messages, and destroy queue. Some detailed examples of these services include:
   a. Queue length: Determines how many messages are allowed to be present in the Queue
   b. Sorting: Queues may support various manners in which Messages present in the Queue are ordered. Examples of sorting include FIFO (first in first out), LIFO (last in first out), and Priority, which is based on the payload/reserved priority attribute of a Message. This manner of ordering may determine the order in which the messages will be retrieved from the queue, for example to be processed at one or more Receivers.
   c. Overflow policy: Queues may support a set of policies for dropping Messages such as drop-tail and drop-oldest. In addition, overflows may need to trigger special exceptions that are handled suitably.
   d. Thread and Task safety: Message Queues may be accessed by multiple senders and receivers residing in multiple threads or tasks. Accordingly, the Queues may be implemented to handle access to Messages in a non-blocking, thread-safe manner.
3. Message Send, Receive, and Forwarding services: The generated code may contain embodiments for sending, receiving, and forwarding messages during the course of execution of the modeled system. These services manage the addressing of Messages from the Sender to Receiver.

a. The Send service may allow a Sender of a Message to send a Message to a destination.
b. The Receiver service may allow receivers to:
  i. Peek at Messages in a queue without removing or consuming the Message
  ii. Dequeue/pop a Message from a queue to process it
c. The Forwarding service may allow a Receiver to forward (without deallocation and allocation of a new Message) an existing Message to another Receiver The code generator 1016 may include a plurality of parts or components. For example, the code generator 1016 may include a front-end processing unit, an intermediate representation (IR) generator, a back-end processing unit, an optimization engine, and a report generator. In some embodiments, the code generator 1016 may include additional, fewer, or other parts or components. For example, instead of having its own IR generator, the code generator 1016 may access one or more in-memory representations produced by the IR builder 1022 of the model compiler 1020.

The code generator 1016 and/or one or more of its parts or components may comprise registers and combinational logic configured and arranged to produce sequential logic circuits. In some embodiments, the code generator 1016 may be implemented through one or more software modules or libraries containing program instructions pertaining to the methods described herein, that may be stored in memory and/or on computer readable media, and may be executed by one or more processors. Other computer readable media may also be used to store and execute these program instructions. In alternative embodiments, various combinations of software and hardware, including firmware, may be utilized to implement the present invention.

The code generator 1016 may automatically generate code using a plurality of stages or phases, such as a model compile stage, a model link stage, and a simulation loop stage. In some embodiments, the simulation loop stage may be omitted. In some embodiments, the model compile and link stages may be performed by the model compiler 1020 of the simulation engine 1006. The model compile stage may involve preparing data structures and evaluating parameters of the model to determine their values, determining connectivity among model elements and components, such as blocks, subsystems, sub-models, and states, configuring and propagating block characteristics (e.g., sample times, data types, etc.), checking model component and block signal compatibility, flattening the model hierarchy, performing optimizations, such as block reduction and block insertion, and determining a sorted order of the blocks or the equations corresponding to the blocks of the model. The simulation engine 1006 may also establish other execution schedules, such as state-based, event-based, and/or message-based execution schedules.

During the model compile and/or link phases, one or more in-memory representations, such as intermediate representations (IRs), of the model may be generated, e.g., by the IR builder 1022 or the code generator 1016. The IRs may be implemented as graphs, such as a data, control, call or data/control/call flow graphs, that include a plurality of nodes and edges. The nodes of the IR may represent the blocks and other components or objects of the model, and the edges may represent connections, such as signals, state transitions, messages, events, defined within the model. Special nodes, called network instance components (NICs), may be used to provide hierarchy in the IR by abstractly representing subsystems or other virtual blocks of the model. The IR may include a plurality of hierarchically arranged levels. For example, there may be a top-level of IR and one or more of the components of the top-level IR may be a particular type or form of in-memory representation. For example, one or more components of the IR may be a Control Flow Graph (CFG), Data Flow Graph (DFG), Control Data Flow Graph (CDFG), program structure tree (PST), abstract syntax tree (AST), a netlist, etc. A CDFG may capture the control flow as well as the data flow of the model through data dependency and control dependency edges. The model compiler 1020 may apply one or more optimization techniques to an IR resulting in the creation of additional IRs. The in-memory representations or IRs may be stored in memory, such as main memory, of a data processing device.

Following the model compilation and link phases, code may be generated automatically for the model by the code generator 105. The generated code may be textual code, such as textual source code, that may be compiled into object code and executed on a target machine, such as an embedded hardware element of a real-world device, such as a controller. The generated code may conform to one or more programming languages, such as Ada, Basic, C, C++, C#, SystemC, FORTRAN, etc. In some embodiments, the generated code may conform to a description language, such as VHDL, Verilog, a netlist, a Register Transfer Level (RTL) description, a vendor or target specific HDL code format, such as Xilinx FPGA libraries, etc. The generated HDL code may be bit true and cycle accurate (modulo a well-defined initial latency) to the source model. In some embodiments, the generated code may conform to assembly code.

Alternatively or additionally, the generated code may be in the form of object code or machine instructions, such as an executable, suitable for execution by a target device, such as a central processing unit, a microprocessor, a digital signal processor (DSP), etc.

The generated code produced by the code generator 1016 may be output in the form of one or more build or other files, and may be stored in memory. The report generator of the code generator 1016 may produce one or more code generation reports, which may also be in the form of a file, and may be presented on an output device, such as a display or a printer.

The code generator 1016 may generate code without executing the model having messaging semantics.

The modeling system 1000 also may include a target language compiler, which may compile the code generated for the model, and this generated code may be deployed and executed outside of the modeling system 1000. For example, the generated and compiled code may be deployed and run on embedded hardware or another data processing device that does not include the modeling system 1000 and/or the simulation engine 1006.

To generate code, a code generation command may be invoked by user input or programmatically, for example, when a particular event occurs, such as a model passing verification, etc.

Implementation Example

The following example illustrates one embodiment of generating code for a model having Messaging Semantics that illustrates many of the features described herein. One skilled in the art may be able to realize the above-described Services using other approaches and languages based upon the one illustrated here.

The example first shows the basic Messaging services outlined above realized in the C language files slMsgSvc.h and slMsgSvc.c of the source code listing attached as Appendix A. The source code appendix shows implementations for Message creation/destruction using memory pooling, a queuing service that supports different queuing policies, dropping, and thread safety, and finally APIs for sending, receiving, and forwarding messages.

Also shown is an exemplary model that conforms at least in part to the Simulink model-based design environment that generates both the Services above and calls to the services within the generated code for that model.

Figure 22:
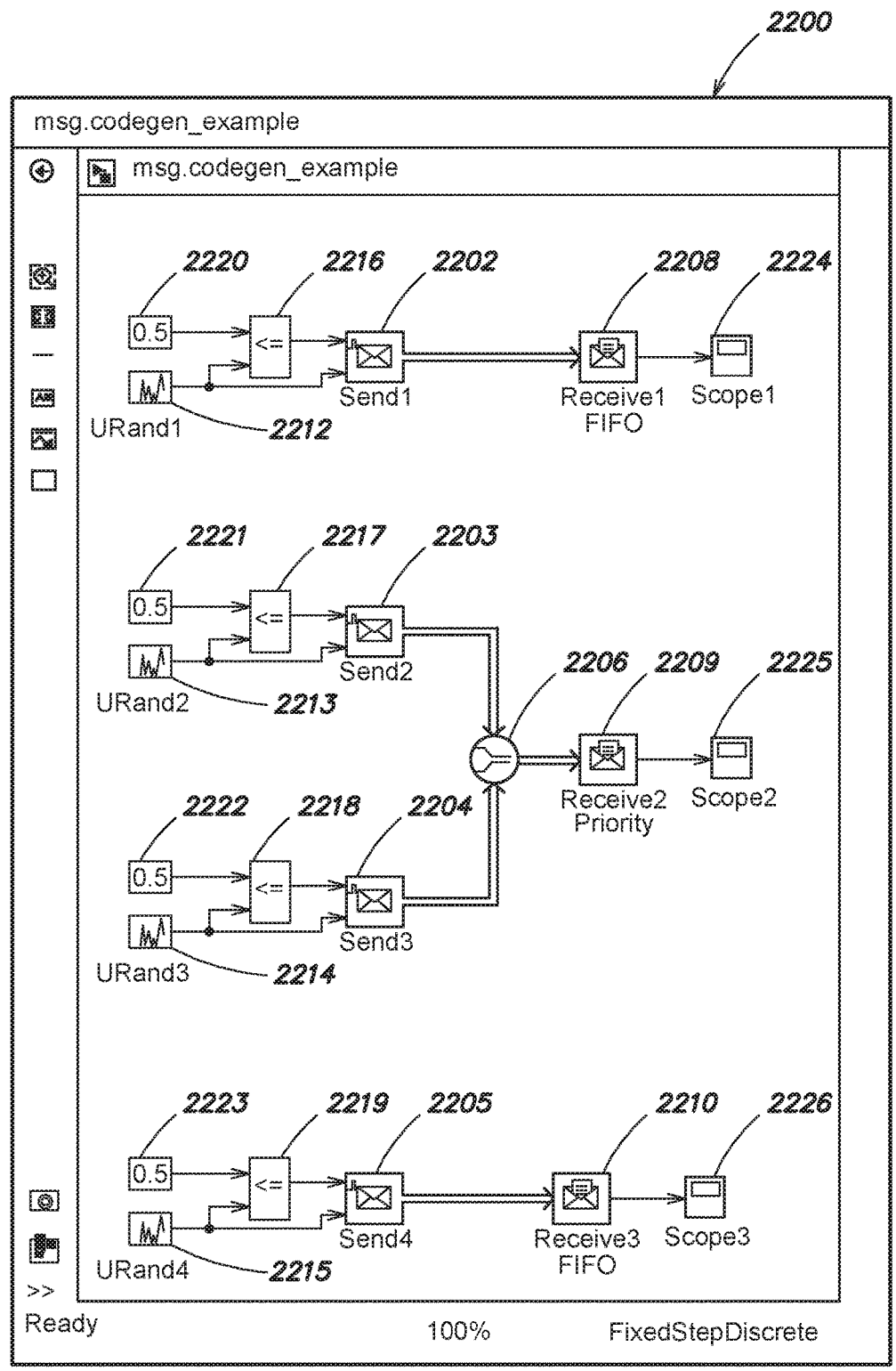
FIG. 22 is a schematic illustration of an example graphical model having executable semantics in accordance with an embodiment of the disclosure.

FIG. 22 is a schematic illustration of an executable model 2200 having messaging semantics in accordance with an embodiment. The model 2200 may be opened in a modeling system, such as the modeling system 1000. The model 2200, which may be in the form of a block diagram, includes four Message Send blocks 2202-2205, a Message Path Combiner block 2206, and three Message Receive blocks 2208-2210. The Message Receive blocks 2208-2210 may provide different queue policies for message queues implemented by the Message Receive blocks 2208-2210. The message queue policies may be stored as parameters or properties of the Message Receive blocks 2208-2210, which may be specified through one or more dialogs or other user interface elements. Each of the Message Send blocks 2205-2205 receives a data input signal from a respective Random Number Generator block 2212-2215, and a control input signal from a respective Math Function block 2216-2219 that applies a 'less than or equal to' function to its inputs. Each of the Math Function blocks 2216-2219 compares the value from the respective Random Number Generator block 2212-2215 with a value from a respective Constant block 2220-2223. Outputs of the Message Receive blocks 2208-2210 are provided to respective Scope blocks 2224-2226. The model 2200 may be a time-based model that executes over a simulation time, e.g., from 0 to 10.0 seconds. In addition, the Message Receive block 2210 and the Scope block 2226 may operate at a rate that is different than the rate at which the other blocks of the model 2200 operate. For example, the Message Receive block 2210 and the Scope block 2226 may have a sample time of 0.2 seconds while the other blocks of the model 2200 may have a sample time of 0.1 seconds. The Message Receive block 2210 and the Scope block 2226 may thus operate at a slower rate than the other blocks of the model 2200. In some embodiments, the simulation engine 1006 may specify different tasks/threads for the Message Receive block 2210 and the Scope block 2226 on one hand and for the other blocks on the other hand. The generated code may specify one or more functions, for example the 'step0' and 'step1' functions, that may get mapped to threads when the generated code is deployed on a target system.

During execution of the model 2200 for example by the simulation engine 1006, the Random Number Generator blocks 2212-2215 generate random numbers that are provided to the Math Function blocks 2216-2219 and to the Message Send blocks 2202-205. The Math Function blocks 2216-2219 compare the received random numbers with the value of the respective Constant blocks 2220-2223. If the received random number is less than or equal to the constant value, the respective Math Function block 2216-2217 issues a True signal that is received on the control port of the respective Message Send block 2202-2205. In response, the respective Message Send block 2202-2205 generates a message whose payload is the random number value. The lifetime of the messages sent by the Message Send blocks 2202-2205 may be determined by the model, for example through one or more model-level option settings. The messages are received by the Message Receive blocks 2208-2210, and the payloads, e.g., the random number values, are provided to the Scope blocks 2224-2226. The Message Receive blocks 2208-2210 may forward a message or destroy it. A message may be temporarily held by a Message Receive block 2208-2210 while a determination is made whether the message is to be forwarded or destroyed at which point the message may be returned to a queue or destroyed. In some embodiments, other data structures, such as stacks, may be used in place of queues.

Figure 23:
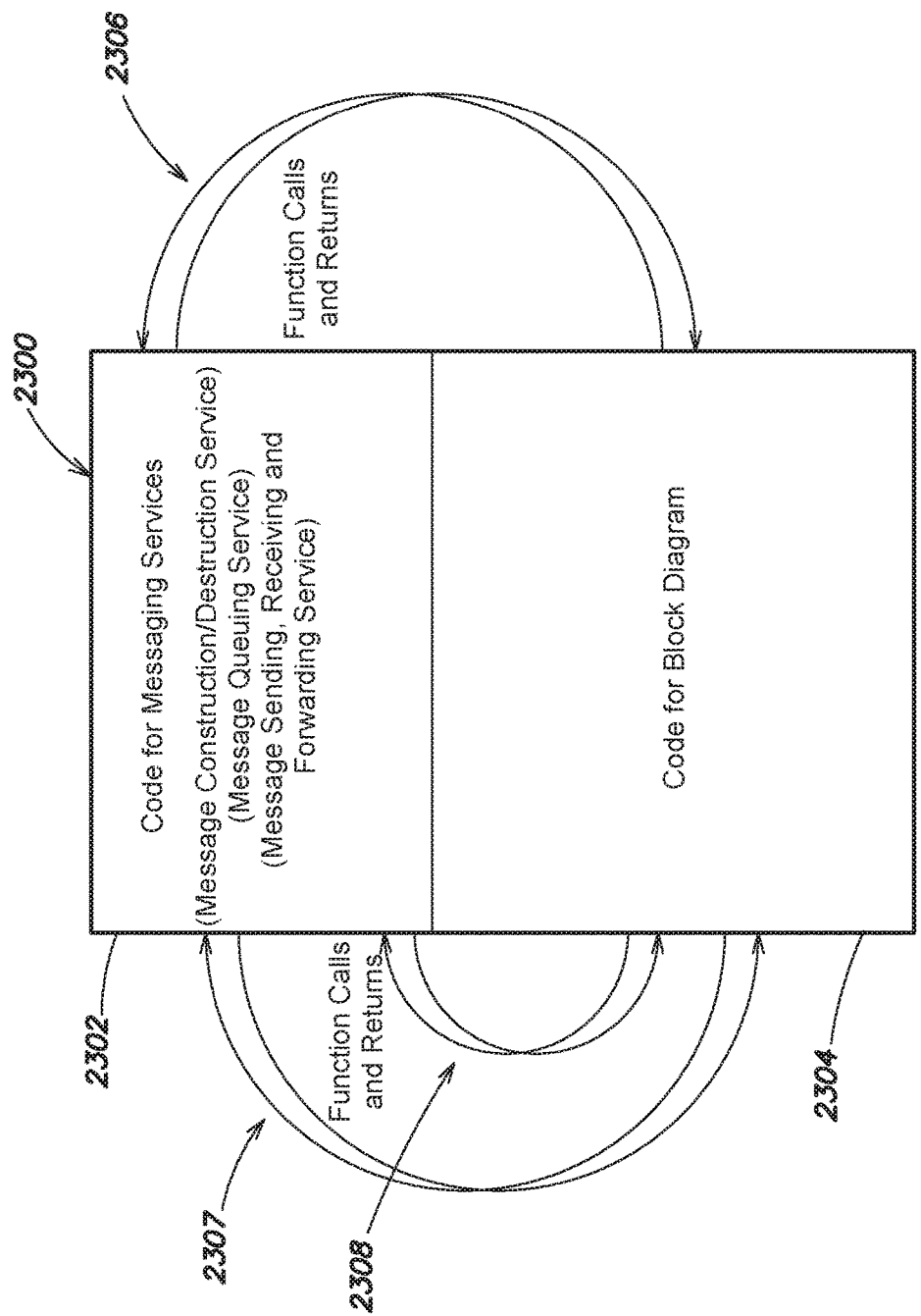
FIG. 23 is a schematic illustration of example code automatically generated for the model of FIG. 22 in accordance with an embodiment of the disclosure.

FIG. 23 is a schematic illustration of code 2300 generated automatically for the model 2200 by the code generator 1016. The generated code 2300 may be organized into a plurality of layers or sections. In some embodiments, the generated code 2300 may include a first layer 2302 representing messaging services, such as the message construction/destruction service, the message queuing service, and the message sending, receiving, and forwarding service. The generated code 2300 may further include a second layer 2304 representing the model 2200, e.g., code generated for a block diagram. The second layer 2304 may include calls, such as function calls, to functions defined in the first layer 2302, and outputs of the called functions may be returned to the code included in the second layer 2304, as schematically illustrated in FIG. 23 as arrows 2306-2308. It should be understood that the generated code 2300 may have other structures such as additional, fewer, or different layers or sections.

If the generated code 2300 conforms to the C programming language, the code generator 1016 may create one or more header (.h) files and one or more main (.c) files for the first layer 2302. The code generator 1016 may also create one or more header (.h) files and one or more main (.c) files for the second layer 2304.

In some embodiments, the code implementing the message services, e.g., the code for the first layer 2302, may be re-used to support code generated for other models, thereby saving memory resources.

Messaging Services

The first layer 2302 of the generated code 2300 may include a portion that represents a coder interface for the messages within a model. Local switches may also be implemented, for example to choose between standard memcpy/memset implementations or local implementations, to choose among run-time exceptions, and whether to include malloc/free code.

The first layer 2302 may include a plurality of C 'struct' definitions. For example, a memory pool may be defined to allocate and free memory units of a fixed size. A memory pool may allocate a chunk of memory, and allocate from the chunk. A memory chunk may be defined as a contiguously allocated block of memory from which units of a fixed size may be allocated. A memory chunk may be a linked list, and may hold a pointer to a next chunk if the owning memory pool is allowed to grow. Freed memory may be returned to the pool. The pool may be configured to grow if it does not have sufficient memory or, alternatively, a system allocation for additional memory may be performed.

A memory pool manager may be defined in the generated code to initialize and manage one or more memory pools. The memory pools may be held as a linked list, and the memory pool manager may keep track of the first pool in the list. The first layer 2302 may also include definitions of data structures for messages and message queues. A message queue may be an object that holds properties that define queuing behavior as well as messages that are contained in the queue as a linked list at model runtime. The code defining a message queue may also specify a capacity, a length, a drop policy, a queue type, etc. In some embodiments, FIFO, LIFO, priority, and single reader, single writer lock-free queues may be implemented in the generated code. A message manager may manage all messages and queues at model runtime.

The first layer 2302 may include code implementing message-related functions, including:

a function for creating a new message;

a function for creating a new message and sending it to a specified queue;

a function to pop a message at the top of a specified queue;

a function to return the data held by a specified message; and a function to destroy a specified message.

The first layer 2302 may include code for dynamic memory management. It may include code that adds a new fixed-size memory pool to the memory manager, where the pool may have a specified number of memory units of a specified size. Two double linked lists may be created; one for allocated blocks and the other for free blocks.

The first layer 2302 may include code for attaching a memory chunk to a memory pool, and for initializing the properties of the memory pool. It may link memory units, and create a free list. It may include code for allocating memory of a specified size from the memory pool, and for obtaining a next available block from the free list. If no blocks are available, for example, the pool is fully allocated, the code may grow the memory for the pool, if allowed. If not, then the code may allocate memory from the system, if allowed. If not, the code may raise an exception.

The code may link a newly allocated chunk with a previous one, and may link all of the memory units, and create a free list. The code may free previously allocated memory that belonged to the memory pool, return it to the memory pool, and set a pointer to NULL. If the memory did not belong to the pool, the code may free the memory by a system call.

Code may be generated for recursively destroying memory chunks and memory pools, and for reporting statistics of the pool. The code may also destroy the memory pool manager.

The code may include functions for destroying messages, which may be implemented as objects. The code may construct an instance of a Message Manager, which may support methods called from code generated for a model. The methods may serve as the implementation of functions called from code generated for a model.

The generated code may include code for creating and initializing message runtime services, and for terminating the message runtime services and deleting all messages and queues.

The generated code may include code for creating one or more message queues having specified properties, and for setting a number of message queues to be used. The code may create a new message with a specified identifier (ID).

The generated code may include code for adding a message to a specified queue, and for removing a message from the queue in which the message is currently stored. The generated code may also include code for iterating over the messages in a queue, and inserting a new message, for example at the end of the queue or at a location based on the message's priority. The generated code may include code for dropping a message if the queue is at capacity. The generated code may also include code for emptying a queue.

The generated code may include code for destroying a specified message. The generated code may include code for asserting that a message has been popped or dropped from a queue.

The generated code may include code that returns the number of messages present in a specified queue, for popping the message at the top of a specified queue, and for peeking at the message at a specified index of a specified queue. The generated code may include code for returning the data held by a specified message, e.g., in the message's payload.

Model

The second layer 2304, which represents the model, e.g., a block diagram although it should be understood that the second layer 2304 may represent code for other types of models, e.g., graphical models, text, models, etc., may include code defining data structures for portions of the model, such as signals, block states, and model and block parameters. The code may include a plurality of C 'struct' definitions. For example, the generated code may include definitions for timing characteristics of the model, such as a model start time, a model stop time, and one or more step sizes. The second layer 2304 also may include model entry point functions, such as a model initialize function, a model step function, and a model terminate function. The model initialize function may include code for performing model initialization, and may be called once before calling the model step function. The model step function may include output and update code for the model elements included in the model. The model terminate function may include model shutdown code, and may be called as part of system shutdown.

The second layer 2304 may include code for implementing the blocks of the model, such as the Message Send blocks 2202-2205, the Message Path Combiner block 2206, the Message Receive blocks 2208-2210, the Random Number Generator blocks 2212-2215, the Math Function blocks 2216-2219, the Constant blocks 2220-2223, and the Scope blocks 2224-2226.

The second layer 2304 may include code implementing a model step function, one or more wrapper functions, and data logging.

Figure 24A:
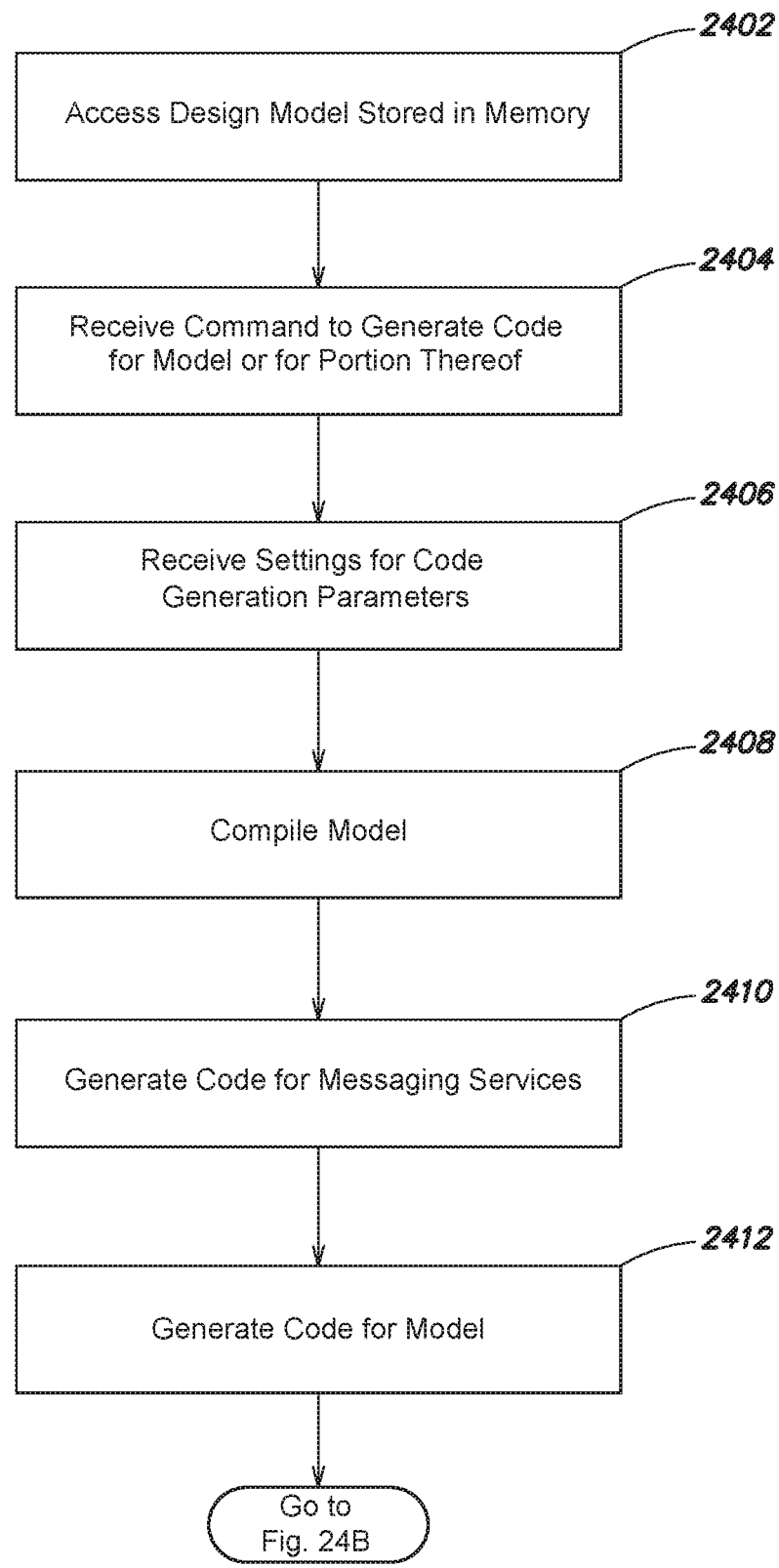
FIGS. 24A-B are partial views of a flow diagram of an example method in accordance with an embodiment of the disclosure.
Figure 24B:
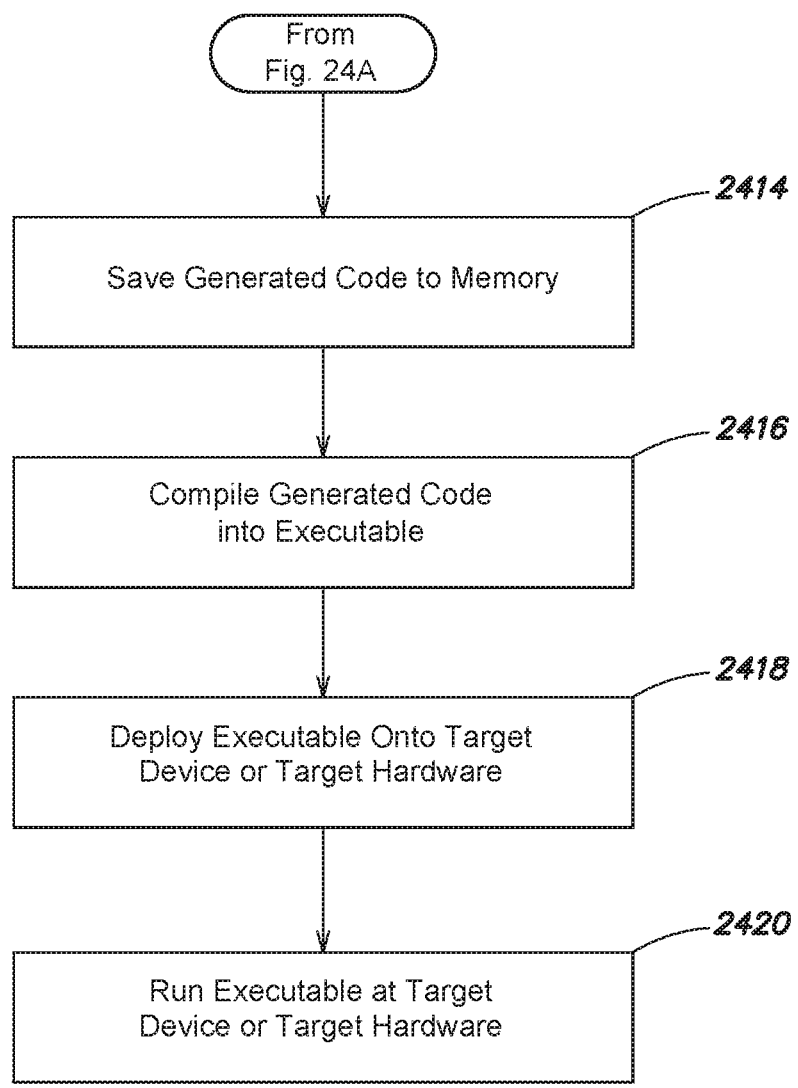

FIGS. 24A-B are partial views of a flow diagram of a method in accordance with an embodiment. The code generator 1016 may access a model stored in memory, as indicated at step 2402. The code generator 1016 may receive a command to generate code for the model or a portion thereof, as indicated at step 2404. The code generator 1016 may receive settings for one or more parameters that control the code generation process, as indicated at step 2406. Exemplary parameters include target file, programming language, compiler optimization, e.g., faster builds, faster runs, or debugging, start build process, etc. The code generator 1016 (or the model compiler 1020) may compile the model, as indicated at step 2408. The code generator 1016 may generate code for the messaging services, as indicated at step 2410, and for the model, as indicated at step 2412.

In some embodiments, the code generator 1016 may also determine dependencies on library or object files (e.g., binary files) where the library or object files contain functionality to execute the generated code of the model. For example, the services in the first layer 2302 may be available in compiled (binary) form and the corresponding library or object files may be linked against the code generated from the model in the second layer 2304.

In some embodiments, the services in the first layer 2302 may be accessible via service based protocols, such as Simple Object Access Protocol (SOAP), Representational State Transfer (REST), or JavaScript Object Notation (JSON), among others, over a network connection. The second layer 2304 may include code implementing interface functionality for accessing and interoperating with those services.

The generated code, which may be in the form of source code and may be organized into one or more files, may be saved to memory, as indicated at step 2414 (FIG. 24B). In some embodiments, a language compiler may compile the source code into object code, and construct one or more build files, which may be in the form of an executable, as indicated at step 2416. The executable may be deployed on a target device or on target hardware, as indicated at step 2418. The target device or target hardware may be a different data processing device than the one running the modeling system 1000, and the target device or target hardware may not include a modeling system 1000. The executable may be run on the target device or target hardware, as indicated at step 2420.

The generated code may include a run-time interface that executes the code generated for the model. The run-time interface and the model code may be compiled together to create a model executable.

In some embodiments, the generated code may be tested, for example using Software in the Loop or Hardware in the Loop techniques.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, code implementing other messaging services may be generated. Therefore, it is the object of the appended claims to cover all such variations and modifications as come within the true spirit and scope of the disclosure.

What is claimed is:

1. A method comprising:
   accessing, from a first memory, an executable model having messaging semantics, where the executable model
      specifies a procedure,
      executes over a model simulation time,
      includes a time-based model element performing a functionality, and
      generates messages including payloads that remain fixed for a given send-receive interaction and are processed based on the procedure specified by the executable model according to the messaging semantics, and the messages persist for determined portions of the model simulation time;
   generating, by a processor coupled to the first memory, code for the executable model, where the code generated for the executable model includes instructions for implementing
      a message construction and destruction service that (i) creates the messages that are processed based on the procedure specified by the executable model according to the messaging semantics, the messages having one or more types, the one or more types including at least one of a numeric message type, a string message type, an enumerated message type, a structured message type, or an object-oriented message type, (ii) allocates and deallocates memory parts, and (iii) destroys the messages,
      a message queuing service that (i) establishes message queues, (ii) associates the message queues with the memory parts, (iii) stores one or more of the messages in one or more of the message queues, and (iv) retrieves the one or more of the messages from the one or more of the message queues, and
      the functionality of the time-based model element; and
   storing the code in the first memory or a second memory.

2. The method of claim 1 wherein the code generated for the executable model further includes instructions for
   generating the message queues, where the one or more of the message queues has a length, a processing order, and an overflow policy.

3. The method of claim 1 wherein the code generated for the executable model further includes instructions for
   popping the one or more of the messages from the one or more of the message queues.

4. The method of claim 1 wherein the code generated for the executable model includes a first layer including instructions implementing
   the message construction and destruction service,
   the message queuing service, and
   a message sending, receiving, and forwarding service.

5. The method of claim 4 wherein the code generated for the executable model includes a second layer that implements the procedure specified by the executable model.

6. The method of claim 5 wherein the second layer includes function calls to the first layer.

7. The method of claim 1 wherein the code generated for the executable model is standalone computer programming code.

8. The method of claim 1 wherein the code generated for the executable model is C code.

9. The method of claim 1 wherein the executable model includes model elements and the code generated for the executable model includes further instructions for:
establishing at least two tasks for running code elements implementing a plurality of the model elements, where the message queues include:
a first message queue configured to store first messages exchanged between at least two of the model elements running in a first task of the at least two tasks,
a second message queue configured to store second message exchanged between at least two of the model elements running in a second task of the at least two tasks, and
a third message queue configured to store third messages exchanged between a first model element running in the first task and a second model element running in the second task, where the third message queue is configured for non-blocking, thread-safe access.

10. The method of claim 9 wherein the third message queue is implemented as a shared array structure.

11. The method of claim 9 wherein the third message queue is a Single Reader Single Writer (SRSW) queue.

12. A method comprising:
accessing, from a first memory, an executable model having messaging semantics and specifying a procedure, where the executable model generates messages including payloads that remain fixed for a given send-receive interaction and are processed based on the procedure specified by the executable model according to the messaging semantics, and that persist for limited times during execution of the executable model, the limited times having start points and end points, the executable model including a time-based model element that performs a functionality; and
generating, by a processor coupled to the first memory, code for the executable model, where the code generated for the executable model includes instructions for implementing
one or more message construction and destruction services that
create the messages at the start points of the limited times, the messages having one or more types, the one or more types including at least one of a numeric message type, a string message type, an enumerated message type, a structured message type, or an object-oriented message type,
allocate and deallocate memory parts, and
destroy the messages at the end points of the limited times,
one or more message queuing services that
establish message queues,
associate the message queues with the memory parts
enqueue the messages to the message queues, and
dequeue the messages from the message queues, and
the functionality of the time-based model element.

13. The method of claim 12 further comprising:
deploying the code generated for the executable model or a translated version of the code generated for the executable model to a target data processing system.

14. One or more non-transitory computer-readable media comprising program instructions, the program instructions when executed by a processing element operable to:
for an executable model having messaging semantics, where the executable model specifies a procedure, executes over a model simulation time, includes a time-based model element performing a functionality, and
generates messages including payloads that remain fixed for a given send-receive interaction and are processed based on the procedure specified by the executable model according to the messaging semantics, and the messages persist for determined portions of the model simulation time,
generate code for the executable model, where the code generated for the executable model includes instructions for implementing
a message construction and destruction service that (i) creates the messages that are processed based on the procedure specified by the executable model according to the messaging semantics, the messages having one or more types, the one or more types including at least one of a numeric message type, a string message type, an enumerated message type, a structured message type, or an object-oriented message type, (ii) allocates and deallocates memory parts, and (iii) destroys the messages,
a message queuing service that (i) establishes message queues, (ii) associates the message queues with the memory parts, (iii) stores one or more of the messages in one or more of the message queues, and (iv) retrieves the one or more of the messages from the one or more of the message queues, and
the functionality of the time-based model element; and
store the code generated for the executable model in a memory.

15. The one or more computer-readable media of claim 14 wherein the code generated for the executable model further includes instructions for
generating the message queues, where the one or more of the message queues has a length, a processing order, and an overflow policy.

16. The one or more computer-readable media of claim 14 wherein the code generated for the executable model further includes instructions for
popping the one or more of the messages from the one or more of the message queues.

17. The one or more computer-readable media of claim 14 wherein the code generated for the executable model includes a first layer including instructions implementing
the message construction and destruction service,
the message queuing service, and
a message sending, receiving, and forwarding service.

18. The one or more computer-readable media of claim 17 wherein the code generated for the executable model includes a second layer that implements the procedure specified by the executable model.

19. The one or more computer-readable media of claim 18 wherein the second layer includes function calls to the first layer.

20. The one or more computer-readable media of claim 14 wherein the code generated for the executable model is C code.

21. One or more non-transitory computer-readable media comprising program instructions, the program instructions when executed by a processing element operable to:
access, from a first memory, an executable model having messaging semantics and specifying a procedure, where the executable model generates messages including payloads that remain fixed for a given send-receive interaction and are processed based on the procedure specified by the executable model according to the messaging semantics, and that persist for limited times during execution of the executable model, the limited times having start points and end points, the executable model including a time-based model element that performs a functionality; and generate code for the executable model, where the code generated for the executable model includes instructions for implementing one or more message construction and destruction services that create the messages at the start points of the limited times, the messages having one or more types, the one or more types including at least one of a numeric message type, a string message type, an enumerated message type, a structured message type, or an object-oriented message type, allocate and deallocate memory parts, and destroy the messages at the end points of the limited times, one or more message queuing services that establish message queues, associate the message queues with the memory parts, enqueue the messages to the message queues, and dequeue the messages from the message queues, and the functionality of the time-based model element.

22. An apparatus comprising:

a first memory storing an executable model having messaging semantics, where the executable model specifies a procedure, executes over a model simulation time, includes a time-based model element performing a functionality, and generates messages including payloads that remain fixed for a given send-receive interaction and are processed based on the procedure specified by the executable model according to the messaging semantics, and the messages persist for determined portions of the model simulation time; and one or more processors coupled to the first memory, the one or more processors configured to:

generate code for the executable model, where the code generated for the executable model includes instructions for implementing a message construction and destruction service that (i) creates the messages that are processed based on the procedure specified by the executable model according to the messaging semantics, the messages having one or more types, the one or more types including at least one of a numeric message type, a string message type, an enumerated message type, a structured message type, or an object-oriented message type, (ii) allocates and deallocates memory parts, and (iii) destroys the messages, a message queuing service that (i) establishes message queues, (ii) associates the message queues with the memory parts, (iii) stores one or more of the messages in one or more of the message queues, and (iv) retrieves the one or more of the messages from the one or more of the message queues, and the functionality of the time-based model element; and store the code in the first memory or a second memory.

23. The apparatus of claim 22 wherein the code generated for the executable model further includes instructions for generating the message queues, where the one or more of the message queues has a length, a processing order, and an overflow policy.

24. The apparatus of claim 22 wherein the code generated for the executable model further includes instructions for popping the one or more of the messages from the one or more of the message queues.

25. The apparatus of claim 22 wherein the code generated for the executable model includes a first layer including instructions implementing the message construction and destruction service, the message queuing service, and a message sending, receiving, and forwarding service.

26. The apparatus of claim 25 wherein the code generated for the executable model includes a second layer that implements the procedure specified by the executable model.

27. The apparatus of claim 26 wherein the second layer includes function calls to the first layer.

28. The apparatus of claim 22 wherein the code generated for the executable model is C code.

* * * * *